United States Patent
Hanzawa et al.

(10) Patent No.: US 10,084,981 B2
(45) Date of Patent: Sep. 25, 2018

(54) SIGNAL PROCESSING APPARATUS, CONTROL METHOD, IMAGE SENSOR, AND ELECTRONIC APPARATUS

(71) Applicant: SONY CORPORATION, Tokyo (JP)

(72) Inventors: Katsuhiko Hanzawa, Kanagawa (JP); Tsungling Li, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 4 days.

(21) Appl. No.: 15/312,756

(22) PCT Filed: May 20, 2015

(86) PCT No.: PCT/JP2015/064402
§ 371 (c)(1),
(2) Date: Nov. 21, 2016

(87) PCT Pub. No.: WO2015/186509
PCT Pub. Date: Dec. 10, 2015

(65) Prior Publication Data
US 2017/0187975 A1    Jun. 29, 2017

(30) Foreign Application Priority Data
Jun. 3, 2014 (JP) .................. 2014-114626

(51) Int. Cl.
*H04N 5/374* (2011.01)
*H04N 5/378* (2011.01)
*H04N 5/357* (2011.01)

(52) U.S. Cl.
CPC ............. *H04N 5/374* (2013.01); *H04N 5/357* (2013.01); *H04N 5/378* (2013.01)

(58) Field of Classification Search
CPC ........ H04N 5/374; H04N 5/378; H04N 5/357; H04N 5/37455; H04N 5/35545;
(Continued)

(56) References Cited

U.S. PATENT DOCUMENTS 8,605,173 B2 * 12/2013 Lee ...................... H04N 5/3575
348/231.6
9,319,612 B2 * 4/2016 Yan ........................ H04N 5/378
(Continued)

FOREIGN PATENT DOCUMENTS

EP        2182722 A2    5/2010
JP     2008-306325 A   12/2008
(Continued)

OTHER PUBLICATIONS

Woonghee Lee, "A 1.9 e- Random Noise CMOS Image Sensor With Active Feedback Operation In Each Pixel", IEEE Transactions on Electron Devices, vol. 56, No. 11, Nov. 2009, pp. 2436-2445.
(Continued)

*Primary Examiner* — Pritham Prabhakher
(74) *Attorney, Agent, or Firm* — Chip Law Group

(57) ABSTRACT

A signal processing apparatus according to the present technology connects, when an output of a comparing unit that compares a signal read from a unit pixel with a reference voltage is fed back to a floating diffusion of the unit pixel, a signal line to a negative input of the comparing unit, the signal read from the unit pixel being transmitted through the signal line; connects, when auto-zero processing is performed, the signal line to a positive input of the comparing unit; and connects, when the output of the comparing unit is fed back to the floating diffusion of the unit pixel again, the signal line to the negative input of the comparing unit. The present technology is applicable to, for example, an image
(Continued)

sensor and an electronic apparatus and suppresses the reduction in image quality of an image.

18 Claims, 43 Drawing Sheets

(58) Field of Classification Search
CPC ...... H04N 5/369; H04N 5/345; H04N 5/3575; H01L 27/14634; H01L 27/14636; G06T 5/006; H03M 1/0658; H03M 1/56
USPC ........................................................ 348/294
See application file for complete search history.

(56) References Cited

U.S. PATENT DOCUMENTS

| | | | | |
|---|---|---|---|---|
| 2008/0303705 A1* | 12/2008 | Sakakibara | ......... | H03M 1/0658 341/172 |
| 2009/0310003 A1* | 12/2009 | Collins | ............. | H04N 5/37455 348/308 |
| 2011/0013046 A1* | 1/2011 | Hiyama | ................. | H03M 1/06 348/222.1 |
| 2011/0204978 A1* | 8/2011 | Jansson | .............. | H03F 3/45753 330/253 |
| 2012/0038809 A1* | 2/2012 | Lee | ...................... | H04N 5/3575 348/308 |
| 2012/0049042 A1* | 3/2012 | Lim | ..................... | H04N 5/3575 250/208.1 |
| 2013/0068929 A1 | 3/2013 | Solhusvik et al. | | |
| 2013/0271633 A1* | 10/2013 | Hashimoto | ............ | H04N 5/353 348/300 |
| 2014/0160334 A1 | 6/2014 | Wakabayashi | | |
| 2014/0169740 A1* | 6/2014 | Verslegers | ............. | G02B 6/122 385/42 |
| 2014/0232890 A1* | 8/2014 | Yoo | ..................... | H04N 5/23245 348/220.1 |
| 2014/0240565 A1* | 8/2014 | Murakami | ............. | H04N 5/378 348/302 |
| 2014/0291482 A1* | 10/2014 | Tanaka | ................... | H04N 5/378 250/208.1 |

FOREIGN PATENT DOCUMENTS

| | | |
|---|---|---|
| JP | 2010-109888 A | 5/2010 |
| JP | 2012-114838 A | 6/2012 |
| JP | 2013-55589 A | 3/2013 |
| JP | 2014-531820 A | 11/2014 |

OTHER PUBLICATIONS

International Search Report and Written Opinion of PCT Application No. PCT/JP2015/064402, dated Jul. 21, 2015, 06 pages of English Translation and 07 pages of ISRWO.

International Preliminary Report on Patentability of PCT Application No. PCT/JP2015/064402, dated Dec. 6, 2016, pp. 05.

* cited by examiner

SIGNAL PROCESSING APPARATUS, CONTROL METHOD, IMAGE SENSOR, AND ELECTRONIC APPARATUS

CROSS REFERENCE TO RELATED APPLICATIONS

This application is a U.S. National Phase of International Patent Application No. PCT/JP2015/064402 filed on May 20, 2015, which claims priority benefit of Japanese Patent Application No. JP 2014-114626 filed in the Japan Patent Office on Jun. 3, 2014. Each of the above-referenced applications is hereby incorporated herein by reference in its entirety.

TECHNICAL FIELD

The present technology relates to a signal processing apparatus, a control method, an image sensor, and an electronic apparatus, and particularly to a signal processing apparatus, a control method, an image sensor, and an electronic apparatus that are capable of suppressing the reduction in image quality of a picked-up image.

BACKGROUND ART

In the existing CMOS image sensor, discrepancy in the threshold value of MOSFET (Metal-Oxide-Semiconductor Field-Effect Transistor) used for a pixel cell circuit may generate fixed-pattern noise (FPN) on a picked-up image.

In recent years, methods of suppressing such discrepancy in the threshold value have been conceived (e.g., see Patent Documents 1 to 6 and Non-Patent Document 1). In these methods, the voltage of a floating diffusion (FD) is controlled for each pixel by negative feedback so that the pixel output is kept constant.

Patent Document 1: Japanese Patent Application Laid-open No. 2005-110275
Patent Document 2: Japanese Patent Application Laid-open No. 2012-19167
Patent Document 3: Japanese Patent Application Laid-open No. 2012-19168
Patent Document 4: Japanese Patent Application Laid-open No. 2012-114838
Patent Document 5: Japanese Patent Application Laid-open No. 2012-151369
Patent Document 6: Japanese Patent Application Laid-open No. 1998-281870
Non-Patent Document 1: Non-Patent Document 1: Ryo Kagaya, Masayuki Ikebe, Tetsuya Asai, and Yoshihito Amemiya, "On-Chip Fixed-Pattern-Noise Canceling by Negative-Feedback Reset for CMOS Image Sensors," The Journal of The Institute of Image Information and Television Engineers, VOL. 59, No. 3(2005), Hokkaido University, 2005

SUMMARY

Problem to be Solved

However, in the case of these methods, it is difficult to suppress the feedthrough discrepancy of a reset transistor provided in a pixel.

The present technology has been proposed in view of the above circumstances. It is an object of the present technology to suppress the reduction in image quality of a picked-up image.

Means for Solving the Problem

According to an aspect of the present technology, there is provided a signal processing apparatus, including: a connection control unit that controls connection between a signal line and two inputs of a comparing unit, a signal read from a unit pixel being transmitted through the signal line, the comparing unit comparing the signal read from the unit pixel with a reference voltage; and a connection unit that connects the signal line to any one of the two inputs of the comparing unit or disconnects the signal line from the two inputs of the comparing unit in accordance with control of the connection control unit.

The connection unit may include a MOSFET, the MOSFET driving as a switch that connects the signal line to any one of the two inputs of the comparing unit or disconnects the signal line from the two inputs of the comparing unit on the basis of a control signal supplied from the connection control unit.

The connection control unit may control the connection unit to connect the signal line to a negative input of the comparing unit when an output of the comparing unit is fed back to a floating diffusion of the unit pixel, control the connection unit to connect the signal line to a positive input of the comparing unit when auto-zero processing is performed, and control the connection unit to connect the signal line to the negative input of the comparing unit when the output of the comparing unit is fed back to the floating diffusion of the unit pixel again.

The signal processing apparatus may further include a reference voltage connection control unit that controls connection between a reference voltage and the two inputs of the comparing unit; and a reference voltage connection unit that connects the reference voltage to any one of the two inputs of the comparing unit or disconnects the reference voltage from the two inputs of the comparing unit in accordance with control of the reference voltage connection control unit.

The signal processing apparatus may further include: a feedback line connection control unit that controls connection between an output of the comparing unit and the floating diffusion of the unit pixel; and a feedback line connection unit that connects the output of the comparing unit to the floating diffusion of the unit pixel or disconnects the output of the comparing unit from the floating diffusion of the unit pixel in accordance with control of the feedback line connection control unit.

A plurality of unit pixels may be arranged in a matrix pattern in a pixel array, a plurality of unit pixel units being formed in the pixel array, the plurality of unit pixel units each including a part of the plurality of unit pixels of the pixel array, and the connection unit may be provided for each unit pixel unit.

The signal processing apparatus may further including a reset control unit that controls an operation of the reset transistor for each row of the unit pixel, in which the reset control unit may connect the reset transistor provided for the row including the unit pixel to be processed in the pixel array when an output of the comparing unit is fed back to the floating diffusion of the unit pixel, and disconnect the reset transistor after the feedback is performed.

The signal processing apparatus may further including: a signal line connection control unit that controls connection between a signal line and an input of the comparing unit, a signal read from the unit pixel being transmitted through the signal line; and a signal line connection unit that connects or disconnects the signal line to/from the input of the comparing unit in accordance with control of the signal line connection control unit.

The signal line connection unit may be provided for each column of the unit pixel in a pixel array, a plurality of unit pixels being arranged in a matrix pattern in the pixel array.

The signal line connection control unit may control the signal line connection unit provided for the column including the unit pixel to connect the signal line provided for the column of the unit pixel to the input of the comparing unit when an output of the comparing unit is fed back to the floating diffusion.

The signal processing apparatus may further including: the comparing unit; and a counter that counts until a comparison result of the comparing unit is changed.

The comparing unit and the counter may be provided for each of a plurality of unit pixel units, the plurality of unit pixel units each including a part of a plurality of unit pixels of a pixel array, the plurality of unit pixel units being formed in the pixel array, the plurality of unit pixels being arranged in a matrix pattern in the pixel array.

The signal processing apparatus may further include a unit pixel group including a plurality of unit pixels.

The unit pixel group may form a pixel array, a plurality of unit pixels being arranged in a matrix pattern in the pixel array.

A plurality of unit pixel units may be formed in the pixel array, the plurality of unit pixel units each including a part of the plurality of unit pixels of the pixel array.

According to an aspect of the present technology, there is provided a control method, including: connecting, when an output of a comparing unit that compares a signal read from a unit pixel with a reference voltage is fed back to a floating diffusion of the unit pixel, a signal line to a negative input of the comparing unit, the signal read from the unit pixel being transmitted through the signal line; connecting, when auto-zero processing is performed, the signal line to a positive input of the comparing unit; and connecting, when the output of the comparing unit is fed back to the floating diffusion of the unit pixel again, the signal line to the negative input of the comparing unit.

According to another aspect of the present technology, there is provided an image sensor, including: a pixel array, a plurality of unit pixels being arranged in a matrix pattern in the pixel array; a connection control unit that controls connection between a signal line and two inputs of a comparing unit, a signal read from the unit pixel being transmitted through the signal line, the comparing unit comparing the signal read from the unit pixel with a reference voltage; and a connection unit that connects the signal line to any one of the two inputs of the comparing unit or disconnects the signal line from the two inputs of the comparing unit in accordance with control of the connection control unit.

The image sensor may further including: the comparing unit; and a counter that counts until a comparison result of the comparing unit is changed, in which a plurality of unit pixel units are formed in the pixel array, the plurality of unit pixel units each including a part of the plurality of unit pixels of the pixel array, and the comparing unit, the counter, and the connection unit are provided for each unit pixel unit.

The image sensor may further including a plurality of semiconductor substrates, in which the connection control unit, the connection unit, the comparing unit, and the counter are formed on a semiconductor substrate different from a semiconductor substrate on which the pixel array is formed.

According to still another aspect of the present technology, there is provided an electronic apparatus, including: an imaging unit that picks up an image of an object; and an image processing unit that performs image processing on image data acquired by imaging performed by the imaging unit, the imaging unit including a pixel array, a plurality of unit pixels being arranged in a matrix pattern in the pixel array, a connection control unit that controls connection between a signal line and two inputs of a comparing unit, a signal read from the unit pixel being transmitted through the signal line, the comparing unit comparing the signal read from the unit pixel with a reference voltage, and a connection unit that connects the signal line to any one of the two inputs of the comparing unit or disconnects the signal line from the two inputs of the comparing unit in accordance with control of the connection control unit.

In an aspect of the present technology, when an output of a comparing unit that compares a signal read from a unit pixel with a reference voltage is fed back to a floating diffusion of the unit pixel, a signal line is connected to a negative input of the comparing unit, the signal read from the unit pixel being transmitted through the signal line, when auto-zero processing is performed, the signal line is connected to a positive input of the comparing unit, and when the output of the comparing unit is fed back to the floating diffusion of the unit pixel again, the signal line is connected to the negative input of the comparing unit.

In another aspect of the present technology, in an image sensor including a pixel array in which a plurality of unit pixels are arranged in a matrix pattern, when an output of a comparing unit that compares a signal read from a unit pixel with a reference voltage is fed back to a floating diffusion of the unit pixel, a signal line is connected to a negative input of the comparing unit, the signal read from the unit pixel being transmitted through the signal line, when auto-zero processing is performed, the signal line is connected to a positive input of the comparing unit, and when the output of the comparing unit is fed back to the floating diffusion of the unit pixel again, the signal line is connected to the negative input of the comparing unit.

In still another aspect of the present technology, in an image sensor of an electronic apparatus, which includes a pixel array in which a plurality of unit pixels are arranged in a matrix pattern, when an output of a comparing unit that compares a signal read from a unit pixel with a reference voltage is fed back to a floating diffusion of the unit pixel, a signal line is connected to a negative input of the comparing unit, the signal read from the unit pixel being transmitted through the signal line, when auto-zero processing is performed, the signal line is connected to a positive input of the comparing unit, when the output of the comparing unit is fed back to the floating diffusion of the unit pixel again, the signal line is connected to the negative input of the comparing unit, an image of an object is picked-up, and image processing is performed on the obtained image data.

Effects

According to the present technology, it is possible to acquire a picked-up image. Further, according to the present technology, it is possible to suppress the reduction in image quality of a picked-up image.

DESCRIPTION OF PREFERRED EMBODIMENTS

Figure 1:
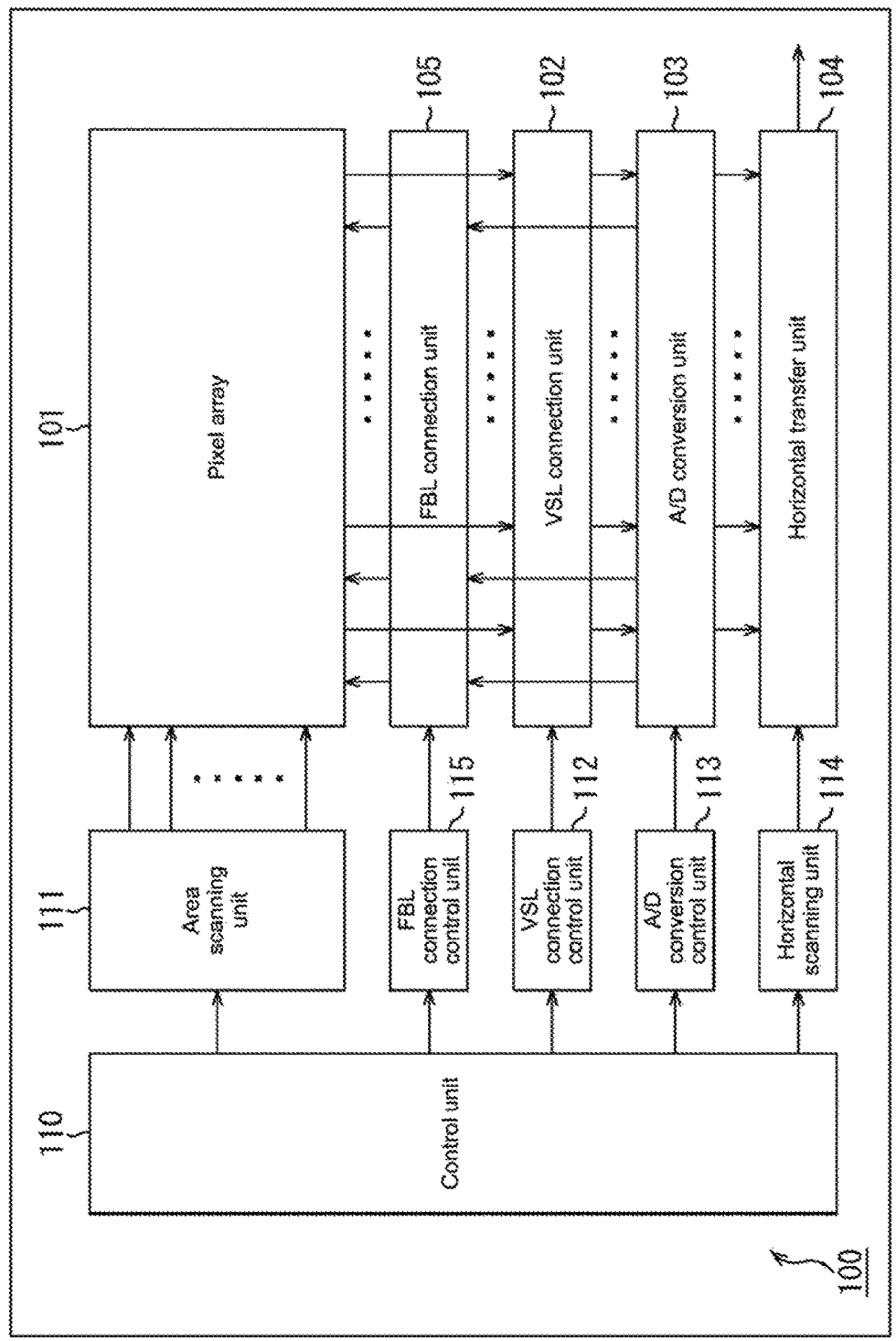
FIG. 1 A diagram showing a main configuration example of an image sensor.

Hereinafter, embodiments for carrying out the present disclosure (hereinafter, referred to as embodiments) will be described. Note that description will be made in the following order.

1. First Embodiment (Image Sensor)
2. Second Embodiment (Imaging Apparatus)

1. First Embodiment

<Discrepancy in Threshold Value of MOSFET>

In the existing CMOS image sensor, discrepancy in the threshold value of MOSFET (Metal-Oxide-Semiconductor Field-Effect Transistor) used for a pixel cell circuit (discrepancy in the threshold value (Vth) of an amplification transistor to be described later) may generate fixed-pattern noise (FPN) on a picked-up image.

In this regard, methods of suppressing such discrepancy in the threshold value have been conceived as described in, for example, Patent Documents 1 to 6 and Non-Patent Document 1. In these methods, the voltage of a floating diffusion (FD) is controlled for each pixel by negative feedback so that the pixel output is kept constant.

However, in the case of these methods, it is difficult to suppress the feedthrough discrepancy of a reset transistor provided in a pixel.

When the feedthrough discrepancy is sufficiently smaller than discrepancy in the threshold value voltage Vth, noise generated due to the feedthrough discrepancy can be sufficiently removed with a correlated double sampling (CDS) operation. However, in the case of, for example, an A/D converter that is not able to perform analog CDS, the feedthrough discrepancy is large when high-gain A/D conversion is performed. In such a case, it may become rate-limiting conditions for the A/D conversion time or gain maximum value.

<Countermeasure Against Feedthrough Discrepancy>

In view of the above, a connection control unit and a connection unit are provided. The connection control unit controls connection between a signal line and two inputs of a comparing unit. A signal read from a unit pixel is transmitted through the signal line. The comparing unit comparing the signal read from the unit pixel with a reference voltage. The connection unit connects the signal line to any one of the two inputs of the comparing unit or disconnects the signal line from the two inputs of the comparing unit in accordance with control of the connection control unit.

Then, the connection control unit may connect, when an output of a comparing unit that compares a signal read from a unit pixel with a reference voltage is fed back to a floating diffusion of the unit pixel, a signal line to a negative input of the comparing unit, the signal read from the unit pixel being transmitted through the signal line; connect, when auto-zero processing is performed, the signal line to a positive input of the comparing unit; and connect, when the output of the comparing unit is fed back to the floating diffusion of the unit pixel again, the signal line to the negative input of the comparing unit.

With this configuration, it is possible to reduce voltage components that are included in a pixel signal and generated due to the field-through discrepancy of a reset transistor. Therefore, it is possible to suppress the reduction in image quality of a picked-up image.

Note that the connection unit may include a MOSFET, the MOSFET driving as a switch that connects the signal line to any one of the two inputs of the comparing unit or disconnects the signal line from the two inputs of the comparing unit on the basis of a control signal supplied from the connection control unit.

Further, the connection control unit may control the connection unit to connect the signal line to a negative input of the comparing unit when an output of the comparing unit is fed back to a floating diffusion of the unit pixel, control the connection unit to connect the signal line to a positive input of the comparing unit when auto-zero processing is performed, and control the connection unit to connect the signal line to the negative input of the comparing unit when the output of the comparing unit is fed back to the floating diffusion of the unit pixel again.

Further, the signal processing apparatus may further include a reference voltage connection control unit that controls connection between a reference voltage and the two inputs of the comparing unit; and a reference voltage connection unit that connects the reference voltage to any one of the two inputs of the comparing unit or disconnects the reference voltage from the two inputs of the comparing unit in accordance with control of the reference voltage connection control unit.

Further, the signal processing apparatus may further include: a feedback line connection control unit that controls connection between an output of the comparing unit and the floating diffusion of the unit pixel; and a feedback line connection unit that connects the output of the comparing unit to the floating diffusion of the unit pixel or disconnects the output of the comparing unit from the floating diffusion of the unit pixel in accordance with control of the feedback line connection control unit.

Further, a plurality of unit pixels may be arranged in a matrix pattern in a pixel array, a plurality of unit pixel units being formed in the pixel array, the plurality of unit pixel units each including a part of the plurality of unit pixels of the pixel array, and the connection unit is provided for each unit pixel unit.

Further, the signal processing apparatus may further include a reset control unit that controls an operation of the reset transistor for each row of the unit pixel, in which the reset control unit connects the reset transistor provided for the row including the unit pixel to be processed in the pixel array when an output of the comparing unit is fed back to the floating diffusion of the unit pixel, and disconnects the reset transistor after the feedback is performed.

Further, the signal processing apparatus may further include: a signal line connection control unit that controls connection between a signal line and an input of the comparing unit, a signal read from the unit pixel being transmitted through the signal line; and a signal line connection unit that connects or disconnects the signal line to/from the input of the comparing unit in accordance with control of the signal line connection control unit.

Then, the signal line connection unit may be provided for each column of the unit pixel in a pixel array, a plurality of unit pixels being arranged in a matrix pattern in the pixel array.

Further, the signal line connection control unit may control the signal line connection unit provided for the column including the unit pixel to connect the signal line provided for the column of the unit pixel to the input of the comparing unit when an output of the comparing unit is fed back to the floating diffusion.

Further, the signal processing apparatus may further include: the comparing unit; and a counter that counts until a comparison result of the comparing unit is changed.

Further, the comparing unit and the counter may be provided for each of a plurality of unit pixel units, the plurality of unit pixel units each including a part of a plurality of unit pixels of a pixel array, the plurality of unit pixel units being formed in the pixel array, the plurality of unit pixels being arranged in a matrix pattern in the pixel array.

Further, the signal processing apparatus may further include a unit pixel group including a plurality of unit pixels.

The unit pixel group may form a pixel array, a plurality of unit pixels being arranged in a matrix pattern in the pixel array.

Further, a plurality of unit pixel units may be formed in the pixel array, the plurality of unit pixel units each including a part of the plurality of unit pixels of the pixel array.

<Image Sensor>

A main configuration example of an image sensor as an embodiment of the image sensor to which the present technology is applied is shown in FIG. 1. An image sensor 100 shown in FIG. 1 is a device that performs photoelectric conversion on light from an object and outputs it as image data. For example, the image sensor 100 is configured as a CMOS (Complementary Metal Oxide Semiconductor) image sensor using a CMOS, or a CCD (Charge Coupled Device) image sensor using a CCD.

As shown in FIG. 1, the image sensor 100 includes a pixel array 101, a VSL connection unit 102, an A/D conversion unit 103, a horizontal transfer unit 104, an FBL connection unit 105, a control unit 110, an area scanning unit 111, a VSL connection control unit 112, an A/D conversion control unit 113, a horizontal scanning unit 114, and an FBL connection control unit 115.

The pixel array 101 is a pixel area in which image configurations (unit pixels 121) including a photoelectric conversion device such as a photodiode are arranged in a flat form or curved form.

The VSL connection unit 102 is controlled by the VSL connection control unit 112, and connects or disconnects a vertical signal line (VSL) to/from the A/D conversion unit 103. A signal read from each unit pixel of the pixel array 101 is transmitted through the vertical signal line (VSL).

The A/D conversion unit 103 is controlled by the A/D conversion control unit 113, performs A/D conversion on an analog signal, and outputs the digital data to the horizontal transfer unit 104. The analog signal is read from each unit pixel of the pixel array 101, and transmitted through the vertical signal line (VSL).

The horizontal transfer unit 104 is controlled by the horizontal scanning unit 114, transfers the digital data supplied from the A/D conversion unit 103, and outputs it to a processing unit at the subsequent stage or the outside of the image sensor 100, for example.

The FBL connection unit 105 is controlled by the FBL connection control unit 115, and connects or disconnects an output of an amplifier (comparing unit to be described later) of the A/D conversion unit 103 to/from a floating diffusion (FD) of the unit pixel of the pixel array 101.

The control unit 110 controls the whole operation (operation of the respective units) of the image sensor 100 by controlling the area scanning unit 111 to the FBL connection control unit 115.

The area scanning unit 111 is controlled by the control unit 110, and controls the operation of a transistor of each unit pixel of the pixel array 101. The VSL connection control unit 112 is controlled by the control unit 110, and controls the operation of the respective units constituting the VSL connection unit 102. The A/D conversion control unit 113 is controlled by the control unit 110, and controls the operation of the respective units constituting the A/D conversion unit 103. The horizontal scanning unit 114 is controlled by the control unit 110, and controls the operation of the respective units constituting the horizontal transfer unit 104. The FBL connection control unit 115 is controlled by the control unit 110, and controls the operation of the respective units constituting the FBL connection unit 105.

<Pixel Array>

Figure 2:
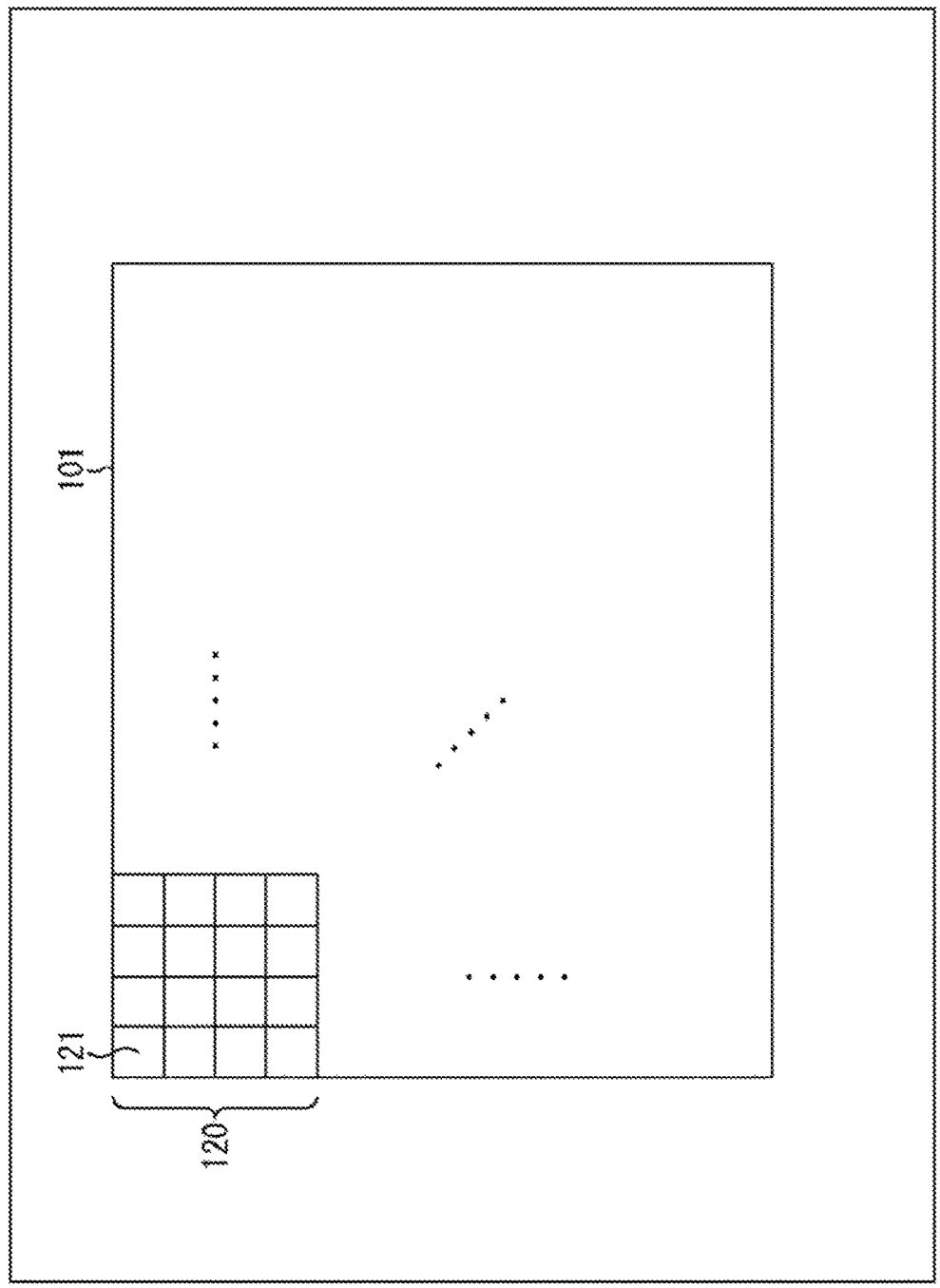
FIG. 2 A diagram for describing an example of a pixel unit.

A configuration example of the pixel array 101 is shown in FIG. 2. As shown in FIG. 2, the pixel array 101 is an area in which image configurations (unit pixels 121) including a photoelectric conversion device such as a photodiode are arranged in an array form. In the figure, arrangement of the unit pixels 121 in the horizontal direction represents the row, and arrangement of the unit pixels 121 in the vertical direction represents the column.

Each unit pixel 121 receives light from an object, performs photoelectric conversion on the incident light, stores charges, and outputs the charges as a pixel signal at predetermined timing.

Further, as shown in FIG. 2, in the pixel array 101, a plurality of pixel units 120 each including a plurality of unit pixels 121 are formed. That is, the pixel units 120 are each a unit pixel group included in a part area obtained by dividing the pixel area of the pixel array 101 into a plurality of areas. The size (number of unit pixels 121 included in the pixel unit 120) or shape of the pixel unit 120 can be arbitrarily set. Note that the size (number of unit pixels 121 included in the pixel unit 120) or shape of the pixel unit 120 does not need to be the same with each other.

For example, in the case of FIG. 2, the pixel unit 120 includes 4×4 (4 rows 4 columns) unit pixels 121. However, the pixel unit 120 may include 1×8, 2×2, 2×4, 4×2, 4×8, 8×4, 8×8, 8×1, or 16×16 unit pixels 121. It goes without saying that the size of the pixel unit 120 is not limited to this example. Further, although only one pixel unit 120 is shown in FIG. 2, the pixel units 120 are actually formed in the whole pixel array 101. That is, each unit pixel 121 belongs to any of the pixel units 120.

Further, although each unit pixel 121 is shown as a square having the same size in FIG. 2, the size or shape of each unit pixel 121 can be arbitrarily set. The unit pixel 121 does not need to have a square shape, and the same size and shape.

<Configuration of Unit Pixel>

Figure 3:
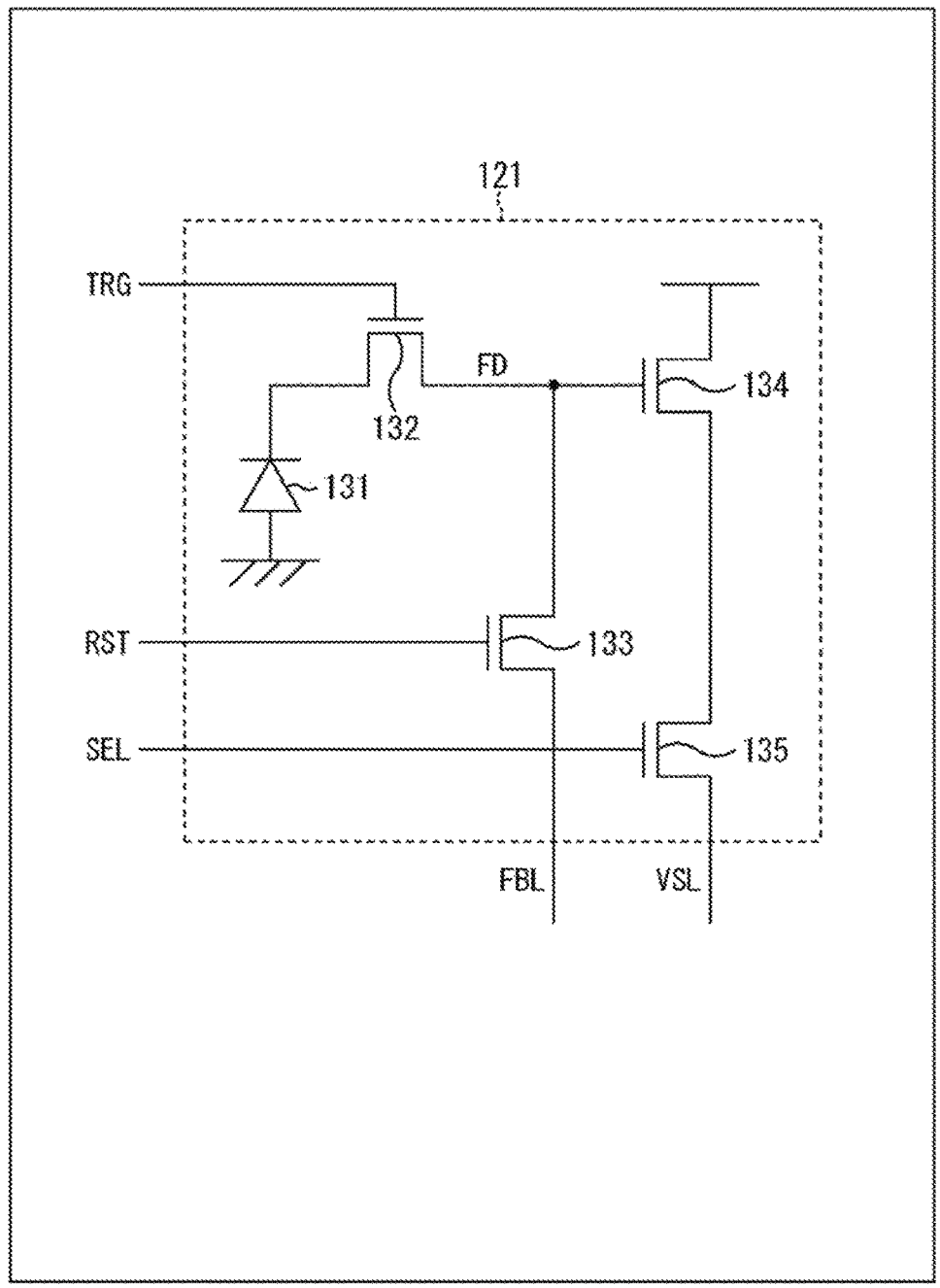
FIG. 3 A diagram showing a main configuration example of a unit pixel.

FIG. 3 is a diagram showing a main configuration example of the circuit configuration of the unit pixel 121. In the case of the example shown in FIG. 3, the unit pixel 121 includes a photodiode (PD) 131, a transfer transistor 132, a reset transistor 133, an amplification transistor 134, and a select transistor 135.

The photodiode (PD) 131 photoelectrically converts received light into photocharges (herein, photoelectrons) having the amount of charges corresponding to the light amount, and stores the photocharges. The anode electrode of the photodiode (PD) 131 is connected to the ground of the pixel area (pixel ground), and the cathode electrode of the photodiode (PD) 131 is connected to a floating diffusion (FD) via the transfer transistor 132. It goes without saying that a method in which the cathode electrode of the photodiode (PD) 131 is connected to a power supply of the pixel area (pixel power source), the anode electrode of the photodiode (PD) 131 is connected to the floating diffusion (FD) via the transfer transistor 132, and the photocharges are read as photoholes may be used.

The transfer transistor 132 controls reading of photocharges from the photodiode (PD) 131. The drain electrode of the transfer transistor 132 is connected to the floating diffusion, and the source electrode of the transfer transistor 132 is connected to the cathode electrode of the photodiode (PD) 131. Further, to the gate electrode of the transfer transistor 132, a transfer control line (TRG) is connected. A transfer control signal supplied from the area scanning unit 111 (FIG. 1) is transmitted through the transfer control line (TRG). When the transfer control line (TRG) (i.e., the gate potential of the transfer transistor 132) is in an off-state, photocharges are not transferred from the photodiode (PD) 131 (photocharges are stored in the photodiode (PD) 131). The transfer control line (TRG) (i.e., the gate potential of the transfer transistor 132) is in an on-state, the photocharges stored in the photodiode (PD) 131 are transferred to the floating diffusion (FD).

The reset transistor 133 resets the potential of the floating diffusion (FD). The source electrode of the reset transistor 133 is connected to the floating diffusion (FD). Further, to the gate electrode of the reset transistor 133, a reset control line (RST) is connected. A reset control signal supplied from the area scanning unit 111 (FIG. 1) is transmitted through the reset control line (RST). Then, to the drain electrode of the reset transistor 133, a feedback line (FBL) is connected. An output signal of an amplifier (comparing unit) constituting the A/D conversion unit 103 is transmitted through the feedback line (FBL) via the FBL connection unit 105. When the reset control signal (RST) (i.e., the gate potential of the reset transistor 133) is in an off-state, the floating diffusion (FD) is cut off from the feedback line (FBL). That is, to the floating diffusion (FD), the output of the amplifier (output of the comparing unit) of the A/D conversion unit 103 is not fed back. When the reset control signal (RST) (i.e., the gate potential of the reset transistor 133) is in an on-state, the output of the amplifier (output of the comparing unit) of the A/D conversion unit 103 can be supplied to the floating diffusion (FD), and it is possible to reset the floating diffusion (FD) with the output of the amplifier (potential).

The amplification transistor 134 amplifies the potential change of the floating diffusion (FD), and outputs it as an electric signal (analog signal). The gate electrode of the amplification transistor 134 is connected to the floating diffusion (FD), the drain electrode of the amplification transistor 134 is connected to a source follower power supply voltage, and the source electrode of the amplification transistor 134 is connected to the drain electrode of the select transistor 135. For example, the amplification transistor 134 outputs the potential of the floating diffusion (FD) reset by the reset transistor 133 to the select transistor 135 as a reset signal (reset level). Further, the amplification transistor 134 outputs, to the select transistor 135 as an optical storage signal (signal level), the potential of the floating diffusion (FD) to which photocharges are transferred by the transfer transistor 132.

The select transistor 135 controls the output to a vertical signal line VSL of an electric signal supplied from the amplification transistor 134 (i.e., the A/D conversion unit 103). The drain electrode of the select transistor 135 is connected to the source electrode of the amplification transistor 134, and the source electrode of the select transistor 135 is connected to the vertical signal line VSL. Further, to the gate electrode of the select transistor 135, a select control line (SEL) is connected. A select control signal supplied from the area scanning unit 111 (FIG. 1) is transmitted through the select control line (SEL). When the select control signal (SEL) (i.e., the gate potential of the select transistor 135) is in an off-state, the amplification transistor 134 and the vertical signal line VSL are electrically cut off from each other. Therefore, in this state, a reset signal, a pixel signal, and the like are not output from the unit pixel 121. When the select control signal (SEL) (i.e., the gate potential of the select transistor 135) is in an on-state, the unit pixel 121 is in a selected state. That is, the amplification transistor 134 and the vertical signal line VSL are electrically connected to each other, and the signal output from the amplification transistor 134 is supplied to the vertical signal line VSL as a pixel signal of the unit pixel 121. Specifically, a reset signal, a pixel signal, and the like are read from the unit pixel 121.

<VSL Connection Unit, A/D Conversion Unit, FBL Connection Unit>

Figure 4:
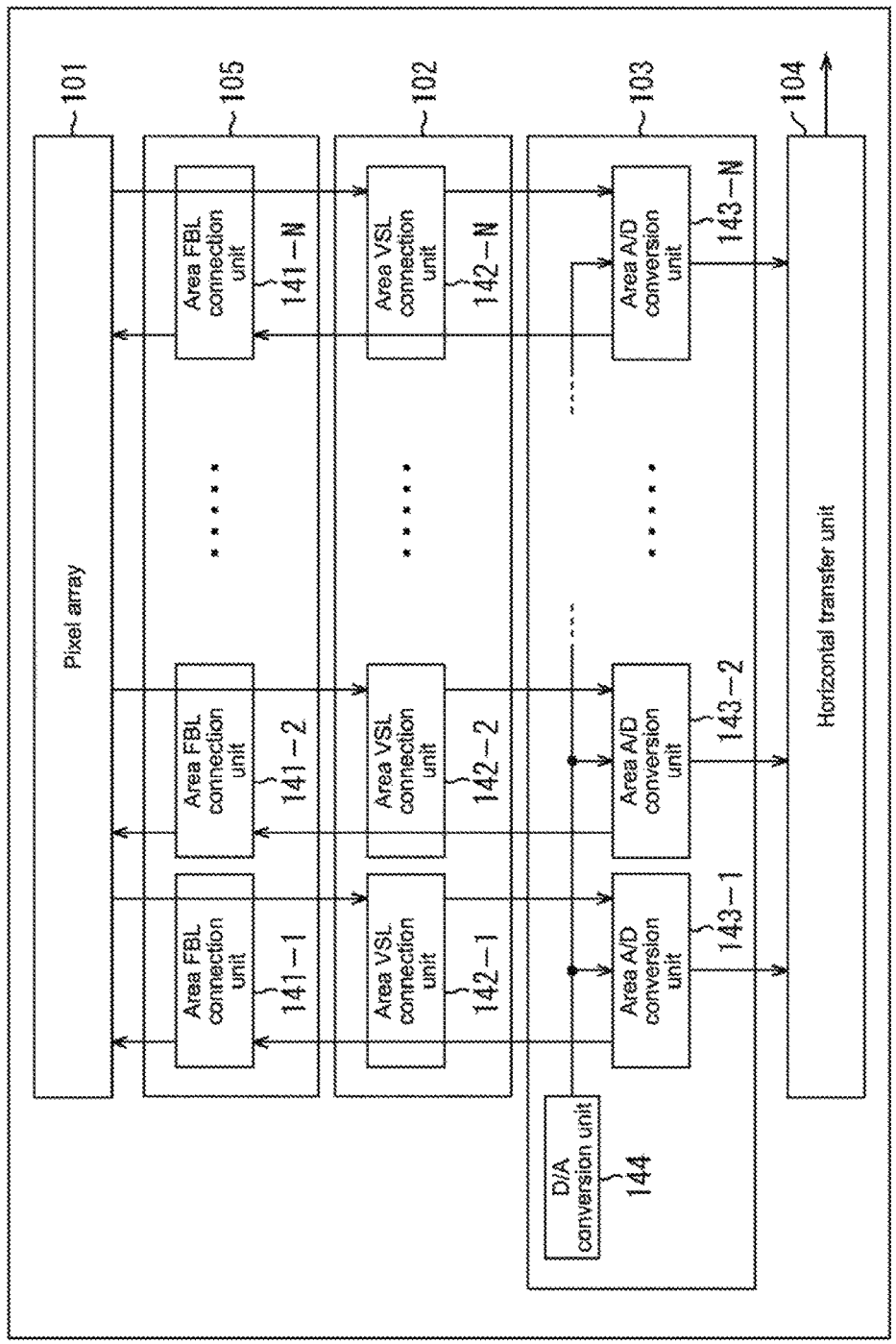
FIG. 4 A diagram showing a main configuration example of respective units of the image sensor.

FIG. 4 is a block diagram showing a main configuration example of the VSL connection unit 102, the A/D conversion unit 103, and the FBL connection unit 105. Note that in the following, description will be made as N (N indicates an arbitrary natural number) pixel units 120 are formed in the pixel array 101.

As shown in FIG. 4, the VSL connection unit 102 includes an area VSL connection unit 142-1 to an area VSL connection unit 142-N. In the case where the area VSL connection unit 142-1 to the area VSL connection unit 142-N do not need to be distinguished for explanation, they are referred to as the area VSL connection unit 142.

Similarly, the A/D conversion unit 103 includes an area A/D conversion unit 143-1 to an area A/D conversion unit 143-N. In the case where the area A/D conversion unit 143-1 to the area A/D conversion unit 143-N do not need to be distinguished for explanation, they are referred to as the area A/D conversion unit 143. Note that the A/D conversion unit 103 further includes a D/A conversion unit (DAC) 144 that generates a ramp wave as a reference voltage. The D/A conversion unit (DAC) 144 supplies the generated ramp wave to each area A/D conversion unit 143 as a reference voltage.

Further, similarly, the FBL connection unit 105 includes an area FBL connection unit 141-1 to an area FBL connection unit 141-N. In the case where the area FBL connection unit 141-1 to the area FBL connection unit 141-N do not need to be distinguished for explanation, they are referred to as the area FBL connection unit 141.

The area VSL connection unit 142-1 to the area VSL connection unit 142-N, the area A/D conversion unit 143-1 to the area A/D conversion unit 143-N, and the area FBL connection unit 141-1 to the area FBL connection unit 141-N are associated with the different pixel units 120 (a pixel unit 120-1 to a pixel unit 120-N) of the pixel array 101, and each perform processing on the corresponding pixel unit 120.

That is, the vertical signal line (VSL) of each pixel unit 120 of the pixel array is connected to the corresponding area A/D conversion unit 143 via the corresponding area VSL connection unit 142. Further, the feedback signal line (FBL) of each area A/D conversion unit 143 is connected to the corresponding pixel unit 120 via the corresponding area FBL connection unit 141.

Each area FBL connection unit 141 connects or disconnects the feedback line (FBL) to/from the floating diffusion (FD) of the unit pixel 121 of the corresponding pixel unit 120 of the pixel array 101 in accordance with control of the FBL connection control unit 115 (FIG. 1). The output of an amplifier (comparing unit to be described later) of the corresponding area A/D conversion unit 143 is transmitted through the feedback line (FBL).

Each area VSL connection unit 142 connects or disconnects the vertical signal line (VSL) of the unit pixel 121 of the corresponding pixel unit 120 of the pixel array 101 to/from the corresponding area A/D conversion unit 143 in accordance with control of the VSL connection control unit 112 (FIG. 1).

Each area A/D conversion unit 143 compares the signal level of a signal read from the unit pixel 121 of the corresponding pixel unit 120 with a ramp wave (reference voltage) supplied from the D/A conversion unit (DAC) 144, in accordance with control of the A/D conversion control unit 113 (FIG. 1). The signal is transmitted through the vertical signal line (VSL). Each area A/D conversion unit 143 supplies the comparison result to the horizontal transfer unit 104 as digital data. Further, each area A/D conversion unit 143 supplies the comparison result to the floating diffusion (FD) of the unit pixel 121 of the corresponding pixel unit 120 via the corresponding area FBL connection unit 141-1.

For example, the area FBL connection unit 141-1, the area VSL connection unit 142-1, and the area A/D conversion unit 143-1 perform processing on the pixel unit 120-1 (not shown). Further, for example, the area FBL connection unit 141-2, the area VSL connection unit 142-2, and the area A/D conversion unit 143-2 perform processing on the pixel unit 120-2 (not shown). Similarly, for example, the area FBL connection unit 141-N, the area VSL connection unit 142-N, and the area A/D conversion unit 143-N perform processing on the pixel unit 120-N (not shown).

As described above, the pixel array 101 or the reading circuit thereof is configured for each pixel unit 120, and processing is performed for each pixel unit 120 in parallel.

<Substrate Configuration>

Figure 5:
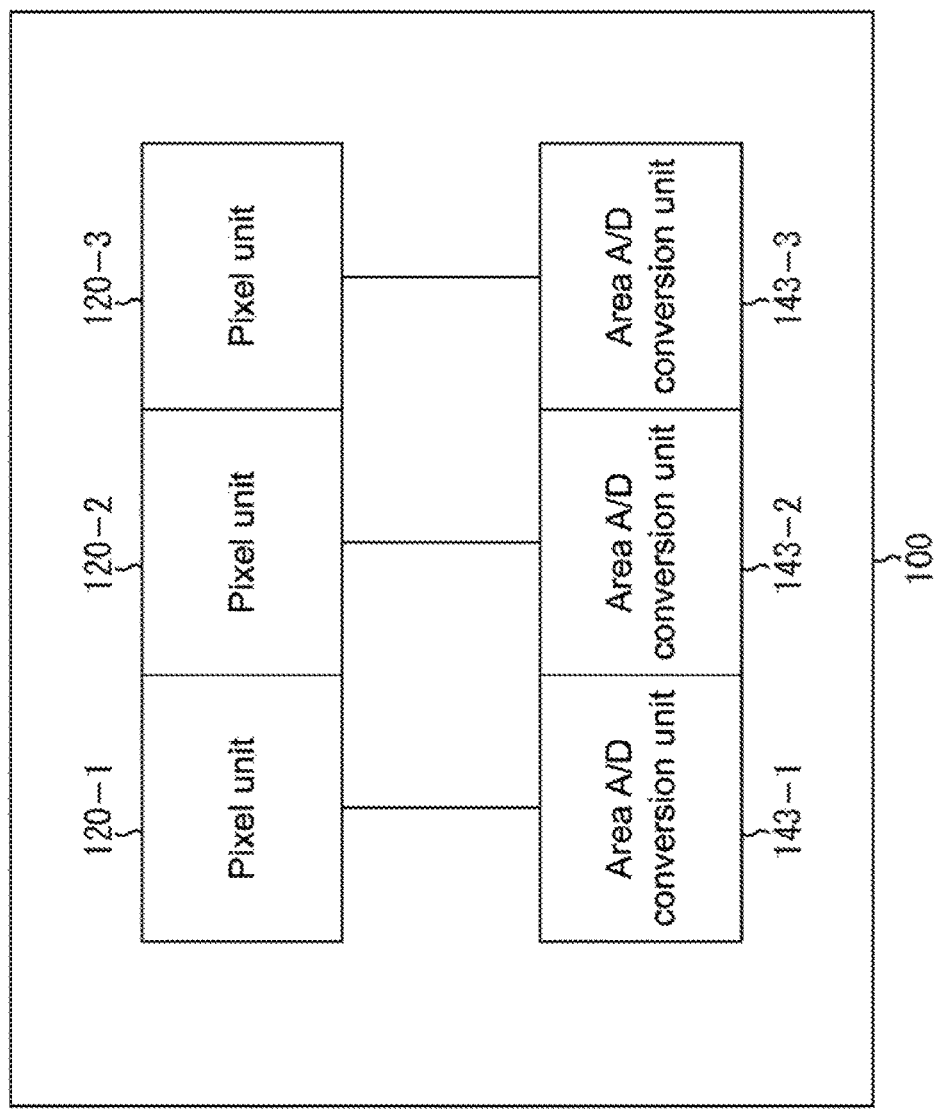
FIG. 5 A diagram showing a main configuration example of the image sensor.

The configuration of the image sensor 100 shown in FIG. 1 may be formed on a single semiconductor substrate as shown in FIG. 5, for example. That is, the reading circuit such as the A/D conversion unit 103 may be formed on the same semiconductor substrate as that on which the pixel array 101 (i.e., the configuration of the pixel area) is formed. Note that although illustration of other configurations shown in FIG. 1 such as the VSL connection unit 102 and the FBL connection unit 105 is omitted in FIG. 5, also these configurations are actually formed on the same semiconductor substrate. It goes without saying that configurations other than those shown in FIG. 1 may be formed on the same semiconductor substrate.

Figure 6:
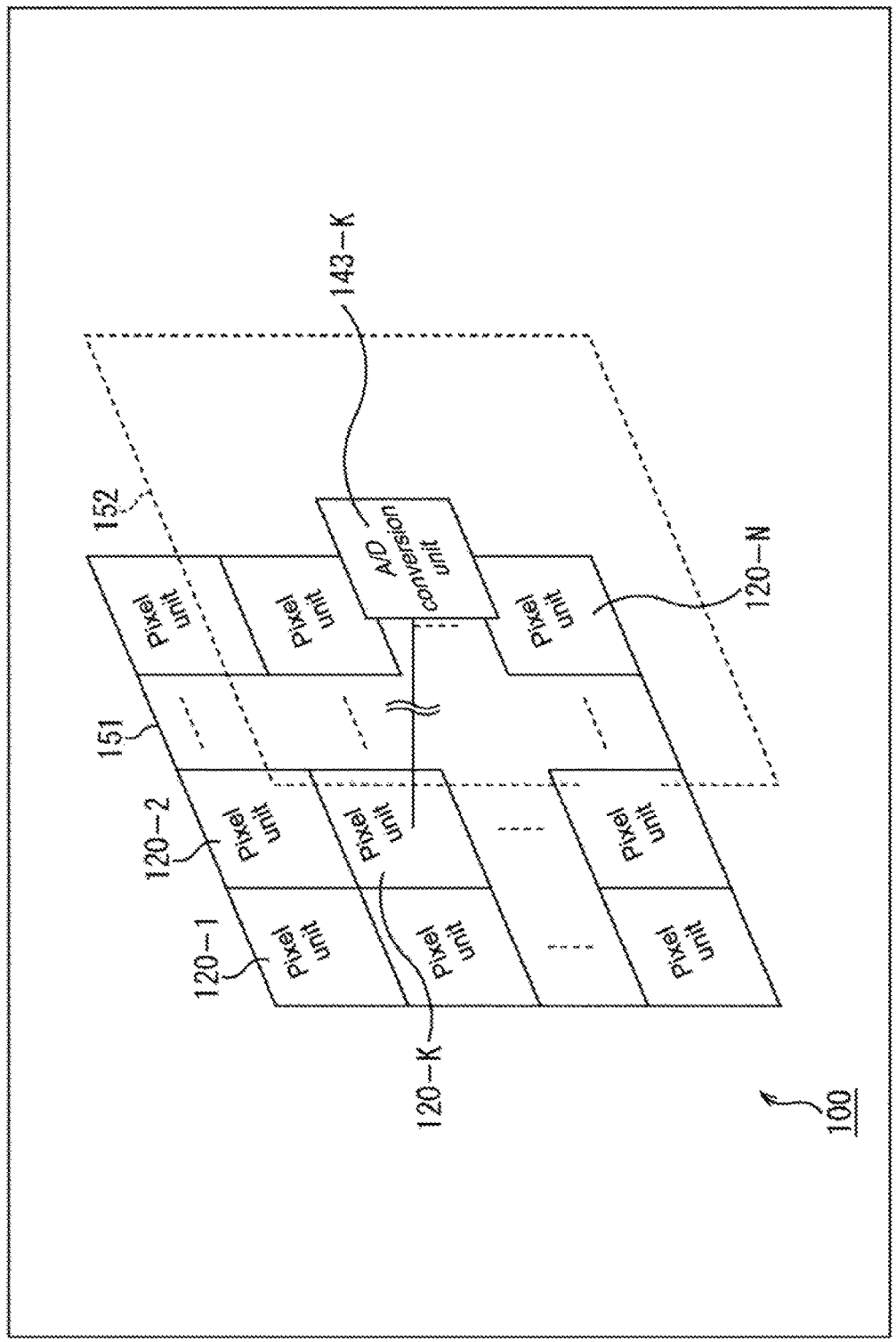
FIG. 6 A diagram showing a main configuration example of the image sensor.

Further, the circuit configuration of the image sensor 100 may be formed on two semiconductor substrates superimposed one on another (laminated chip (a pixel substrate 151 and a circuit substrate 152)) as shown in FIG. 6, for example.

That is, the configuration of the image sensor 100 shown in FIG. 1 may be formed on a plurality of semiconductor substrates. For example, the image sensor 100 includes two semiconductor substrates superimposed one on another (laminated chip (the pixel substrate 151 and the circuit substrate 152)) as shown in FIG. 6, for example, and the circuit configuration shown in FIG. 1 may be formed on the semiconductor substrates.

For example, the pixel area (i.e., the pixel array 101) may be formed on the pixel substrate 151, and the reading circuit such as the A/D conversion unit 103 may be formed on the circuit substrate 152. In the case of the example shown in FIG. 6, N pixel units 120 (the pixel unit 120-1 to the pixel unit 120-N) are formed. On the circuit substrate 152, the area A/D conversion units 143 corresponding to the pixel units 120 are formed. Note that although illustration of other configurations shown in FIG. 1 such as the VSL connection unit 102 and the FBL connection unit 105 is omitted in FIG. 6, also these configurations are actually formed on the pixel substrate 151 or the circuit substrate 152. These configurations may be formed either on the pixel substrate 151 or on the circuit substrate 152. However, by forming as many configurations as possible on the circuit substrate 152, it is possible to make the pixel area (the pixel array 101) larger in the pixel substrate 151. Accordingly, it is possible to improve the sensitivity of the pixel.

That is, for example, the FBL connection control unit 115, the FBL connection unit 105, and a comparing unit 171 and a counter 172 to be described later may be formed on the circuit substrate 152 different from the pixel substrate 151 on which the pixel array 101 is formed.

Further, the pixel substrate 151 and the circuit substrate 152 do not need to have the same size and shape, and may include a non-superimposed portion. It should be noted that by arranging the pixel units 120 and the reading circuits such as the area A/D conversion units 143 corresponding thereto so that the distance between them is as low as possible, it is possible to shorten the wiring distance. Accordingly, it is possible to make the wiring or device layout easy. Further, it is possible to suppress the increase in cost.

Further, by providing the A/D conversion unit (the area A/D conversion unit 143) for each pixel unit 120 including a plurality of rows and columns of unit pixels 121 as shown in the example of FIG. 6, it is possible to reduce the number of connections (e.g., micro-bumps or TSVs) between substrates to one or several. Therefore, it does not need to ensure the area for connection according to the pixel pitch. Further, because the number of connections is low, yield improvement can be expected.

Note that the number (layer number) of semiconductor substrates (laminated chip) can be arbitrarily set, and may be three or more. In this case, the FBL connection unit 105 may be formed on a semiconductor substrate different from that on which the pixel array 101 to the horizontal transfer unit 104 are formed. Further, the FBL connection control unit 115 may be formed on the same semiconductor substrate as that on which the FBL connection unit 105 is formed. Further, the VSL connection unit 102 or the VSL connection control unit 112 may be formed on the same semiconductor substrate as that on which the FBL connection unit 105 is formed. Further, the A/D conversion unit 103 or the A/D conversion control unit 113 may be formed on the same semiconductor substrate as that on which the FBL connection unit 105 is formed. Further, also the horizontal transfer unit 104 or the horizontal scanning unit 114 may be formed on the same semiconductor substrate as that on which the FBL connection unit 105 is formed. Further, also the pixel array 101 or the area scanning unit 111 may be formed on the same semiconductor substrate as that on which the FBL connection unit 105 is formed. Further, the control unit 110 may be formed on the same semiconductor substrate as that on which the FBL connection unit 105 is formed.

Specifically, the FBL connection unit 105 may be formed on the same semiconductor substrate as that on which any of other configurations shown in FIG. 1 is formed, or on a semiconductor substrate different from that on which any of other configurations shown in FIG. 1 is formed.

<Configuration in Units of Pixel Units>

Figure 7:
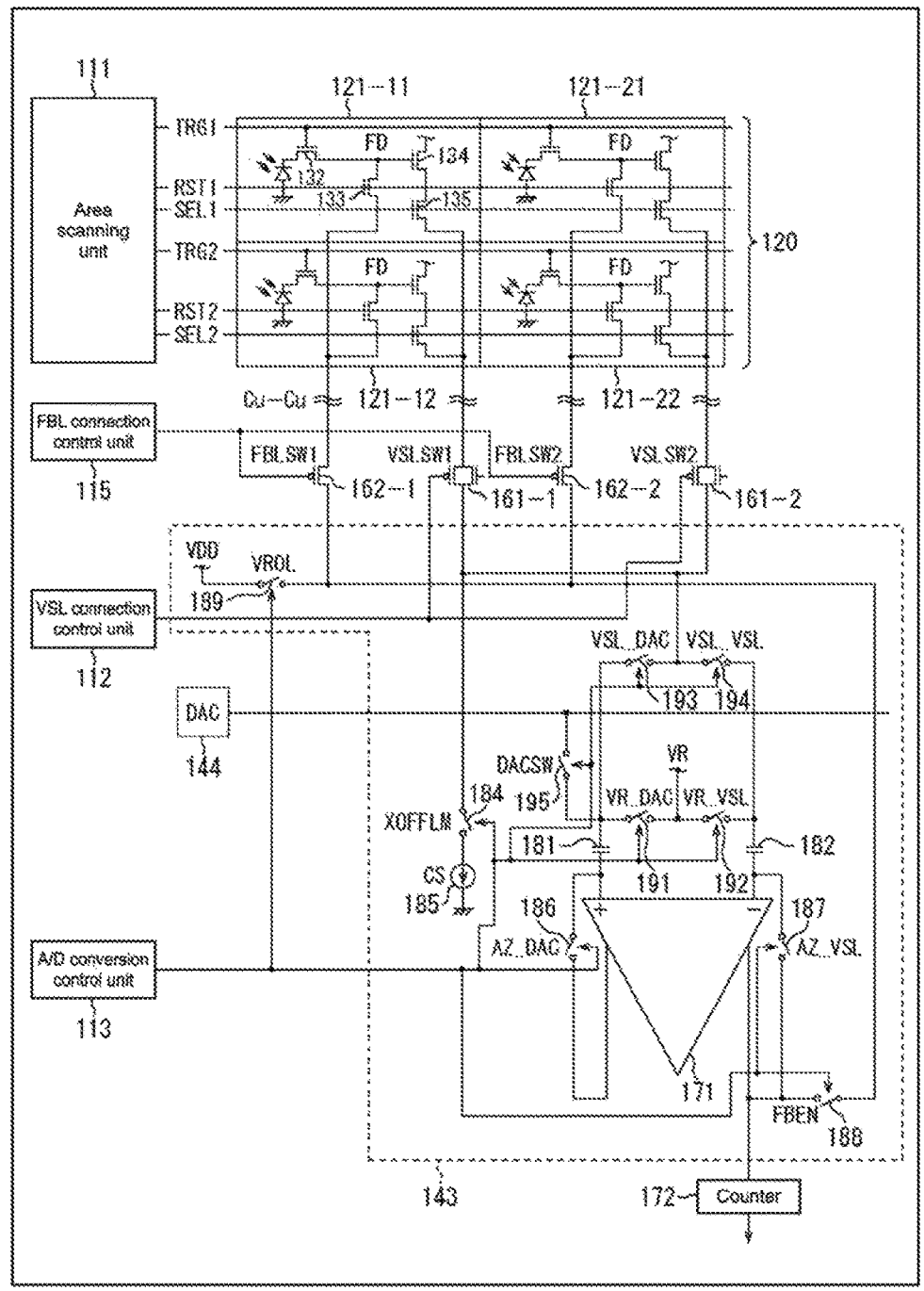
FIG. 7 A diagram showing a main configuration example of an amount corresponding to one pixel unit.

FIG. 7 is a diagram showing a configuration example of the pixel array 101 in an amount corresponding to one pixel unit and a reading circuit corresponding to the pixel unit 120.

In the example of FIG. 7, the pixel unit 120 includes two rows and two columns of unit pixels 121 (a unit pixel 121-11, a unit pixel 121-21, a unit pixel 121-12, and a unit pixel 121-22). Although the number of unit pixels of the pixel unit 120 can be arbitarily set as described above, description will be made with this example in the following.

Each unit pixel 121 has such a configuration as the example described with reference to FIG. 3. The area scanning unit 111 and each unit pixel 121 are connected to each other via the transfer control line (TRG), the reset control line (RST), and the select control line (SEL). These control lines are wired for each row of unit pixels. For example, the unit pixel 121-11 and the unit pixel 121-21 are connected to a transfer control line (TRG1), a reset control line (RST1), and a select control line (SEL1). Further, for example, the unit pixel 121-12 and the unit pixel 121-22 are connected to a transfer control line (TRG2), a reset control line (RST2), and a select control line (SEL2).

The area scanning unit 111 supplies a transfer control signal (TRG1) to the gate electrode of the transfer transistor 132 of the unit pixel 121-21 and the unit pixel 121-21 through the transfer control line (TRG1). Similarly, the area scanning unit 111 supplies a transfer control signal (TRG2) to the gate electrode of the transfer transistor 132 of the unit pixel 121-12 and the unit pixel 121-22 through the transfer control line (TRG2).

Further, the area scanning unit 111 supplies a reset control signal (RST1) to the gate electrode of the reset transistor 133 of the unit pixel 121-11 and the unit pixel 121-21 through the reset control line (RST1). Similarly, the area scanning unit 111 supplies a reset control signal (RST2) to the gate electrode of the reset transistor 133 of the unit pixel 121-12 and the unit pixel 121-22 through the reset control line (RST2).

Further, the area scanning unit 111 supplies a select control signal (SEL1) to the gate electrode of the select transistor 135 of the unit pixel 121-11 and the unit pixel 121-21 through the select control line (SEL1). Similarly, the area scanning unit 111 supplies a select control signal (SEL2) to the gate electrode of the select transistor 135 of the unit pixel 121-12 and the unit pixel 121-22 through the select control line (SEL2).

Further, as shown in FIG. 7, the image sensor 100 includes a VSL switch 161-1 and a VSL switch 161-2 as the configuration of the area VSL connection unit 142 (FIG. 4). In the case where the VSL switch 161-1 and the VSL switch 161-2 do not need to be distinguished for explanation, they are referred to as the VSL switch 161. The configuration of the VSL switch 161 can be arbitrarily set, and may include a MOSFET, for example. In this case, to the gate electrode of the VSL switch 161, a VSL connection control signal (VSLSW) is supplied from the VSL connection control unit 112. The VSL switch 161 connects or disconnects the vertical signal line (VSL) on the side of the unit pixel 121 to/from the vertical signal line (VSL) on the side of the comparing unit 171 to be described later on the basis of the value of the VSL connection control signal (VSLSW).

In the case of the example of FIG. 7, the VSL switch 161 is provided for each column of the unit pixels 121. That is, the VSL switch 161-1 is formed on a vertical signal line (VSL1) that connects the unit pixel 121-11 and the unit pixel 121-12 to the comparing unit 171. To the gate electrode of the VSL switch 161-1, a VSL connection control signal (VSLSW1) is supplied from the VSL connection control unit 112. For example, when both terminals of a VSL_VSL switch 194 to be described later are short-circuited, both terminals of the VSL switch 161-1 are short-circuited, and the source electrode of the amplification transistor 134 of one of the unit pixel 121-11 and the unit pixel 121-12, which is selected by the area scanning unit 111 (for which the select control signal (SEL) is turned on), and a capacitor 182 are connected to each other via the vertical signal line (VSL) in the case where the VSL connection control signal (VSLSW1) is on. On the contrary, in the case where the VSL connection control signal (VSLSW1) is off, the VSL switch 161-1 cuts off the connection between both terminals. Therefore, the connection between the amplification transistor 134 and the capacitor 182 is cut off.

The VSL switch 161-2 is formed on a vertical signal line (VSL2) that connects the unit pixel 121-21 and the unit pixel 121-22 to the comparing unit 171. To the gate electrode of the VSL switch 161-2, a VSL connection control signal (VSLSW2) is supplied from the VSL connection control unit 112. For example, when both terminals of the VSL_VSL switch 194 to be described later are short-circuited, both terminals of the VSL switch 161-2 are short-circuited, and the source electrode of the amplification transistor 134 of one of the unit pixel 121-21 and the unit pixel 121-22, which is selected by the area scanning unit 111 (for which the select control signal (SEL) is turned on), and the capacitor 182 are connected to each other via the vertical signal line (VSL) in the case where the VSL connection control signal (VSLSW2) is on. On the contrary, in the case where the VSL connection control signal (VSLSW2) is off, the VSL switch 161-2 cuts off the connection between both terminals. Therefore, the connection between the amplification transistor 134 and the capacitor 182 is cut off.

Further, as shown in FIG. 7, the image sensor 100 includes an FBL switch 162-1 and an FBL switch 162-2 as the configuration of the area FBL connection unit 141 (FIG. 4). In the case where the FBL switch 162-1 and the FBL switch 162-2 do not need to be distinguished for explanation, they are referred to as the FBL switch 162. The configuration of the FBL switch 162 can be arbitrarily set, and may include a MOSFET, for example. In this case, to the gate electrode thereof, an FBL connection control signal (FBLSW) is supplied from the FBL connection control unit 115. The FBL switch 162 connects or disconnects the feedback line (FBL) on the side of the unit pixel 121 to/from the feedback line (FBL) on the output side of the comparing unit 171 to be described later on the basis of the value of the FBL connection control signal (FBLSW).

In the case of the example of FIG. 7, the FBL switch 162 is provided for each column of the unit pixels 121. That is, the FBL switch 162-1 is formed on a feedback line (FBL1) that connects the unit pixel 121-11 and the unit pixel 121-12 to the output of the comparing unit 171 (in other words, an FBEN switch 188). To the gate electrode of the FBL switch 162-1, an FBL connection control signal (FBLSW1) is supplied from the FBL connection control unit 115. For example, in the case where the FBL connection control signal (FBLSW1) is on, both terminals of the FBL switch 162-1 are short-circuited, and the drain electrode of the reset transistor 133 of one of the unit pixel 121-11 and the unit pixel 121-12, which is selected by the area scanning unit 111 (for which the select control signal (SEL) is turned on), and the FBEN switch 188 are connected to each other via the feedback line (FBL1). On the contrary, in the case where the FBL connection control signal (FBLSW1) is off, the FBL switch 162-1 cuts off the connection between both terminals. Therefore, the connection between the reset transistor 133 and the FBEN switch 188 is cut off.

The FBL switch 162-2 is formed on a feedback line (FBL2) that connects the unit pixel 121-21 and the unit pixel 121-22 to the output of the comparing unit 171 (in other words, the FBEN switch 188). To the gate electrode of the FBL switch 162-2, an FBL connection control signal (FBLSW2) is supplied from the FBL connection control unit 115. For example, in the case where the FBL connection control signal (FBLSW2) is on, both terminals of the FBL switch 162-2 are short-circuited, and the drain electrode of the reset transistor 133 of one of the unit pixel 121-21 and the unit pixel 121-22, which is selected by the area scanning unit 111 (for which the select control signal (SEL) is turned on), and the FBEN switch 188 are connected to each other via the feedback line (FBL2). On the contrary, in the case where the FBL connection control signal (FBLSW2) is off, the FBL switch 162-2 cuts off the connection between terminals. Therefore, the connection between the reset transistor 133 and the FBEN switch 188 is cut off.

Further, as shown in FIG. 7, the image sensor 100 includes the comparing unit 171, the counter 172, a capacitor 181, the capacitor 182, an XOFFLM switch 184, a current source 185, an AZ_DAC switch 186, an AZ_VSL switch 187, the FBEN switch 188, and a VROL switch 189 as the configuration of the area A/D conversion unit 143 (FIG. 4).

The comparing unit 171 includes two inputs of a negative input and a positive input, compares the signal levels of signals input from the two inputs with each other, and outputs the comparison result (information representing which signal level is high (or low)). For example, the comparing unit 171 compares the signal level of the signal read from the unit pixel 121 with the reference voltage (ramp wave) supplied from the D/A conversion unit (DAC) 144, and outputs information representing the value of a larger one (comparing result). That is, in this case, the reference voltage (ramp wave) is input from the D/A conversion unit (DAC) 144 to one input of the comparing unit 171, and a signal read from (transmitted through the vertical signal line (VSL)) any one of the unit pixels 121 of the pixel unit 120 (one of the unit pixel 121-11 to the unit pixel 121-22, which is selected by the area scanning unit 111) is input to the other input of the comparing unit 171. The comparing unit 171 supplies the comparing result to the counter 172.

The counter 172 counts from when the comparing unit 171 starts the comparison to when the comparison result supplied from the comparing unit 171 changes. When the input comparison result changes, the counter 172 outputs the count value (digital data) obtained at that time to the horizontal transfer unit 104 (FIG. 1). This count value represents the signal level of a signal read from the unit pixel 121. That is, an analog signal is converted into digital data.

Note that in the following, the positive input of the comparing unit 171 is referred to also as the input on the side of DAC (or DAC side input), and the negative input of the comparing unit 171 is referred to also as the input on the side of VSL (or VSL side input).

The capacitor 181 is a capacitance connected in series in front of the DAC side input (positive input) in order to cancel the offset error, for example. That is, the reference voltage (ramp wave) supplied from the D/A conversion unit (DAC) 144 is input to the DAC side input of the comparing unit 171 via the capacitor 181.

The capacitor 182 is a capacitance connected in series in front of the VSL side input (negative input) in order to cancel the offset error, for example. That is, the signal read from the unit pixel 121 is input to the VSL side input of the comparing unit 171 via the capacitor 182.

The XOFFLM switch 184 connects or disconnects the vertical signal line (VSL) to/from the current source 185 formed as a burden, in accordance with control of the A/D conversion control unit 113. The configuration of the XOFFLM switch 184 can be arbitrarily set, and may include a MOSFET, for example. In this case, to the gate electrode thereof, an XOFFLM connection control signal (XOFFLM) is supplied from the A/D conversion control unit 113.

The AZ_DAC switch 186 connects or disconnects the output of the comparing unit 171 to/from the DAC side input on the basis of control of the A/D conversion control unit 113. The AZ_VSL switch 187 connects or disconnects the output of the comparing unit 171 to/from the VSL side input on the basis of control of the A/D conversion control unit 113. The configuration of the AZ_DAC switch 186 and the AZ_VSL switch 187 can be arbitrarily set, and may include a MOSFET, for example. In this case, an AZ connection control signal (AZ_DAC) is supplied from the A/D conversion control unit 113 to the gate electrode of the AZ_DAC switch 186, and an AZ connection control signal (AZ_VSL) is supplied from the A/D conversion control unit 113 to the gate electrode of the AZ_VSL switch 187.

For example, in the case where auto-zero is performed, the A/D conversion control unit 113 turns on the AZ connection control signals (AZ_DAC and AZ_VSL). Accordingly, the AZ_DAC switch 186 and the AZ_VSL switch 187 cause the input and output of the comparing unit 171 to be short-circuited.

The FBEN switch 188 is formed on the feedback line (FBL), and connects or disconnects the feedback line (FBL) on the output side of the comparing unit 171 to/from the feedback line (FBL) on the side of the FBL switch 162 on the basis of control of the A/D conversion control unit 113. The configuration of the FBEN switch 188 can be arbitrarily set, and may include a MOSFET, for example. In this case, to the gate electrode thereof, an FBEN connection control signal (FBEN) is supplied from the A/D conversion control unit 113.

For example, in the case where the FBEN connection control signal (FBEN) is on, both terminals of the FBEN switch 188 are short-circuited, and the output of the comparing unit 171 (comparison result) is supplied to each FBL switch 162. In the case where the FBL switch 162 is short-circuited, the comparison result is supplied to the floating diffusion (FD) of the unit pixel 121 in the row selected by the area scanning unit 111 and in the unit pixel column corresponding to the FBL switch 162. On the contrary, in the case where the FBEN connection control signal (FBEN) is off, the FBEN switch 188 cuts off the connection between both terminals. Therefore, the connection between the output of the comparing unit 171 and the FBL switch 162 is cut off.

The VROL switch 189 connects or disconnects a predetermined power supply potential VDD to/from the feedback line (FBL) on the basis of control of the A/D conversion control unit 113. The configuration of the VROL switch 189 can be arbitrarily set, and may include a MOSFET, for example. In this case, to the gate electrode thereof, a VROL connection control signal (VROL) is supplied from the A/D conversion control unit 113.

Further, as shown in FIG. 7, the image sensor 100 includes a VR_DAC switch 191, a VR_VSL switch 192, a VSL_DAC switch 193, the VSL_VSL switch 194, and a DACSW switch 195 as the configuration of the area A/D conversion unit 143 (FIG. 4).

The VR_DAC switch 191 connects or disconnects a reference voltage VR to/from the DAC side input of the comparing unit 171 (in other words, the capacitor 181) on the basis of control of the A/D conversion control unit 113. The configuration of the VR_DAC switch 191 can be arbitrarily set, and may include a MOSFET, for example. In this case, to the gate electrode thereof, a VR_DAC connection control signal (VR_DAC) is supplied from the A/D conversion control unit 113. For example, in the case where the VR_DAC connection control signal (VR_DAC) is on, both terminals of the VR_DAC switch 191 are short-circuited, and the reference voltage VR is applied to the DAC side input of the comparing unit 171. On the contrary, in the case where the VR_DAC connection control signal (VR_DAC) is off, the connection between both terminals of the VR_DAC switch 191 is cut off. Therefore, the application of the reference voltage VR to the DAC side input of the comparing unit 171 is stopped.

The VR_VSL switch 192 connects or disconnects the reference voltage VR to/from the VSL side input of the comparing unit 171 (in other words, the capacitor 182) on the basis of control of the A/D conversion control unit 113. The configuration of the VR_VSL switch 192 can be arbitrarily set, and may include a MOSFET, for example. In this case, to the gate electrode thereof, a VR_DAC connection control signal (VR_VSL) is supplied from the A/D conversion control unit 113. For example, in the case where the VR_VSL connection control signal (VR_VSL) is on, both terminals of the VR_VSL switch 192 are short-circuited, and the reference voltage VR is applied to the VSL side input of the comparing unit 171. On the contrary, in the case where the VR_VSL connection control signal (VR_VSL) is off, the connection between both terminals of the VR_VSL switch 192 is cut off. Therefore, the application of the reference voltage VR to the VSL side input of the comparing unit 171 is stopped.

The VSL_DAC switch 193 connects or disconnects the vertical signal line (VSL) on the side of the unit pixel to/from the vertical signal line (VSL) on the side of the DAC side input of the comparing unit 171 on the basis of control of the A/D conversion control unit 113. In other words, the VSL_DAC switch 193 connects or disconnects the VSL switch 161 to/from the capacitor 181 on the basis of control of the A/D conversion control unit 113. The configuration of the VSL_DAC switch 193 can be arbitrarily set, and may include a MOSFET, for example. In this case, to the gate electrode thereof, a VSL_DAC connection control signal (VSL_DAC) is supplied from the A/D conversion control unit 113. For example, in the case where the VSL_DAC connection control signal (VSL_DAC) is on, both terminals of the VSL_DAC switch 193 are short-circuited, and the VSL switch 161 and the capacitor 181 are connected to each other. On the contrary, in the case where the VSL_DAC connection control signal (VSL_DAC) is off, the connection between both terminals of the VSL_DAC switch 193 is cut off. Therefore, the connection between the VSL switch 161 and the capacitor 181 is cut off.

The VSL_VSL switch 194 connects or disconnects the vertical signal line (VSL) on the side of the unit pixel to/from the vertical signal line (VSL) on the side of the VSL side input of the comparing unit 171 on the basis of control of the A/D conversion control unit 113. In other words, the VSL_VSL switch 194 connects or disconnects the VSL switch 161 to/from the capacitor 182 on the basis of control of the A/D conversion control unit 113. The configuration of the VSL_VSL switch 194 can be arbitrarily set, and may include a MOSFET, for example. In this case, to the gate electrode thereof, a VSL_VSL connection control signal (VSL_VSL) is supplied from the A/D conversion control unit 113. For example, in the case where the VSL_VSL connection control signal (VSL_VSL) is on, both terminals of the VSL_VSL switch 194 are short-circuited, and the VSL switch 161 and the capacitor 182 are connected to each other. On the contrary, in the case where the VSL_VSL connection control signal (VSL_VSL) is off, the connection between both terminals of the VSL_VSL switch 194 is cut off. Therefore, the connection between the VSL switch 161 and the capacitor 182 is cut off.

The DACSW switch 195 connects or disconnects a signal line to/from the vertical signal line (VSL) on the DAC side input of the comparing unit 171 on the basis of control of the A/D conversion control unit 113. The reference voltage (ramp wave) generated in the D/A conversion unit (DAC) 144 is transmitted through the signal line. In other words, the DACSW switch 195 connects or disconnects the D/A conversion unit (DAC) 144 to/from the capacitor 181 on the basis of control of the A/D conversion control unit 113. The configuration of the DACSW switch 195 can be arbitrarily set, and may include a MOSFET, for example. In this case, to the gate electrode thereof, a DACSW connection control signal (DACSW) is supplied from the A/D conversion control unit 113. For example, in the case where the DACSW connection control signal (DACSW) is on, both terminals of the DACSW switch 195 are short-circuited, and the D/A conversion unit (DAC) 144 and the capacitor 181 are connected to each other. On the contrary, in the case where the DACSW connection control signal (DACSW) is off, the connection between both terminals of the DACSW switch 195 is cut off. Therefore, the connection between the D/A conversion unit (DAC) 144 and the capacitor 181 is cut off.

Note that, the area scanning unit 111, the VSL connection control unit 112, the A/D conversion control unit 113, and the FBL connection control unit 115 operate under control of the control unit 110.

The image sensor 100 has such a configuration for each pixel unit 120. Note that the area scanning unit 111, the VSL connection control unit 112, the A/D conversion control unit 113, the FBL connection control unit 115, and the D/A conversion unit (DAC) 144 may be provided for each pixel unit 120, and control the configuration of the pixel unit 120 to which they are assigned (and the configuration of the reading circuit corresponding to the pixel unit 120). Alternatively, they may be assigned to a plurality of pixel units 120, and control the configuration of the plurality of pixel units 120 (and the configuration of the reading circuit corresponding to the pixel units 120). For example, one area scanning unit 111, one VSL connection control unit 112, one A/D conversion control unit 113, one FBL connection control unit 115, and one D/A conversion unit (DAC) 144 may be provided to the image sensor 100, and control the configuration of all pixel units 120.

<Flow of Imaging Control Processing>

Flow of processing performed by the image sensor 100 having the above-mentioned configuration will be described. With reference to the flowchart of FIG. 8, flow of imaging control processing performed by the image sensor 100 when a picked-up image is acquired, for example, will be described with reference to the flowchart of FIG. 8.

When the imaging control processing is started, the control unit 110 controls the area scanning unit 111, and selects the pixel unit 120, which is not processed, in Step S101.

In Step S102, the control unit 110 performs feedback phase processing for the pixel unit 120 selected in Step S101 to suppress discrepancy in the threshold value of the amplification transistor 134 or feedthrough discrepancy of the reset transistor 133.

The image sensor 100 performs correlated double sampling (CDS) in reading of a pixel signal. Specifically, in Step S103, the control unit 110 performs preset read phase processing for the pixel unit 120 selected in Step S101 to suppress dark current noise and the like.

In Step S104, the control unit 110 controls the area scanning unit 111, and transfers charges stored in the photodiode (PD) 131 of each unit pixel 121 of the pixel unit 120 selected in Step S101 to the floating diffusion (FD).

In Step S105, the control unit 110 performs data read phase processing in which a pixel signal is read, for the pixel unit 120 selected in Step S101.

In Step S106, the control unit 110 determines whether or not all pixel units 120 of the pixel array 101 have been processed. In the case where it is determined that there is the pixel unit 120, which is not processed, the processing returns to Step S101 and the subsequent processing is repeated.

Further, in the case where it is determined that all pixel units 120 of the pixel array 101 have been processed in Step S106, the imaging control processing is finished.

Figure 9:
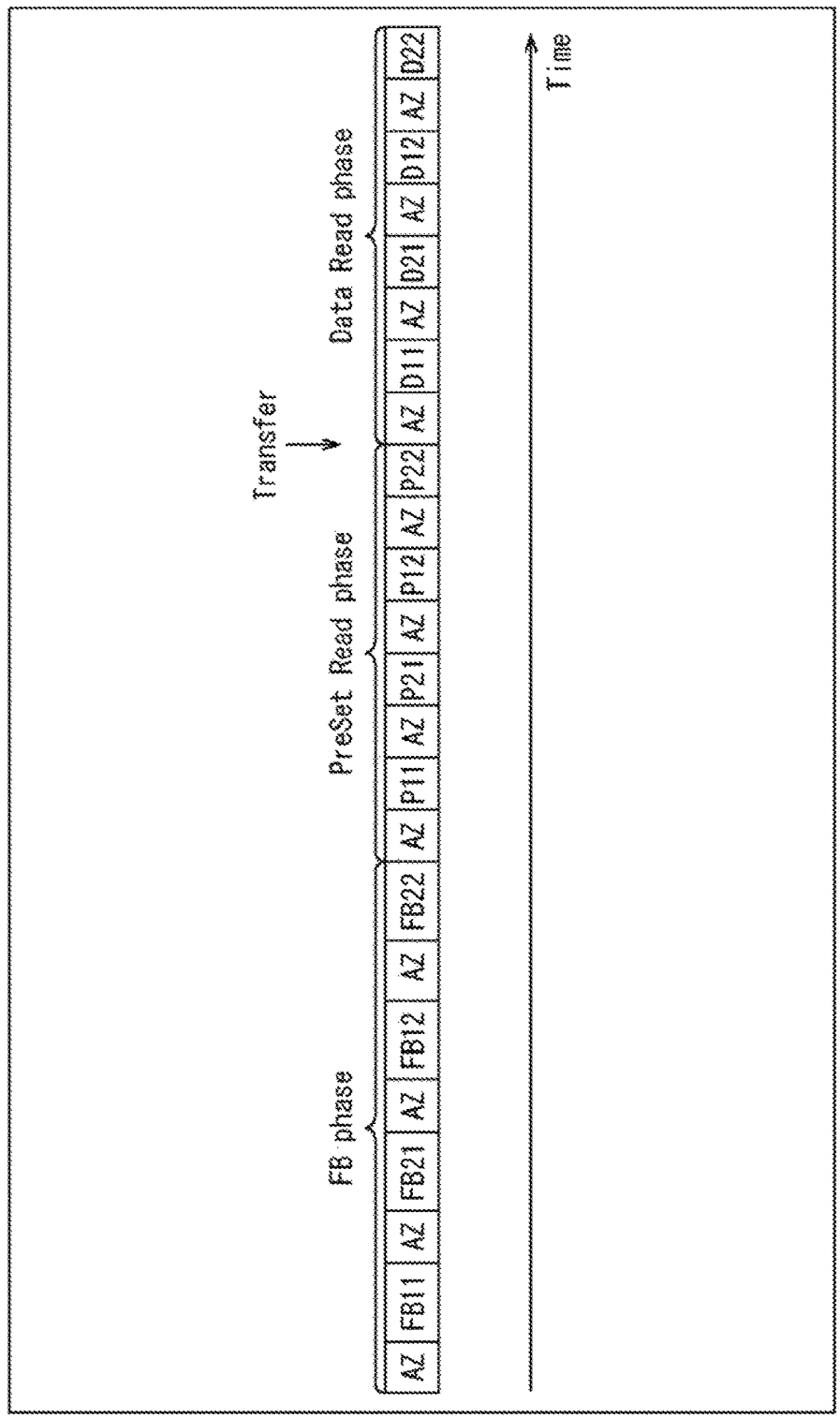
FIG. 9 A timing chart showing an example of the imaging state.

That is, as shown in FIG. 9, the feedback phase processing (FB phase), preset read phase processing (PreSet Read phase), charge transfer (Transfer), and data read phase processing (Data Read phase) are performed for each pixel unit 120.

Further, as shown in FIG. 9, the feedback phase processing (FB phase), preset read phase processing (PreSet Read phase), and data read phase processing (Data Read phase) are performed for all unit pixels 121 in the pixel unit 120. Further, during the processing for each unit pixel, auto-zero processing (AZ) is performed.

<Flow of Feedback Phase Processing>

Figure 10:
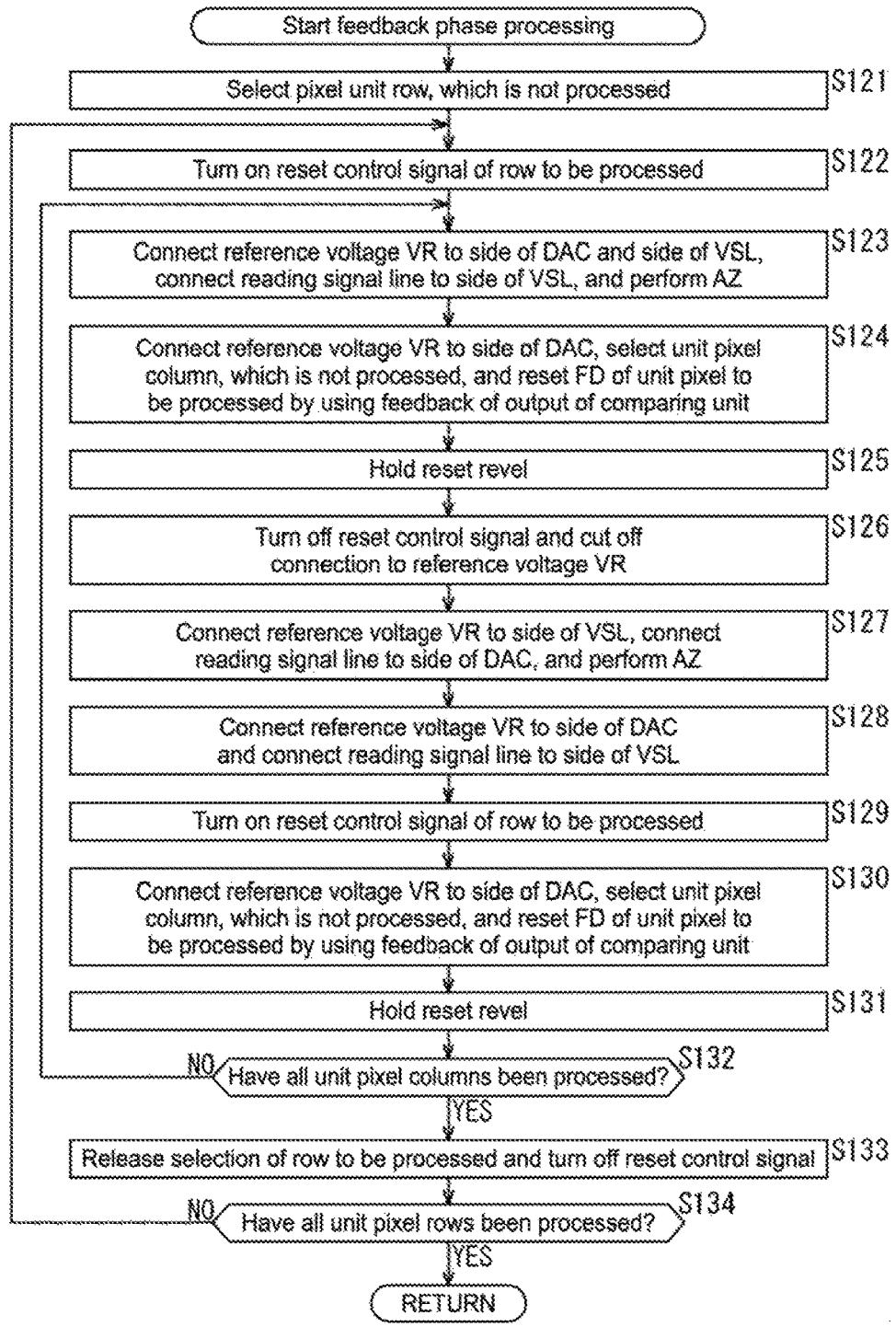
FIG. 10 A flowchart describing an example of flow of feedback phase processing.

Next, with reference to the flowchart of FIG. 10, an example of flow of the feedback phase processing performed in Step S102 in FIG. 8 will be described. As described above, this feedback phase processing is performed for each pixel unit 120.

When the feedback phase processing is started, the control unit 110 controls the area scanning unit 111, and selects, as a processing target, a unit pixel row (row of the unit pixels 121), which is not processed, of the pixel unit 120 to be processed, in Step S121. For example, the area scanning unit 111 turns on the select control signal (SEL) of any one of unit pixel rows for which processing is not performed yet.

In Step S122, the control unit 110 controls the area scanning unit 111, and turns on the reset control signal (RST) of the unit pixel row to be processed, which is selected in Step S121.

In Step S123, the control unit 110 controls the A/D conversion control unit 113 or the like to connect the reference voltage VR to the side of DAC and the side of VSL, connect the vertical signal line (VSL) on the side of the unit pixel to the vertical signal line (VSL) on the side of the VSL side input of the comparing unit 171, and perform auto-zero processing (AZ). For example, the A/D conversion control unit 113 turns on the VR_DAC connection control signal (VR_DAC) and the VR_VSL connection control signal (VR_VSL), turns on the VSL_VSL connection control signal (VSL_VSL), and turns on the AZ connection control signals (AZ_DAC and AZ_VSL) for the area A/D conversion unit 143 corresponding to the pixel unit 120 to be processed.

In Step S124, the control unit 110 controls the A/D conversion control unit 113 to connect the reference voltage VR to the side of DAC, connect the vertical signal line (VSL) on the side of the unit pixel to the vertical signal line (VSL) on the side of the VSL side input of the comparing unit 171, controls the VSL connection control unit 112 to select, as a processing target, a unit pixel column (column of the unit pixels 121), which is not processed, and controls the A/D conversion control unit 113 and the FBL connection control unit 115 to reset the floating diffusion (FD) of the unit pixel to be processed by using feedback of the output of the comparing unit. For example, the A/D conversion control unit 113 turns off the VR_VSL connection control signal (VR_VSL) while keeping the VR_DAC connection control signal (VR_DAC) on, and keeps the VSL_VSL connection control signal (VSL_VSL) on for the area A/D conversion unit 143 corresponding to the pixel unit 120 to be processed. Further, the VSL connection control unit 112 turns on any of the VSL connection control signals (VSLSW) of the pixel unit 120 to be processed. Accordingly, one unit pixel 121 in the unit pixel row to be processed is selected as a processing target. Further, the A/D conversion control unit 113 turns on the FBEN connection control signal (FBEN). Further, the FBL connection control unit 115 turns on the FBL connection control signal (FBLSW) of the column for which the VSL connection control signal (VSLSW) is turned on.

In Step S125, the control unit 110 controls the VSL connection control unit 112, the A/D conversion control unit 113, and the FBL connection control unit 115 to cause the floating diffusion (FD) of the unit pixel 121 to be processed to hold the reset level. For example, the VSL connection control unit 112 turns off the VSL connection control signal (VSLSW) that has been turned off in Step S124. Further, for example, the A/D conversion control unit 113 turns off the FBEN connection control signal (FBEN) that has been turned on in Step S124. Further, for example, the FBL connection control unit 115 turns off the FBL connection control signal (FBLSW) that has been turned on in Step S124.

In Step S126, the control unit 110 controls the area scanning unit 111 to turn off the reset control signal (RST) that has been turned on in Step S122, and controls the A/D conversion control unit 113 to cut off the connection to the reference voltage VR. For example, the A/D conversion control unit 113 turns off the VR_DAC connection control signal (VR_DAC).

In Step S127, the control unit 110 controls the VSL connection control unit 112 and the A/D conversion control unit 113 to connect the reference voltage VR to the side of VSL, connect the vertical signal line (VSL) on the side of the unit pixel to the vertical signal line (VSL) on the side of the DAC side input of the comparing unit 171, select the unit pixel column selected in Step S124, and perform auto-zero processing (AZ). For example, the A/D conversion control unit 113 turns on the VR_VSL connection control signal (VR_VSL), turns on the VSL_DAC connection control signal (VSL_DAC), and turns on the AZ connection control signals (AZ_DAC and AZ_VSL) for the area A/D conversion unit 143 corresponding to the pixel unit 120 to be processed. Further, the VSL connection control unit 112 turns on the VSL connection control signal (VSLSW) corresponding to the unit pixel column selected in Step S124.

In Step S128, the control unit 110 controls the A/D conversion control unit 113 to connect the reference voltage VR to side of DAC and connect the vertical signal line (VSL) on the side of the unit pixel to the vertical signal line (VSL) on the side of the VSL side input of the comparing unit 171. For example, the A/D conversion control unit 113 turns on the VR_DAC connection control signal (VR_DAC), turns off the VR_VSL connection control signal (VR_VSL), and turns off the VSL_DAC connection control signal (VSL_DAC) for the area A/D conversion unit 143 corresponding to the pixel unit 120 to be processed.

In Step S129, the control unit 110 controls the area scanning unit 111 to turn on the reset control signal (RST) of the unit pixel row to be processed, which is selected in Step S121.

In Step S130, the control unit 110 controls the VSL connection control unit 112 to select, as a processing target, a unit pixel column (column of the unit pixels 121), which is not processed, and controls the A/D conversion control unit 113 and the FBL connection control unit 115 to reset the floating diffusion (FD) of the unit pixel to be processed by using feedback of the output of the comparing unit. For example, the VSL connection control unit 112 turns on any of the VSL connection control signals (VSLSW) of the pixel unit 120 to be processed. Accordingly, one unit pixel 121 in the unit pixel row to be processed is selected as a processing target. Further, the A/D conversion control unit 113 turns on the FBEN connection control signal (FBEN). Further, the FBL connection control unit 115 turns on the FBL connection control signal (FBLSW) of the column for which the VSL connection control signal (VSLSW) is turned on.

In Step S131, the control unit 110 controls the VSL connection control unit 112, the A/D conversion control unit 113, and the FBL connection control unit 115 to cause the floating diffusion (FD) of the unit pixel 121 to be processed to hold the reset level. For example, the VSL connection control unit 112 turns off the VSL connection control signal (VSLSW) that has been turned on in Step S130. Further, for example, the A/D conversion control unit 113 turns off the FBEN connection control signal (FBEN) that has been turned on in Step S130. Further, for example, the FBL connection control unit 115 turns off the FBL connection control signal (FBLSW) that has been turned on in Step S130.

In Step S132, the control unit 110 determines whether or not all unit pixel columns of the unit pixel row to be processed of the pixel unit 120 to be processed have been processed. In the case where it is determined that there is a unit pixel column, which is not processed, the processing returns to Step S123, and the subsequent processing is repeated. Further, in the case where it is determined that all unit pixel columns of the unit pixel row to be processed have been processed in Step S132, the processing proceeds to Step S133.

That is, the processing of Step S123 to Step S132 is performed for all unit pixels 121 of the unit pixel row to be processed of the pixel unit 120 to be processed. Then, when one unit pixel row is processed, processing is performed for the next unit pixel row.

In Step S133, the control unit 110 controls the area scanning unit 111 to release the selection of a row to be processed, which is performed in Step S121. For example, the area scanning unit 111 turns off the select control signal (SEL) that has been turned on in Step S121, and turns off the reset control signal (RST) that has been turned on in Step S129.

In Step S134, the control unit 110 determines whether or not all unit pixel rows have been processed for the pixel unit 120 to be processed. In the case where it is determined that there is a unit pixel row, which is not processed, the processing returns to Step S121, and the subsequent processing is repeated. Further, in the case where it is determined that all unit pixel rows of the pixel unit 120 to be processed (i.e., all unit pixels 121 of the pixel unit 120 to be processed) have been processed in Step S134, the feedback phase processing is finished, and the processing returns to FIG. 8.

That is, the processing of Step S121 to Step S134 is performed for each unit pixel row of the pixel unit 120 to be processed. Then, when all unit pixel rows are processed, the processing proceeds to the next phase (preset read phase processing).

<Timing Chart of Feedback Phase>

Figure 11:
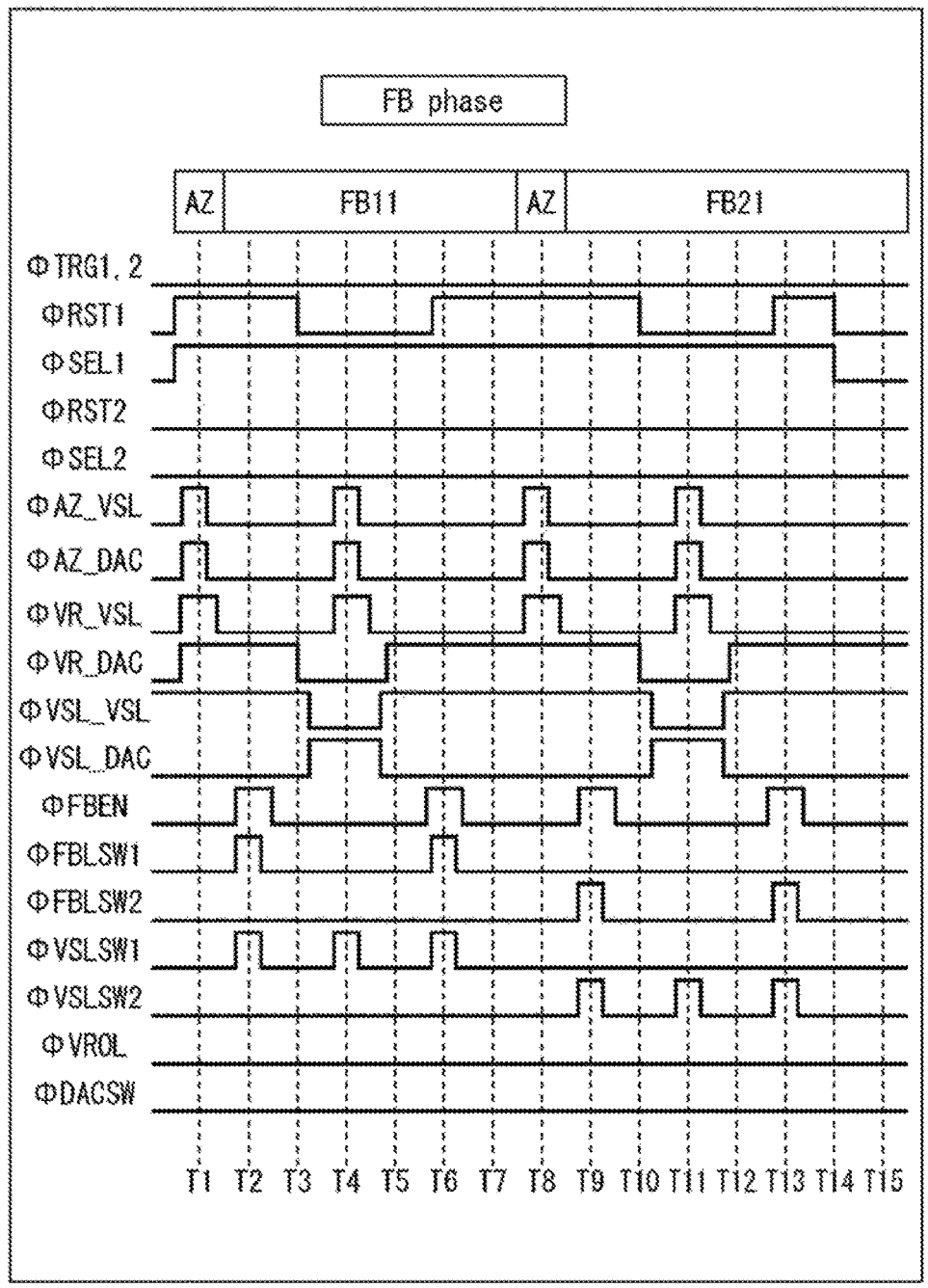
FIG. 11 A timing chart showing an example of the feedback phase state.

FIG. 11 is a timing chart showing an example of flow of the feedback phase processing for the unit pixel 121-11 and the unit pixel 121-21 of the pixel unit 120.

In this case, as shown in FIG. 11, a select control signal (ΦSEL1) is turned on (step S121) and a reset control signal (ΦRST1) it turned on (Step S122).

After that, auto-zero processing (AZ) is performed at a time T1 (Step S123). At this time, a VR_VSL connection control signal (ΦVR_VSL), a VR_DAC connection control signal (ΦVR_DAC), a VSL_VSL connection control signal (ΦVSL_VSL), and AZ connection control signals (ΦAZ_DAC and ΦAZ_VSL) are turned on.

Figure 12:
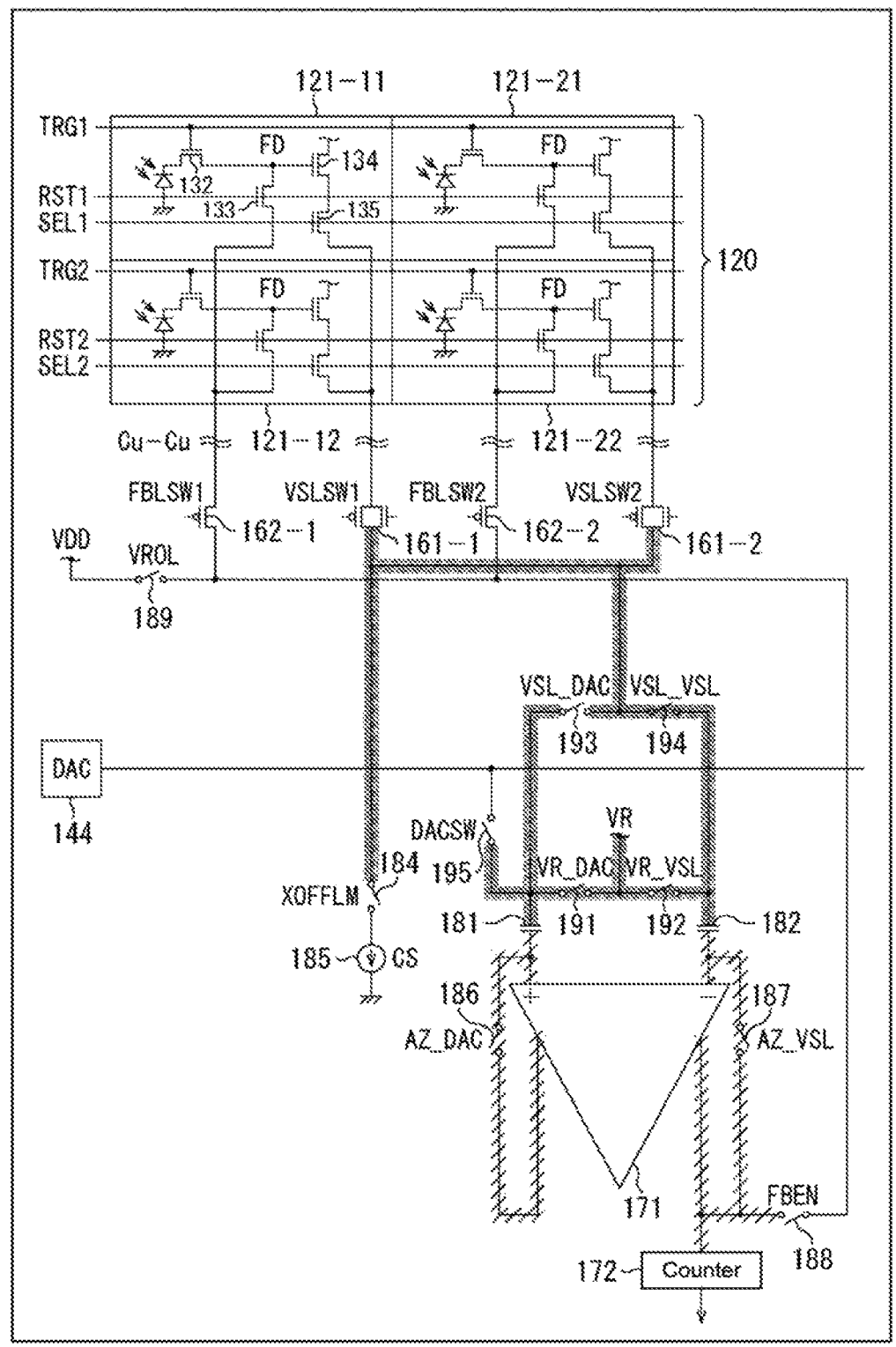
FIG. 12 A diagram showing an example of the state at a time T1.

Accordingly, as shown in FIG. 12, the input and output of the comparing unit 171 are short-circuited, and a power supply potential VR is applied between the VSL switch 161 and the capacitor 182 of the vertical signal line (VSL).

When auto-zero processing is performed, then, each processing (FB11) for the unit pixel 121-11 is performed.

At a time T2, the VR_VSL connection control signal (ΦVR_VSL) is turned off while keeping the VR_DAC connection control signal (ΦVR_DAC) on, and the on-state of the VSL_VSL connection control signal (ΦVSL_VSL) is maintained for the area A/D conversion unit 143 corresponding to the pixel unit 120 to be processed. Further, a VSL connection control signal (ΦVSLSW1) is turned on. Accordingly, the unit pixel 121-11 is selected as a processing target. Further, an FBEN connection control signal (ΦFBEN) is turned on, and an FBL connection control signal (ΦFBLSW1) corresponding to the unit pixel 121-11 is turned on (Step S124).

Figure 13:
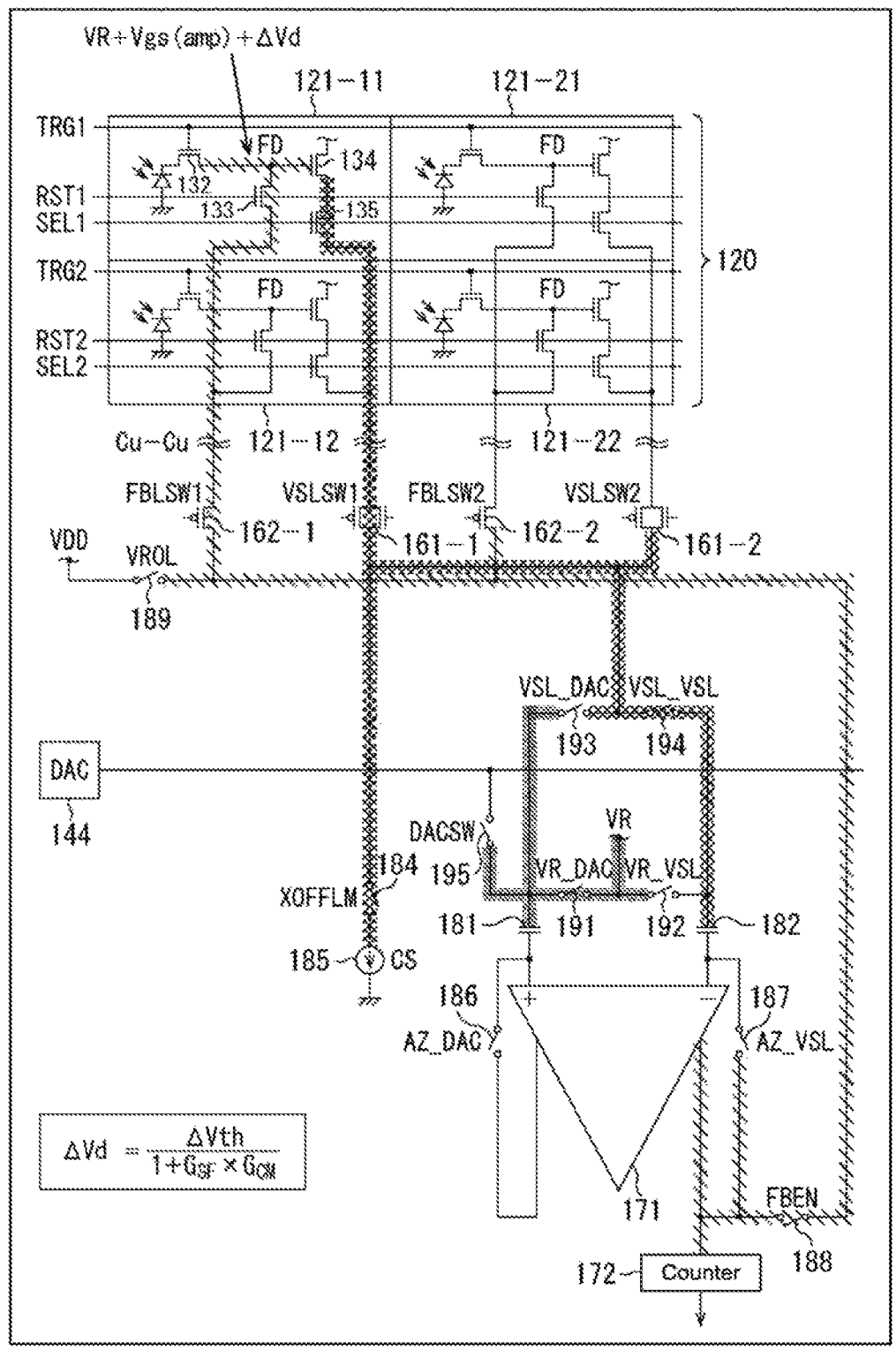
FIG. 13 A diagram showing an example of the state at a time T2.

Accordingly, as shown in FIG. 13, the output of the comparing unit 171 is fed back to the floating diffusion (FD) of the unit pixel 121-11 as a reset level. Further, the reset revel is read, and supplied to the VSL side input terminal of the comparing unit 171.

At this time, the reset level of the floating diffusion (FD) held by the unit pixel 121-11 can be represented as VR+Vgs(amp)+ΔVd.

ΔVd represents the error in a signal level Vd of the output of the comparing unit 171 (comparison result), and can be obtained using the following formula (1).

$$\Delta Vd = \Delta Vth/(1+G_{SF} \times G_{CM}) \quad (1)$$

For example, when the error ΔVth in the threshold value voltage Vth of the amplification transistor 134 is 100 [mV], $G_{CM}$ is 30, and $G_{SF}$ is 0.9, ΔVd is 3.6 [mV].

Figure 14:
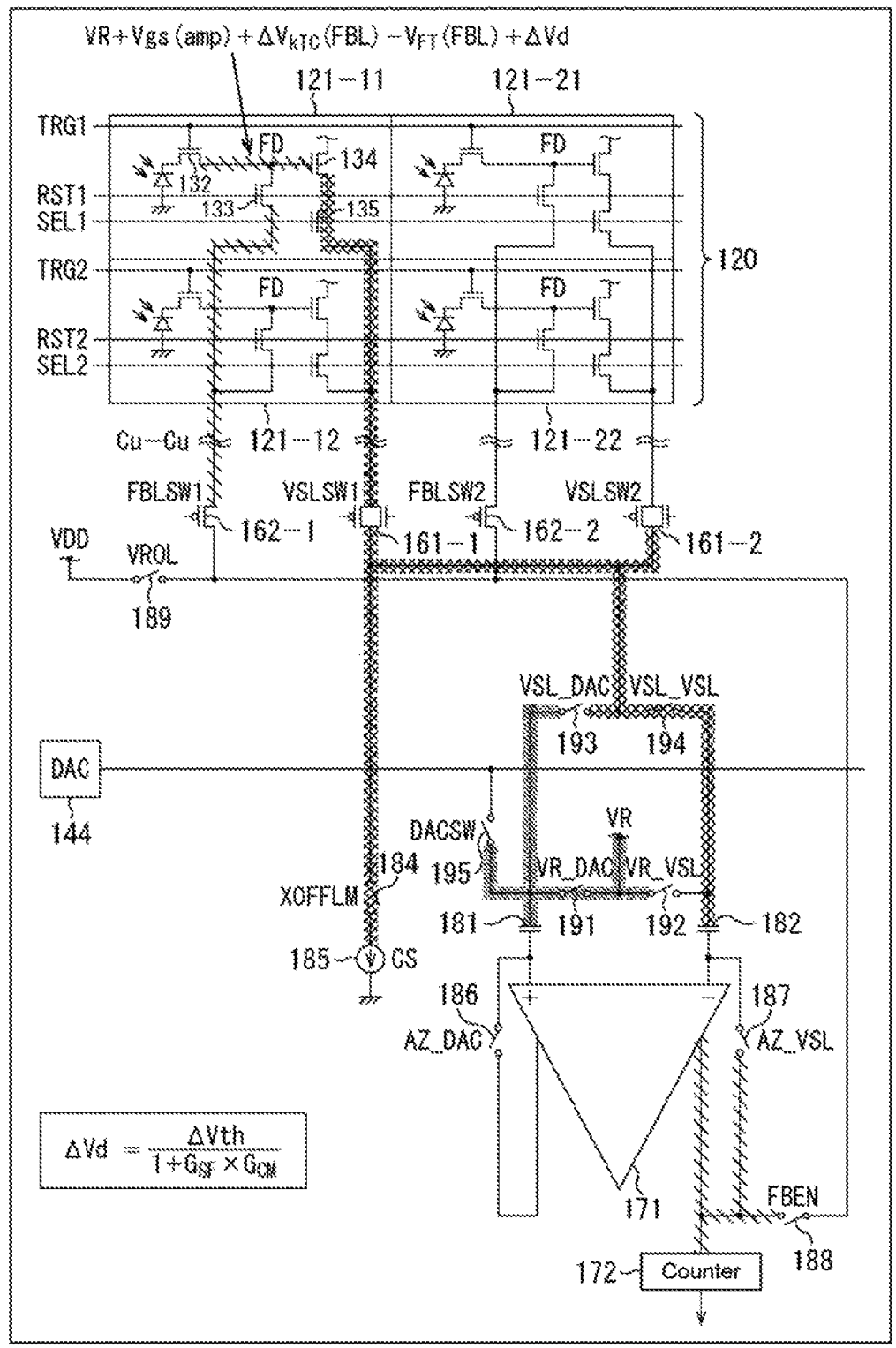
FIG. 14 A diagram showing an example of the state at a time T3.

After that, the FBEN connection control signal (ΦFBEN), the VSL connection control signal (ΦVSLSW1), and the FBL connection control signal (ΦFBLSW1) are turned off (Step S125). In particular, by turning off the FBL connection control signal (ΦFBLSW1), the reset level is held in the floating diffusion (FD) of the unit pixel 121-11 and the feedback line (FBL1) from the floating diffusion (FD) to the FBL switch 162-1 as shown in FIG. 14. This reset level can be represented as [VR+Vgs(amp)+$\Delta V_{kTc}$(FBL)−$V_{FT}$(FBL)+ΔVd]. Note that in the feedback line (FBL1), $\Delta V_{kTc}$(FBL) and $V_{FT}$(FBL) each have a value depending on the FBL switch 162-1 (i.e., they are also more specifically $\Delta V_{kTc}$(FBL1) and $V_{FT}$(FBL1), respectively). By turning off the FBL connection control signal (ΦFBLSW1) ahead of the reset control signal (ΦRST1), it is possible to add also the feedthrough of the FBL switch 162-1 to the reset level.

At a time T3, the reset control signal (ΦRST1) is turned off, and the VR_DAC connection control signal (ΦVR_DAC) is turned off (Step S126). Accordingly, the feedthrough of the reset transistor 133 of the unit pixel 121-11 and the kTC noise are superimposed on the floating diffusion (FD) of the unit pixel 121-11, and the connection to the reference voltage VR is cut off while the reset level [VR+Vgs(amp)+$\Delta V_{kTc}$(RST)−$V_{FT}$(FBL)−$V_{FT}$(RST)+ΔVd] is maintained. Note that in the unit pixel 121-11, $\Delta V_{kTc}$(RST) and $V_{FT}$(RST) each have a value depending on the reset transistor 133 of the unit pixel 121-11 (i.e., they are also more specifically $\Delta V_{kTc}$(RST11) and $V_{FT}$(RST11), respectively). Note that because kTC noise generated when the FBL switch 162 is turned off and kTC noise generated when the reset transistor 133 is turned off have no correlation, it is represented as sum of squares mean [√[$\Delta V_{kTc}$(RST)^2+$\Delta V_{kTc}$(FBL)^2]]. Because the kTC noise of the FBL switch 162 is smaller than the kTC of the reset transistor 133, it can be approximated by √[ΔVkTC(RST)^2+ΔVkTC(FBL)^2]≈ΔVkTC(RST). In order to avoid the complexity of the formula, the previous value will be described using this approximated value.

Figure 15:
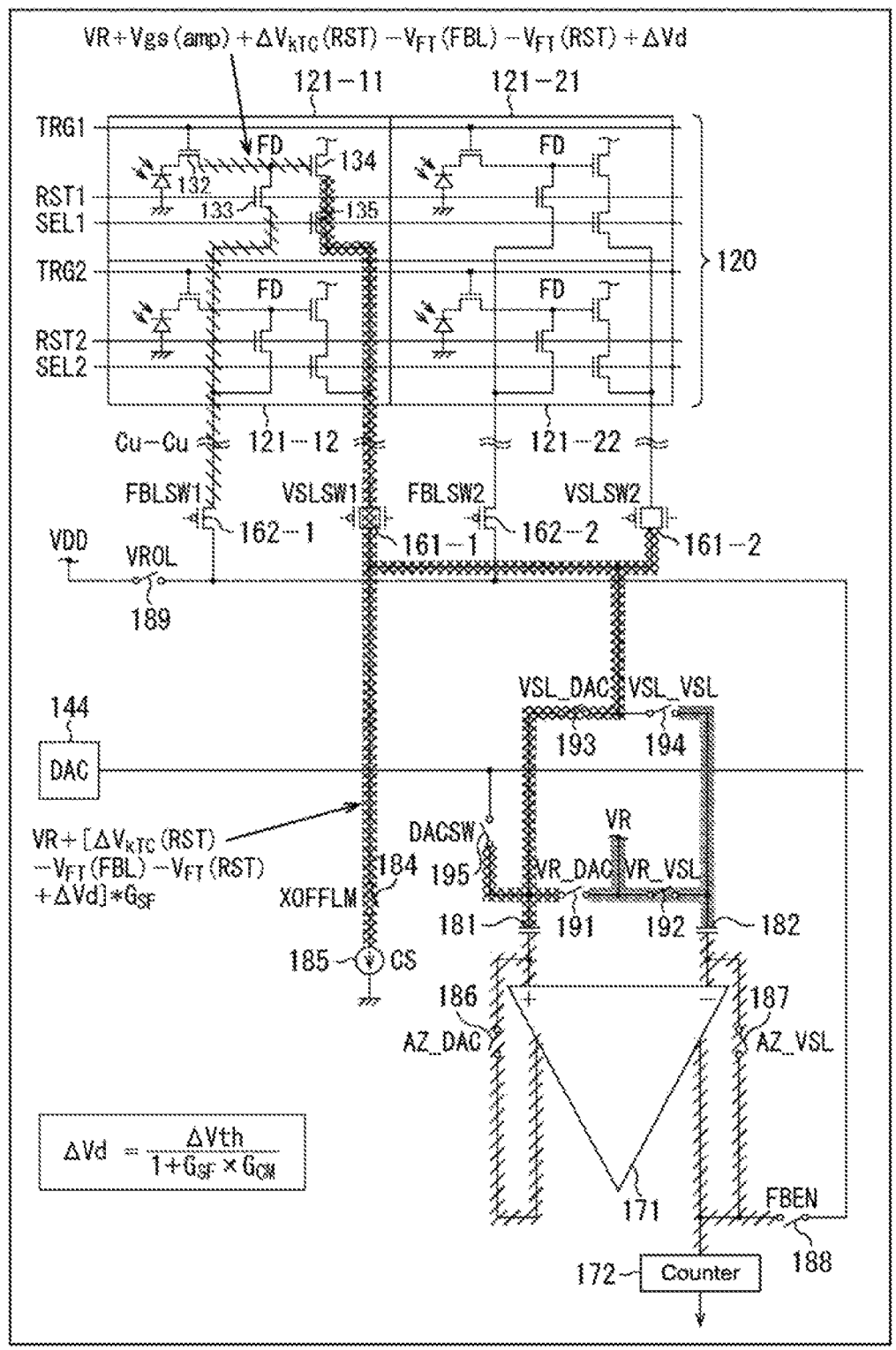
FIG. 15 A diagram showing an example of the state at a time T4.

At a time T4, the VR_VSL connection control signal (ΦVR_VSL) is turned on, a VSL_DAC connection control signal (ΦVSL_DAC) is turned on, and the AZ connection control signals (ΦAZ_DAC and ΦAZ_VSL) are turned on. Further, the VSL connection control signal (ΦVSLSW1) is turned on (Step S127). At this time, as shown in FIG. 15, the signal level read from the unit pixel 121-11 can be represented as [VR+[ΔVkTC(RST)−VFT(FBL)−VFT(RST)+ΔVd]*GSF].

At a time T5, the VR_DAC connection control signal (ΦVR_DAC) is turned on, the VR_VSL connection control signal (ΦVR_VSL) is turned off, the VSL_DAC connection control signal (ΦVSL_DAC) is turned off, and the VSL_VSL connection control signal (ΦVSL_VSL) is turned on (Step S128).

Figure 16:
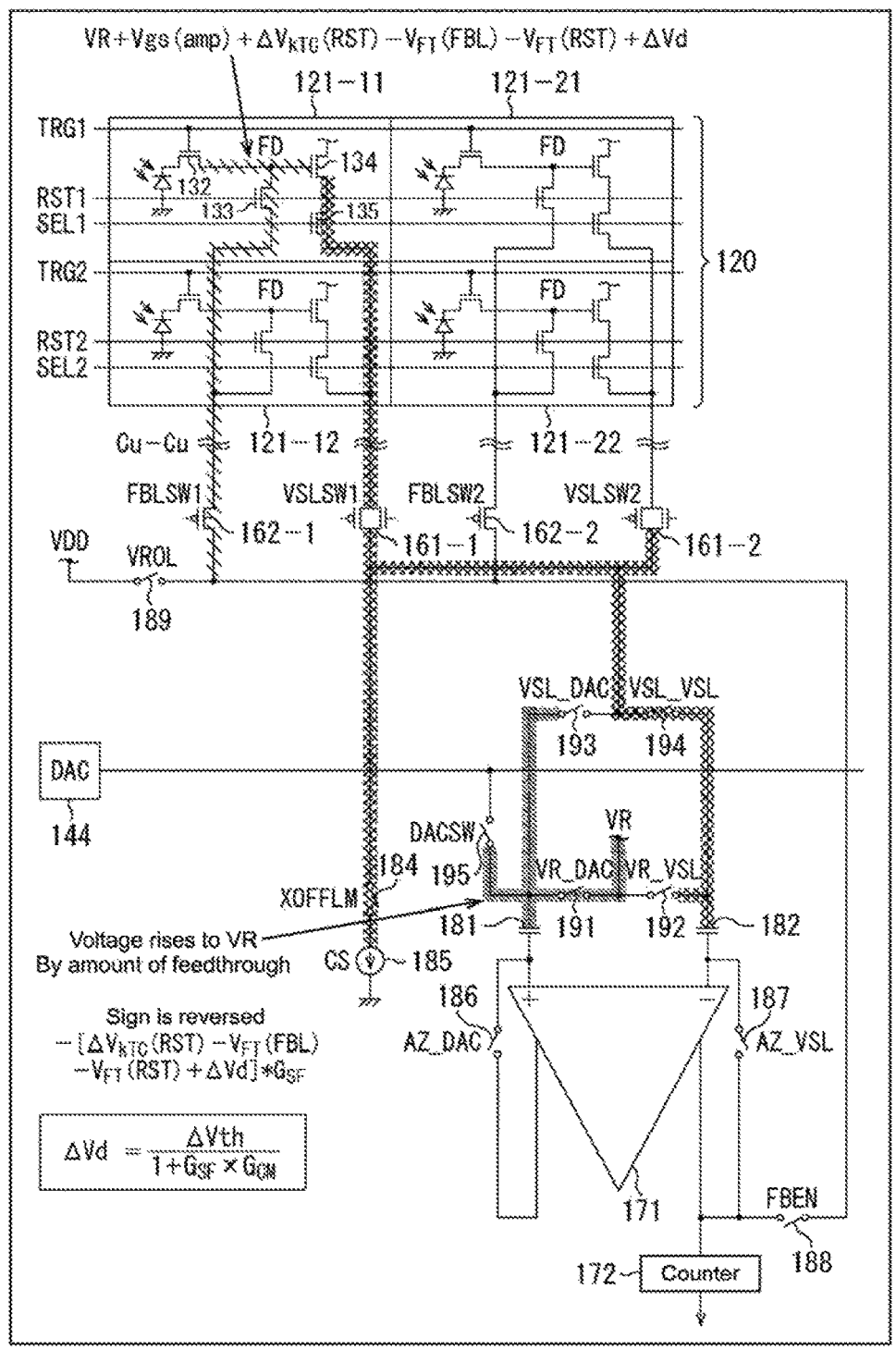
FIG. 16 A diagram showing an example of the state at a time T5.

Accordingly, as shown in FIG. 16, the voltage of the DAC side input of the comparing unit 171 rises to the reference voltage VR. Therefore, the DAC side input changes, and the voltage rises by the amount of feedthrough. Therefore, the sign of $[\Delta V kTC(RST)-V_{FT}(FBL)-V_{FT}(RST)+\Delta Vd]*G_{SF}$ is reversed (i.e., it becomes $-[\Delta VkTC(RST)-V_{FT}(FBL)-V_{FT}(RST)+\Delta Vd]*G_{SF}$).

At a time T6, the reset control signal (ΦRST1) is turned on (Step S129). Further, the VSL connection control signal (ΦVSLSW1), the FBEN connection control signal (ΦFBEN), and the VSL connection control signal (ΦVSLSW1) are turned on (Step S130).

Figure 17:
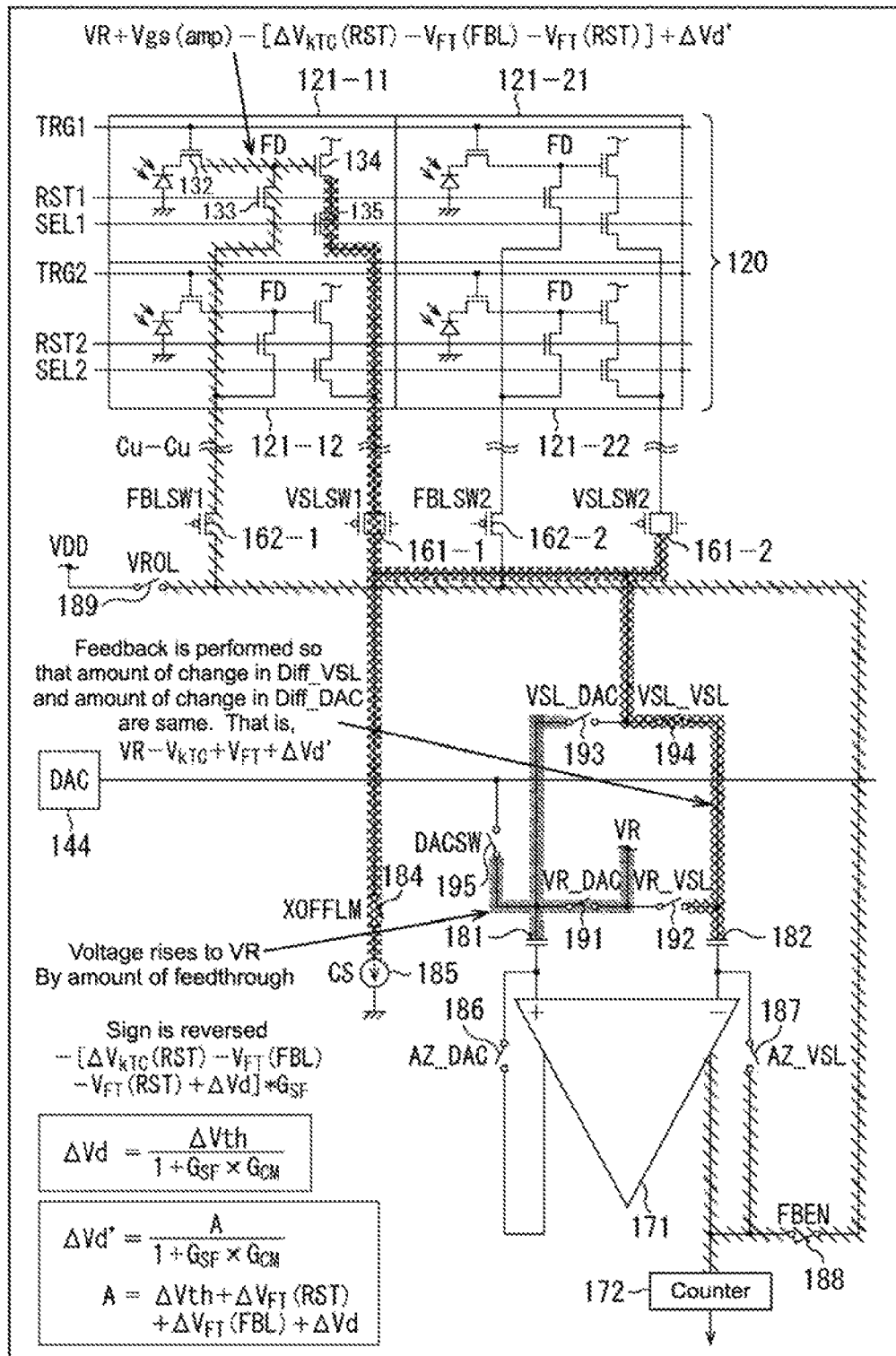
FIG. 17 A diagram showing an example of the state at a time T6.

Accordingly, as shown in FIG. 17, the output of the comparing unit 171 is fed back to the floating diffusion (FD) of the unit pixel 121-11 again. At this time, the feedback is performed so that the amount of change in Diff_VSL on the side of VSL and the amount of change in Diff_DAC on the side of DAC are the same. That is, the voltage of the VSL side input is $VR-[\Delta V_{kTc}(RST)-V_{FT}(FBL)-V_{FT}(RST)]*G_{SF}+\Delta Vd'*G_{SF}$. Note that ΔVd' can be represented by the following formula (2).

$$\Delta Vd' = A/[1+G_{SF}\times G_{CM}] \quad (2)$$

(where $A=\Delta Vth+\Delta V_{FT}(RST)+\Delta V_{FT}(FBL)+\Delta Vd$)

Therefore, the potential of the floating diffusion (FD) of the unit pixel 121-11 is $VR+Vgs(amp)-[\Delta V_{kTc}(RST)-V_{FT}(FBL)-V_{FT}(RST)]+\Delta Vd'$ again. Note that $\Delta V_{FT}(RST)$ represents feedthrough discrepancy of the RST transistor 133. Further, $\Delta V_{FT}(FBL)$ represents feedthrough discrepancy of the FBL transistor 162.

Figure 18:
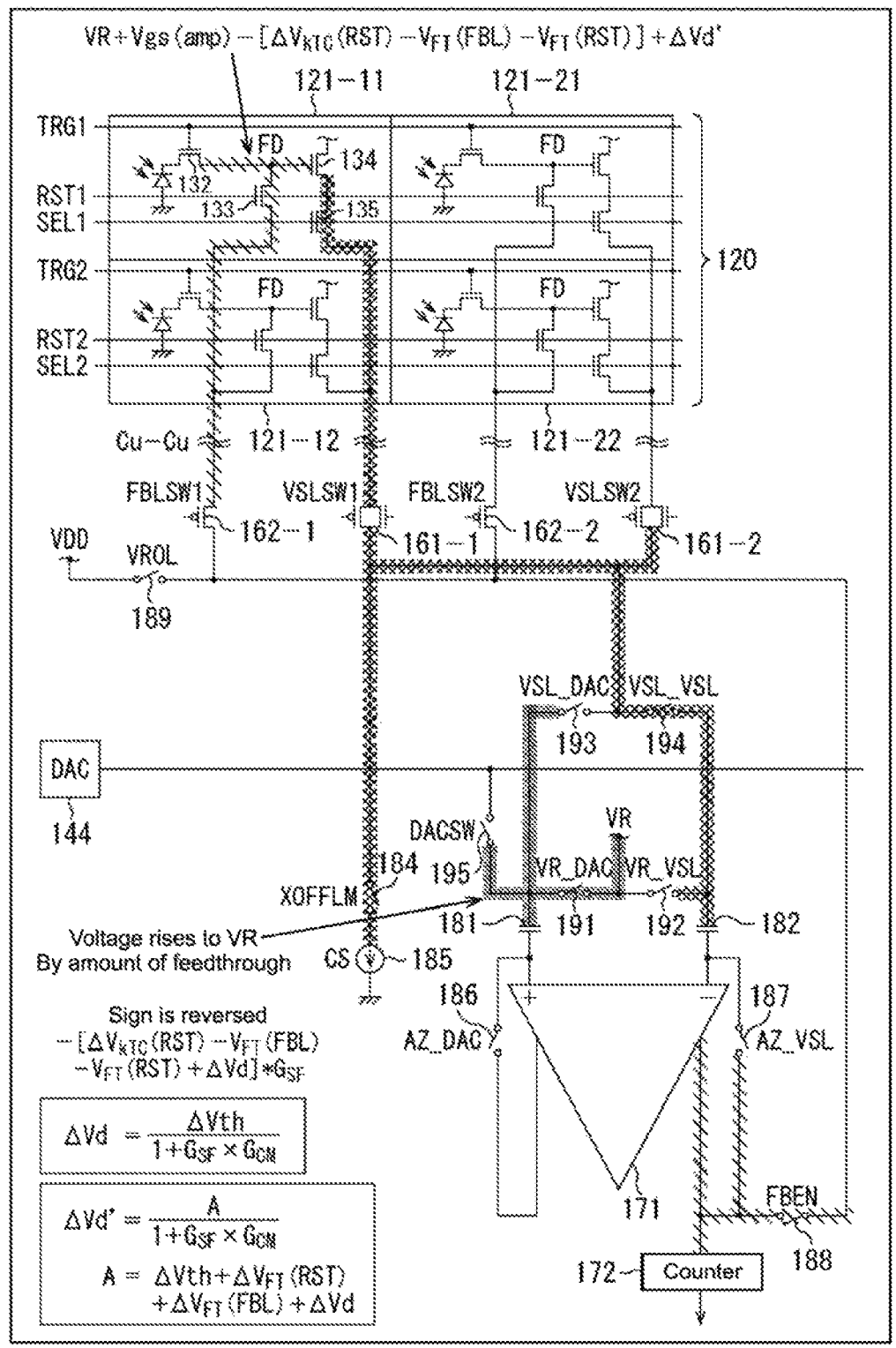
FIG. 18 A diagram showing an example of the state at a time T7.

At a time T7, the VSL connection control signal (ΦVSLSW1), the FBEN connection control signal (ΦFBEN), and the VSL connection control signal (ΦVSLSW1) are turned off (Step S131). Accordingly, as shown in FIG. 18, the reset level is held by the floating diffusion (FD) of the unit pixel 121-11 to be processed As described above, the feedback phase processing (FB11) for the unit pixel 121-11 is performed. When the processing for the unit pixel 121-11 is finished, the second auto-zero processing (AZ) is performed. After that, the feedback phase processing (FB21) for the unit pixel 121-21 is performed. The processing is performed basically similarly to the above-mentioned first auto-zero processing (AZ) or the feedback phase processing (FB11) for the unit pixel 121-11.

Figure 19:
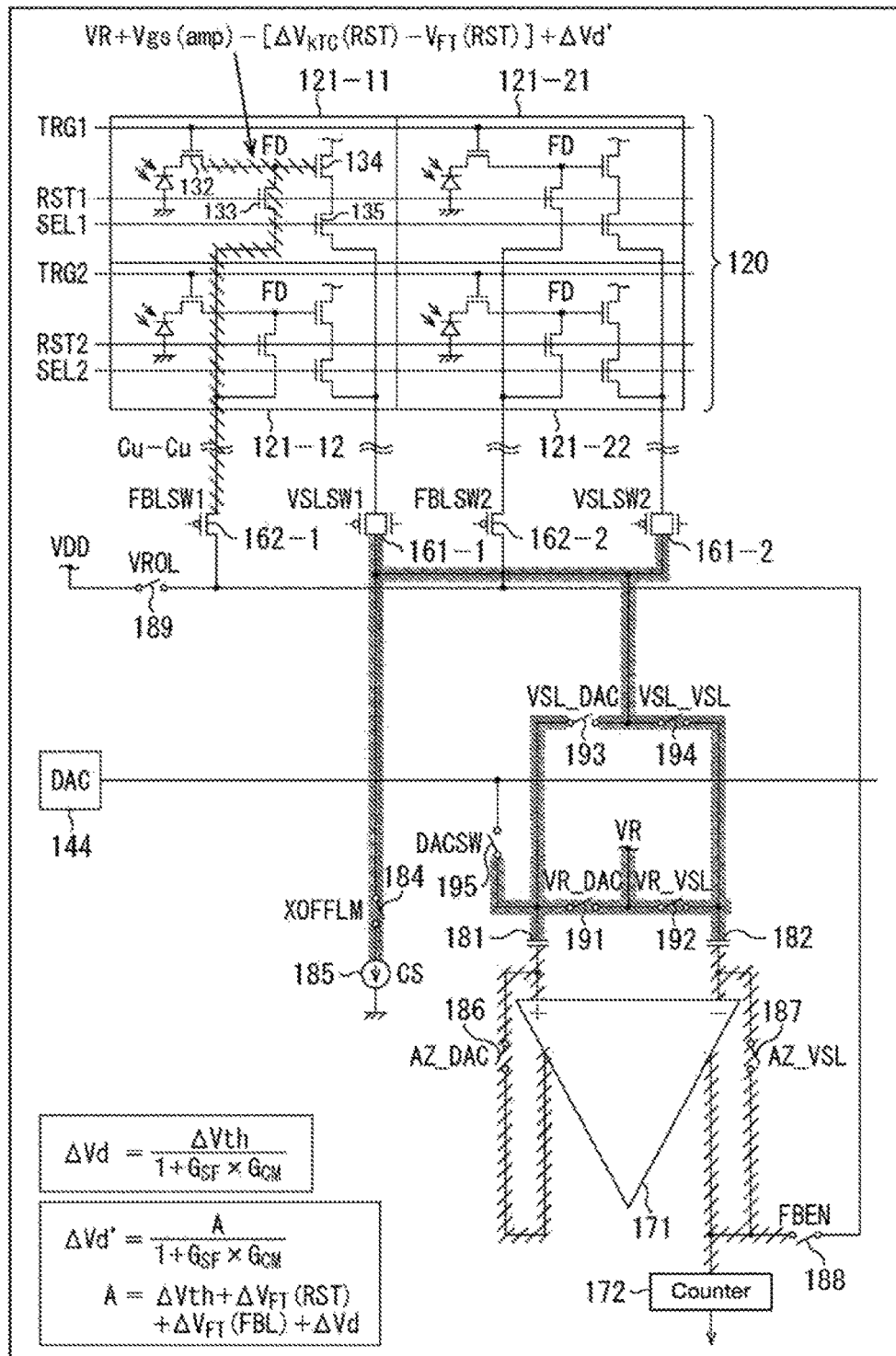
FIG. 19 A diagram showing an example of the state at a time T8.

Specifically, at a time T8, auto-zero processing (AZ) is performed (Step S123). At this time, because the VR_VSL connection control signal (ΦVR_VSL), the VR_DAC connection control signal (ΦVR_DAC), the VSL_VSL connection control signal (ΦVSL_VSL), and the AZ connection control signals (ΦAZ_DAC and ΦAZ_VSL) are turned on, the input and output of the comparing unit 171 are short-circuited, and the power supply potential VR is applied between the VSL switch 161 and the capacitor 182 of the vertical signal line (VSL), as shown in FIG. 19.

When the auto-zero processing is performed, then, each processing (FB21) for the unit pixel 121-21 is performed.

At a time T9, the VR_VSL connection control signal (ΦVR_VSL) is turned off while keeping the VR_DAC connection control signal (ΦVR_DAC) on, and the on-state of the VSL_VSL connection control signal (ΦVSL_VSL) is maintained. Further, a VSL connection control signal (ΦVSLSW2) is turned on. Accordingly, the unit pixel 121-21 is selected as a processing target. Further, the FBEN connection control signal (ΦFBEN) is turned on, and an FBL connection control signal (ΦFBLSW2) corresponding to the unit pixel 121-21 is turned on (Step S124).

Figure 20:
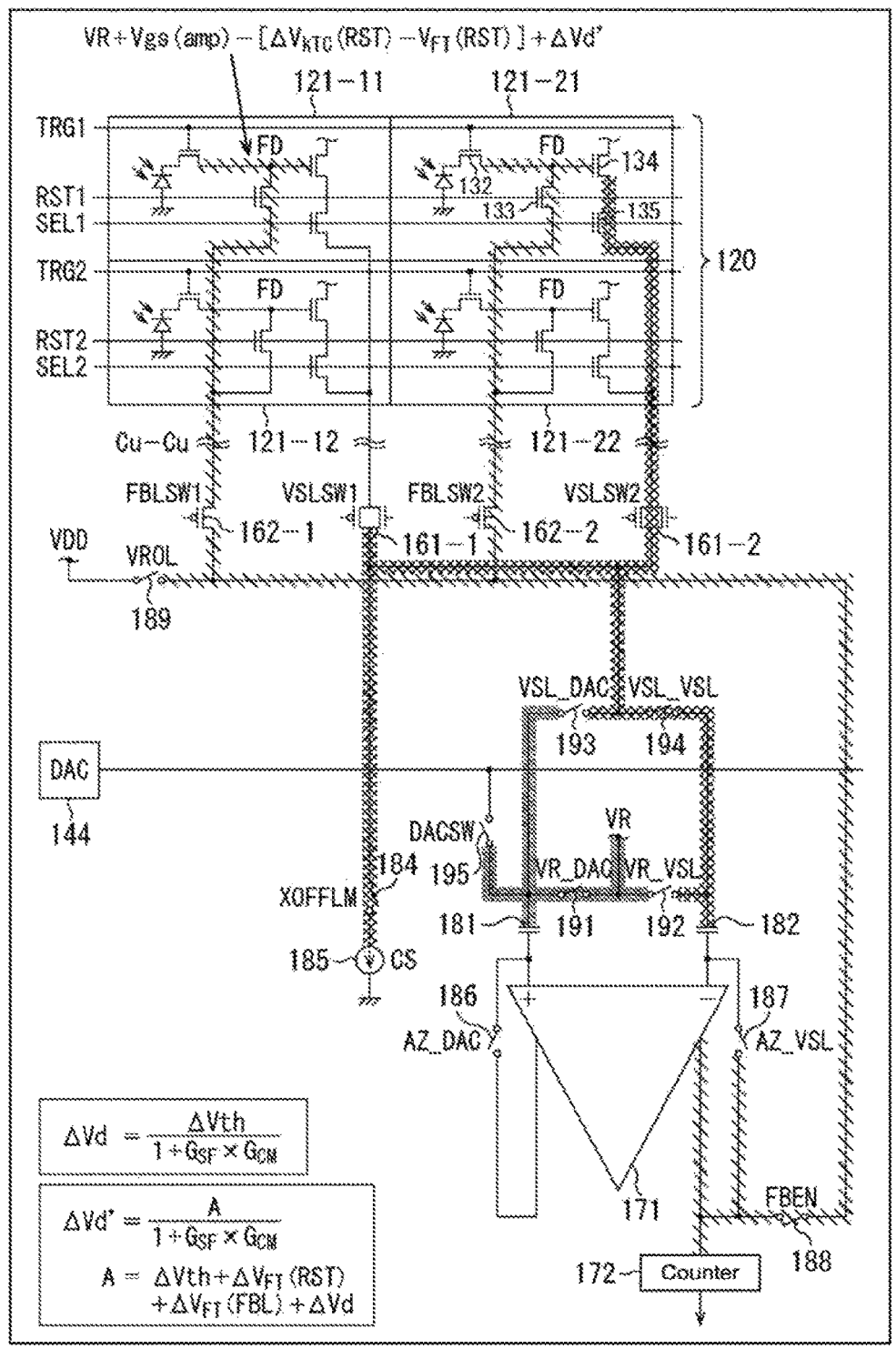
FIG. 20 A diagram showing an example of the state at a time T9.

Accordingly, as shown in FIG. 20, the output of the comparing unit 171 is fed back to the floating diffusion (FD) of the unit pixel 121-21 as a reset level. Further, the reset level is read, and supplied to the VSL side input terminal of the comparing unit 171.

Figure 21:
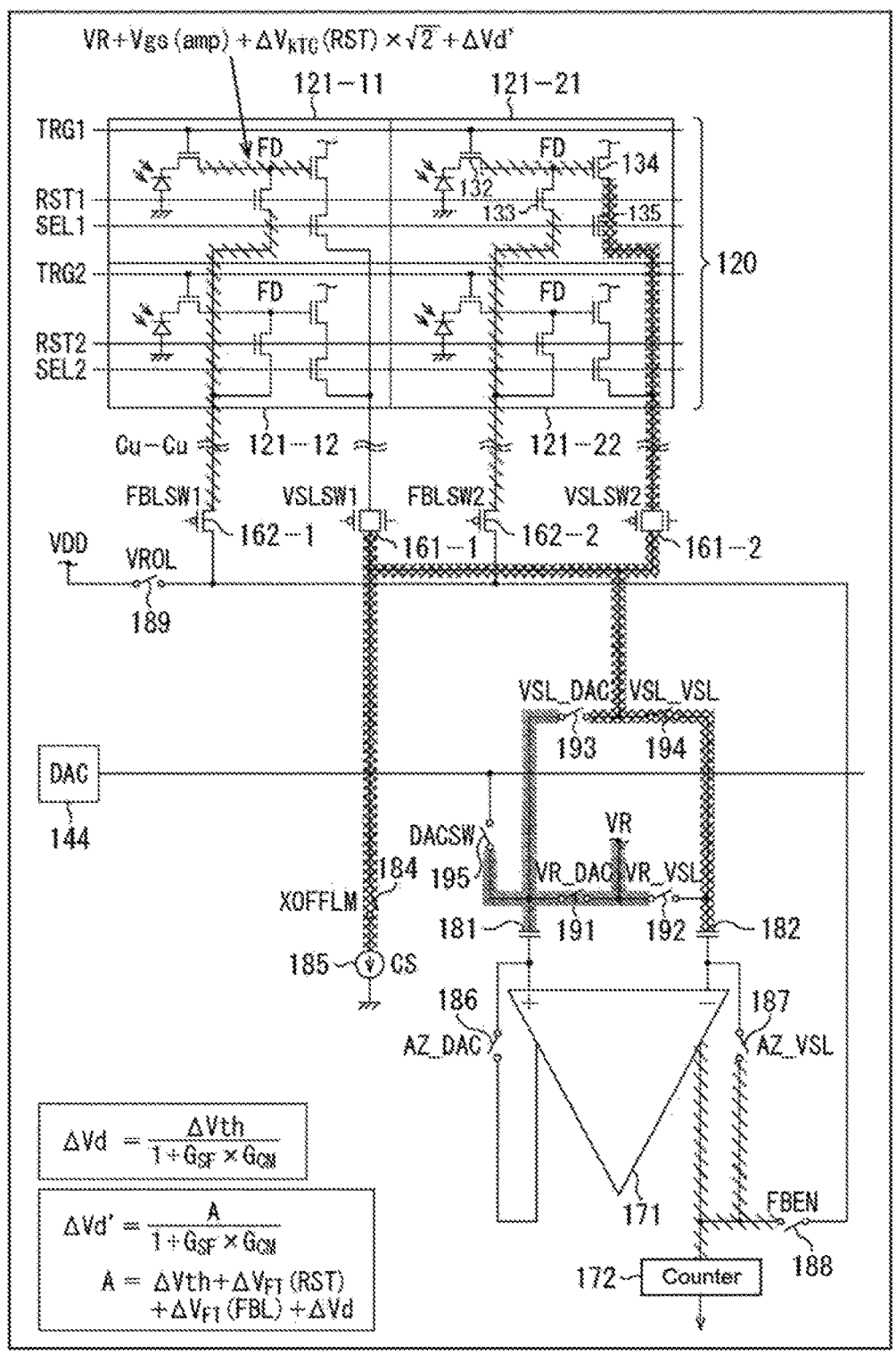
FIG. 21 A diagram showing an example of the state at a time T10.

After that, the FBEN connection control signal (ΦFBEN), the VSL connection control signal (ΦVSLSW2), and the FBL connection control signal (ΦFBLSW2) are turned off (Step S125). In particular, turning off the FBL connection control signal (ΦFBLSW2), the reset revel is held by the floating diffusion (FD) of the unit pixel 121-21 and the feedback line (FBL2) from the floating diffusion (FD) to the FBL switch 162-2, as shown in FIG. 21. By turning off the FBL connection control signal (ΦFBLSW2) ahead of the reset control signal (ΦRST1), it is possible to add also the feedthrough of the feedback line (FBL2) to the reset level.

At a time T10, the reset control signal (ΦRST1) is turned off, and the VR_DAC connection control signal (ΦVR_DAC) is turned off (Step S126). Accordingly, the connection to the reference voltage VR is cut off while the reset level is held by the floating diffusion (FD) of the unit pixel 121-21.

Figure 22:
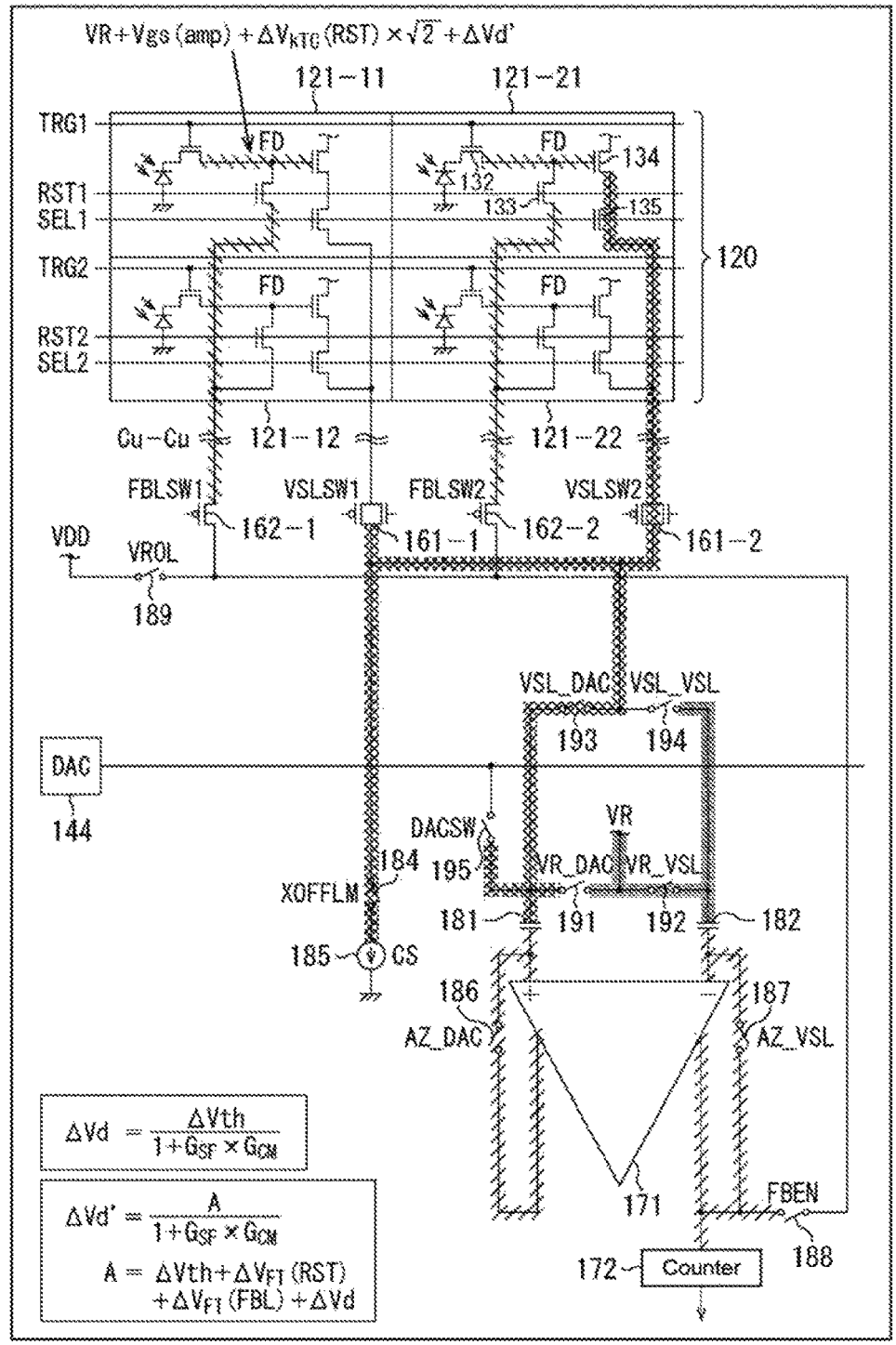
FIG. 22 A diagram showing an example of the state at a time T11.

At a time T11, the VR_VSL connection control signal (ΦVR_VSL) is turned on, the VSL_DAC connection control signal (ΦVSL_DAC) is turned on, and the AZ connection control signals (ΦAZ_DAC and ΦAZ_VSL) are turned on. Further, the VSL connection control signal (ΦVSLSW2) is turned on (Step S127). Accordingly, as shown in FIG. 22, the input and output of the comparing unit 171 are short-circuited, and auto-zero processing is performed.

At a time T12, the VR_DAC connection control signal (ΦVR_DAC) is turned on, the VR_VSL connection control signal (ΦVR_VSL) is turned off, the VSL_DAC connection control signal (ΦVSL_DAC) is turned off, and the VSL_VSL connection control signal (ΦVSL_VSL) is turned on (Step S128).

At a time T13, the reset control signal (ΦRST1) is turned on (Step S129). Further, the VSL connection control signal (ΦVSLSW2), the FBEN connection control signal (ΦFBEN), and the VSL connection control signal (ΦVSLSW2) are turned on (Step S130).

Figure 23:
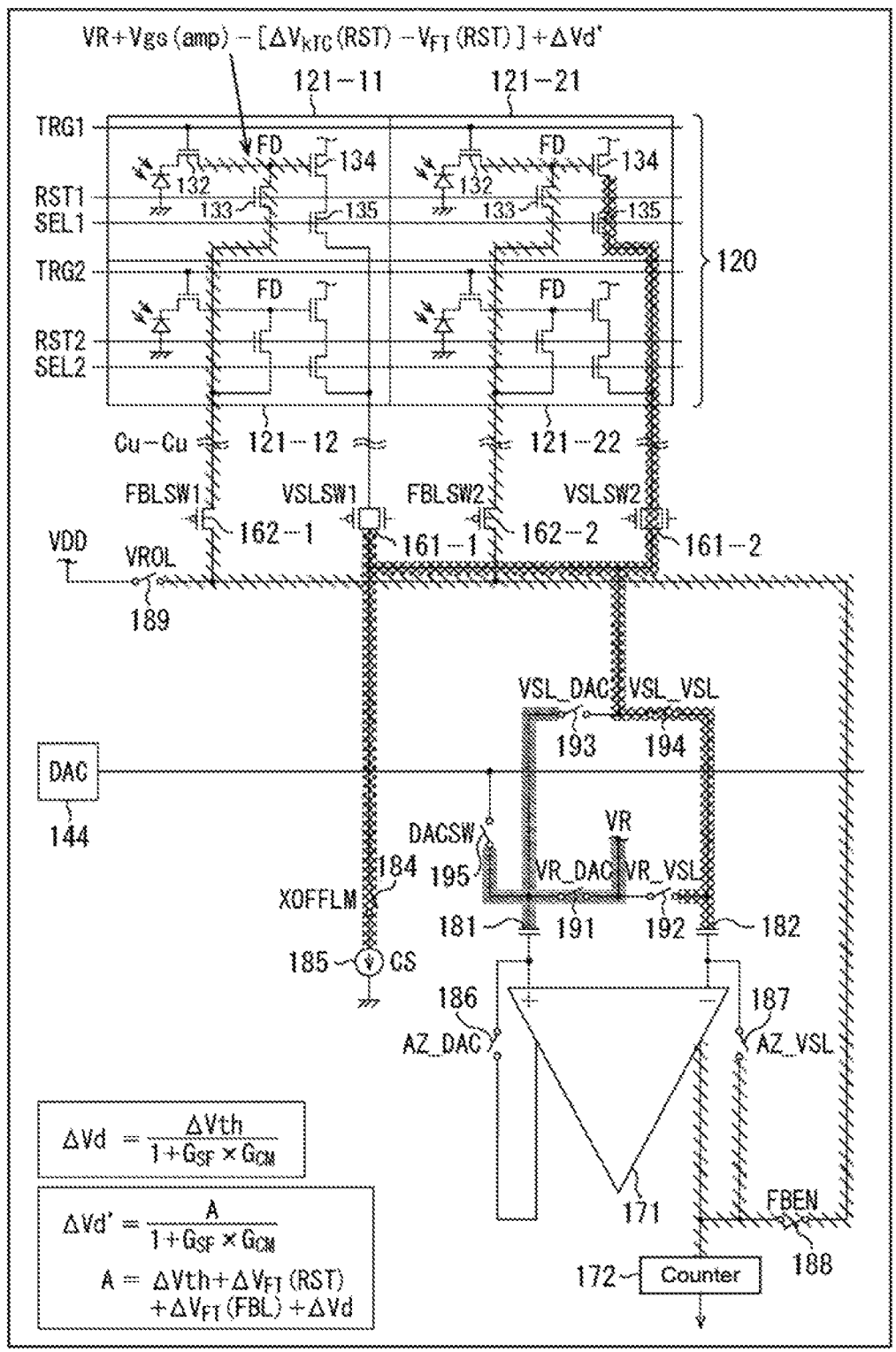
FIG. 23 A diagram showing an example of the state at a time T13.

Accordingly, as shown in FIG. 23, the output of the comparing unit 171 is fed back to the floating diffusion (FD) of the unit pixel 121-21 again.

Figure 24:
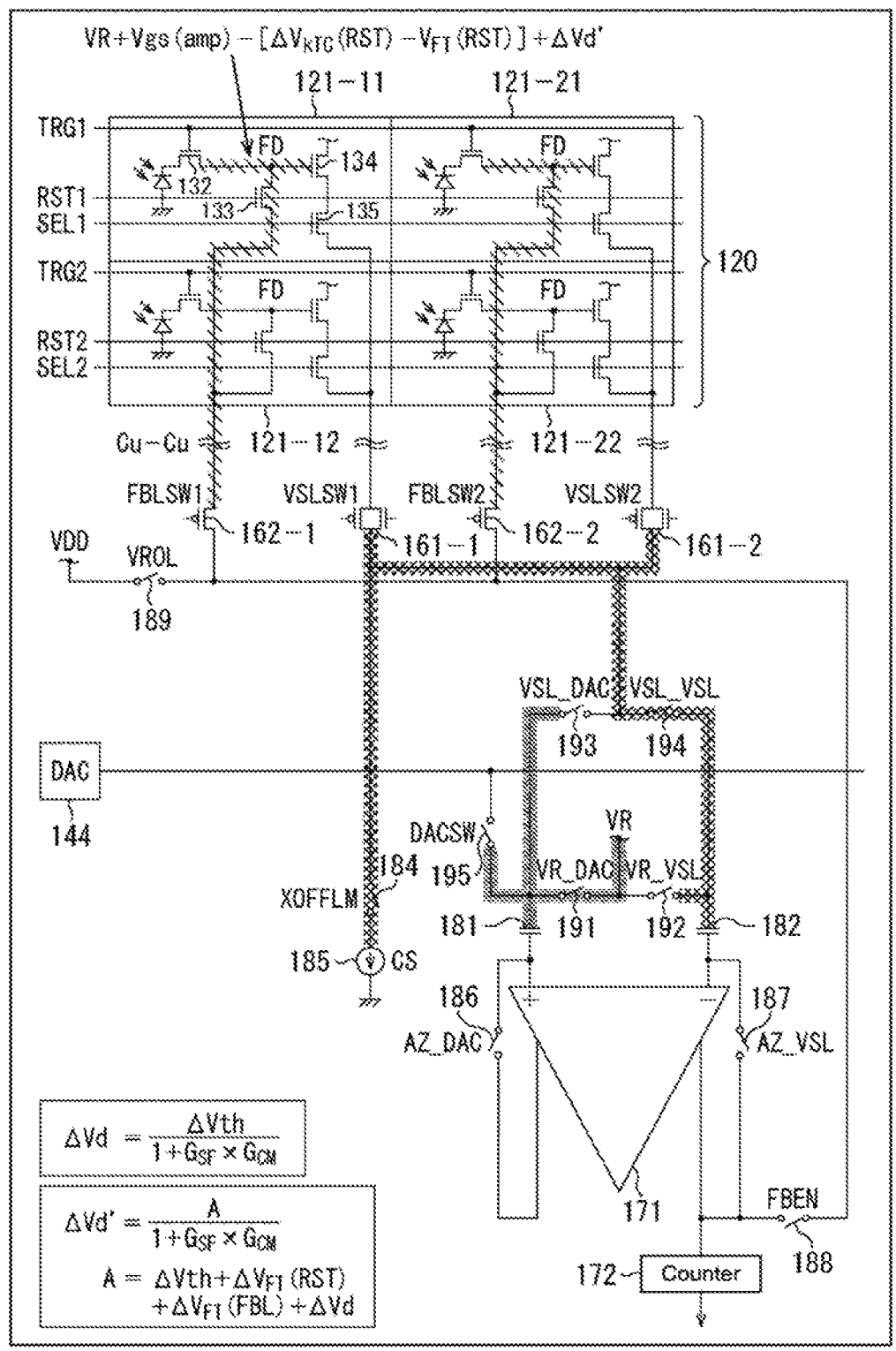
FIG. 24 A diagram showing an example of the state at a time T14.

At a time T14, the VSL connection control signal (ΦVSLSW2), the FBEN connection control signal (ΦFBEN), and the VSL connection control signal (ΦVSLSW2) are turned off (Step S131). Accordingly, as shown in FIG. 24, the reset revel is held by the floating diffusion (FD) of the unit pixel 121-21 to be processed.

At a time T15, the reset control signal (ΦRST1) is turned off (Step S134). Accordingly, the reset level is held by the floating diffusion (FD) of the unit pixel 121-21.

Figure 25:
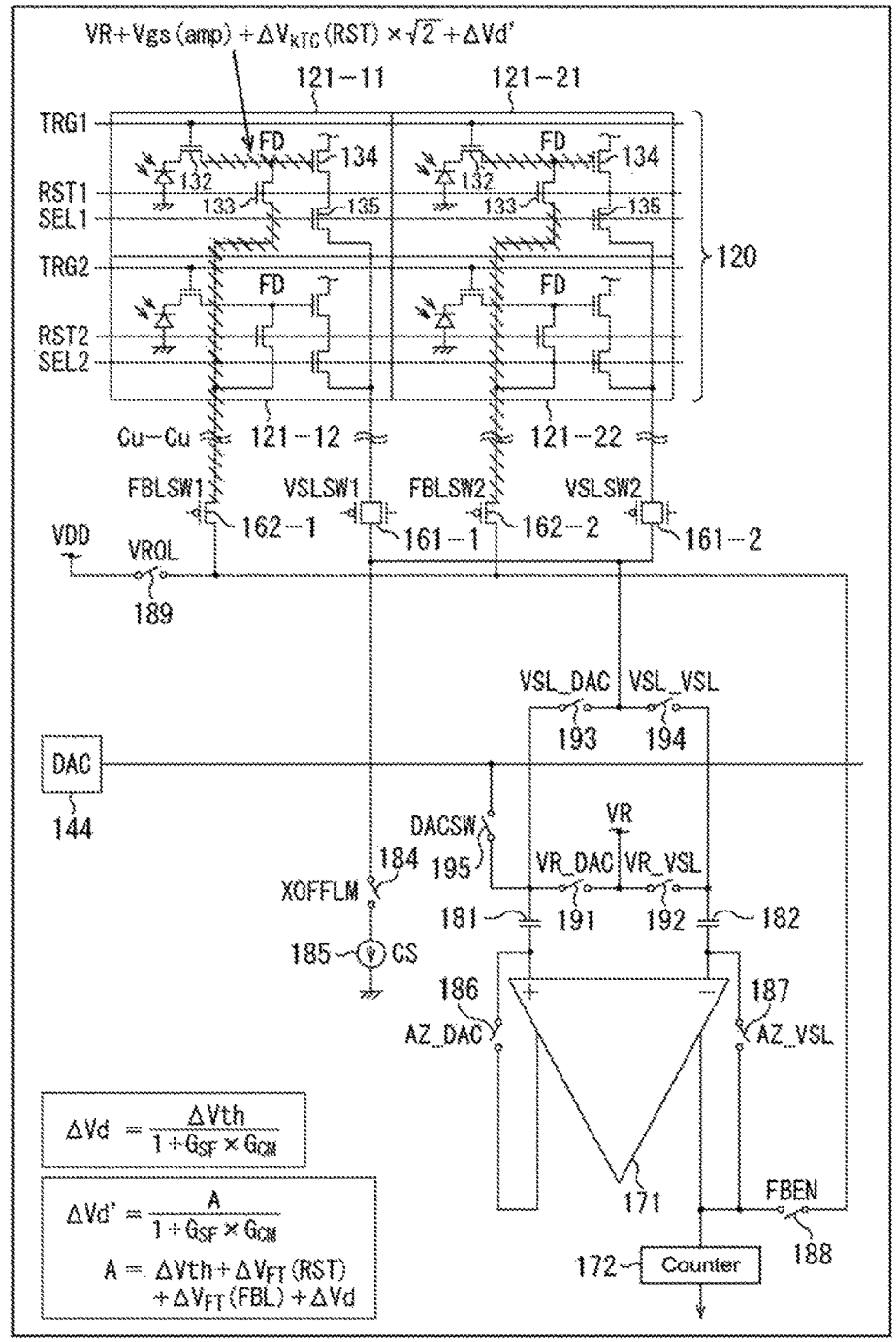
FIG. 25 A diagram showing an example of the state at a time T15.

Accordingly, as shown in FIG. 25, the voltage $(VR+Vgs(amp)+VkTC(RST)\times\sqrt{2}+\Delta Vd')$ is held by the floating diffusion (FD) of the unit pixel that has been processed.

The kTC noise is applied by turning off the reset control signal (ΦRST1) when resetting in the amount corresponding to one row is finished. For that reason, the P phase and D phase have a correlation. It should be noted that because the kTC noise is fed back once, the amplitude of kTC is $\sqrt{2}$ times as large as before.

The feedthrough is canceled because the sign differs. Therefore, also the feedthrough discrepancy is cancelled. Eventually, a feedback error in the threshold value and feedthrough discrepancy remains. For example, when $\Delta V_{kTc}$(RST) is 1 [mV], the noise on the image data is approximately 6 [mV].

As described above, the reset level at which the discrepancy in the threshold value voltage Vth of the amplification transistor 134, field-through discrepancy of the reset transistor 133, and the like are suppressed, is held by each floating diffusion (FD) of the unit pixel 121-11 and the unit pixel 121-21. Accordingly, discrepancy in the threshold value voltage Vth of the amplification transistor 134 between the unit pixels 121 or field-through discrepancy of the reset transistor 133 is reduced.

Figure 26:
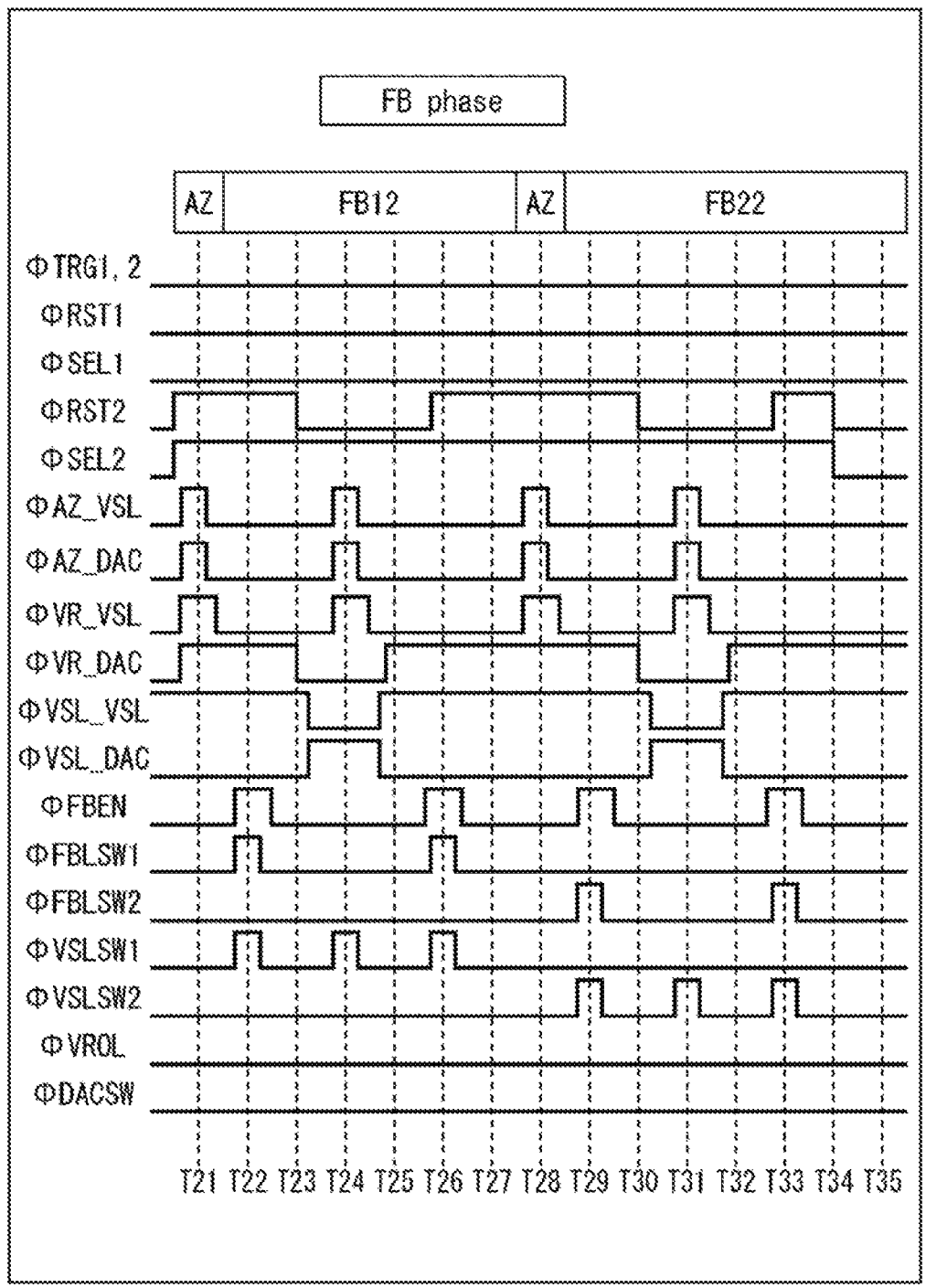
FIG. 26 A timing chart showing an example of the feedback phase state.

FIG. 26 is a timing chart showing an example of flow of the feedback phase processing for the unit pixel 121-12 and the unit pixel 121-22 of the pixel unit 120.

In this case, as shown in FIG. 26, a select control signal (SEL2) is turned on (Step S121), and a reset control signal (RST2) is turned on (Step S122). That is, the unit pixel row of the unit pixel 121-12 and the unit pixel 121-22 is a processing target. Also in this case, auto-zero processing or processing for each unit pixel 121 is performed similarly to the case described with reference to FIG. 11.

Therefore, the image sensor 100 is capable of suppressing discrepancy in the threshold value voltage Vth of the amplification transistor 134 between pixels, and field-through discrepancy of the reset transistor 133 between pixels. Accordingly, the image sensor 100 is capable of suppressing the reduction in image quality of a picked-up image. That is, the present technology is applicable also to an image sensor including an area A/D conversion unit.

Further, because it is achieved by providing the FBL switch 162, the VR_DAC switch 191, the VR_VSL switch 192, the VSL_DAC switch 193, the VSL_VSL switch 194, and the DACSW switch 195 and driving them as described above, the increase in circuit size can be suppressed. Further, as shown in FIG. 7, it is possible to arrange these elements outside the pixel area (the pixel array 101). Therefore, it is possible to achieve the present technology without changing the number of transistors in the pixel. Therefore, it is possible to apply the present technology more easily, and suppress the increase in cost.

Further, by applying the present technology, it is possible to correct the voltage by the amount corresponding to the feedthrough of the reset transistor 133. Therefore, it is possible to cause the floating diffusion to store charges up to the maximum value of the pixel voltage, and expand the D range. Note that because discrepancy in the potential of each vertical signal line (VSL) is suppressed, it does not need to expand the D range of a burden MOS as a current source and it is possible to use it more effectively.

<Flow of Preset Read Phase Processing>

Next, with reference to the flowchart of FIG. 27, an example of flow of the preset read phase processing performed in Step S103 in FIG. 8 will be described.

When the preset read phase processing is started, the control unit 110 controls the area scanning unit 111, and selects, as a processing target, a unit pixel row (row of the unit pixels 121), which is not processed, of the pixel unit 120 to be processed in Step S151. For example, the area scanning unit 111 turns on the select control signal (SEL) of any one of unit pixel rows, which are not processed.

In Step S152, the control unit 110 controls the A/D conversion control unit 113 or the like to perform auto-zero processing (AZ). For example, the A/D conversion control unit 113 turns on the AZ connection control signals (AZ_DAC and AZ_VSL) for the area A/D conversion unit 143 corresponding to the pixel unit 120 to be processed. Further, the A/D conversion control unit 113 turns on the VR_VSL connection control signal (VR_VSL) of the area A/D conversion unit 143. Further, the A/D conversion control unit 113 turns on the VSL_VSL connection control signal (VSL_VSL) of the area A/D conversion unit 143.

In Step S153, the control unit 110 controls the A/D conversion control unit 113 to read kTC noise. For example, the A/D conversion control unit 113 inputs the ramp wave (RAMP) generated by the D/A conversion unit (DAC) 144 to the DAC side input of the comparing unit 171 while keeping the VR_VSL connection control signal (VR_VSL) on to cause the comparing unit 171 to compare it with the reference voltage VR.

When the comparison is finished, in Step S154, the control unit 110 controls the VSL connection control unit 112 to select, as a processing target, a unit pixel column (column of the unit pixels 121), which is not processed. For example, the VSL connection control unit 112 turns on any of the VSL connection control signals (VSLSW) of the pixel unit 120 to be processed. Accordingly, one unit pixel 121 in the unit pixel row to be processed is selected as a processing target.

In Step S155, the control unit 110 controls the VSL connection control unit 112 and the A/D conversion control unit 113 to read a reset level from the unit pixel 121 to be processed. For example, the A/D conversion control unit 113 inputs the ramp wave (RAMP) generated by the D/A conversion unit (DAC) 144 to the DAC side input terminal of the comparing unit 171 as a reference voltage to cause the comparing unit 171 to compare the reset level read from the unit pixel 121 to be processed with the reference voltage (ramp wave (RAMP)).

When the comparison is finished, in Step S156, the control unit 110 determines whether or not all unit pixel columns of the unit pixel row to be processed of the pixel unit 120 to be processed have been processed. In the case where it is determined that there is a unit pixel column, which is not processed, the processing returns to Step S152, and the subsequent processing is repeated. Further, in the case where it is determined that all unit pixel columns of the unit pixel row to be processed have been processed in Step S156, the processing proceeds to Step S157.

In Step S157, the control unit 110 controls the area scanning unit 111 to release the selection of a row to be processed, which is performed in Step S151. For example, the area scanning unit 111 turns off the select control signal (SEL) that has been turned on in Step S151.

In Step S158, the control unit 110 determines whether or not all unit pixel rows have been processed for the pixel unit 120 to be processed. In the case where it is determined that there is a unit pixel row, which is not processed, the processing returns to Step S151, and the subsequent processing is repeated. Further, in the case where it is determined that all unit pixel rows of the pixel unit 120 to be processed (i.e., all unit pixels 121 of the pixel unit 120 to be processed) have been processed in Step S158, the preset read phase processing is finished, and the processing returns to FIG. 8.

That is, the processing of Step S151 to Step S158 is performed for each unit pixel row of the pixel unit 120 to be processed. Then, when all unit pixel rows are processed, the processing proceeds to the next phase (charge transfer).

<Timing Chart of Preset Read Phase>

Figure 28:
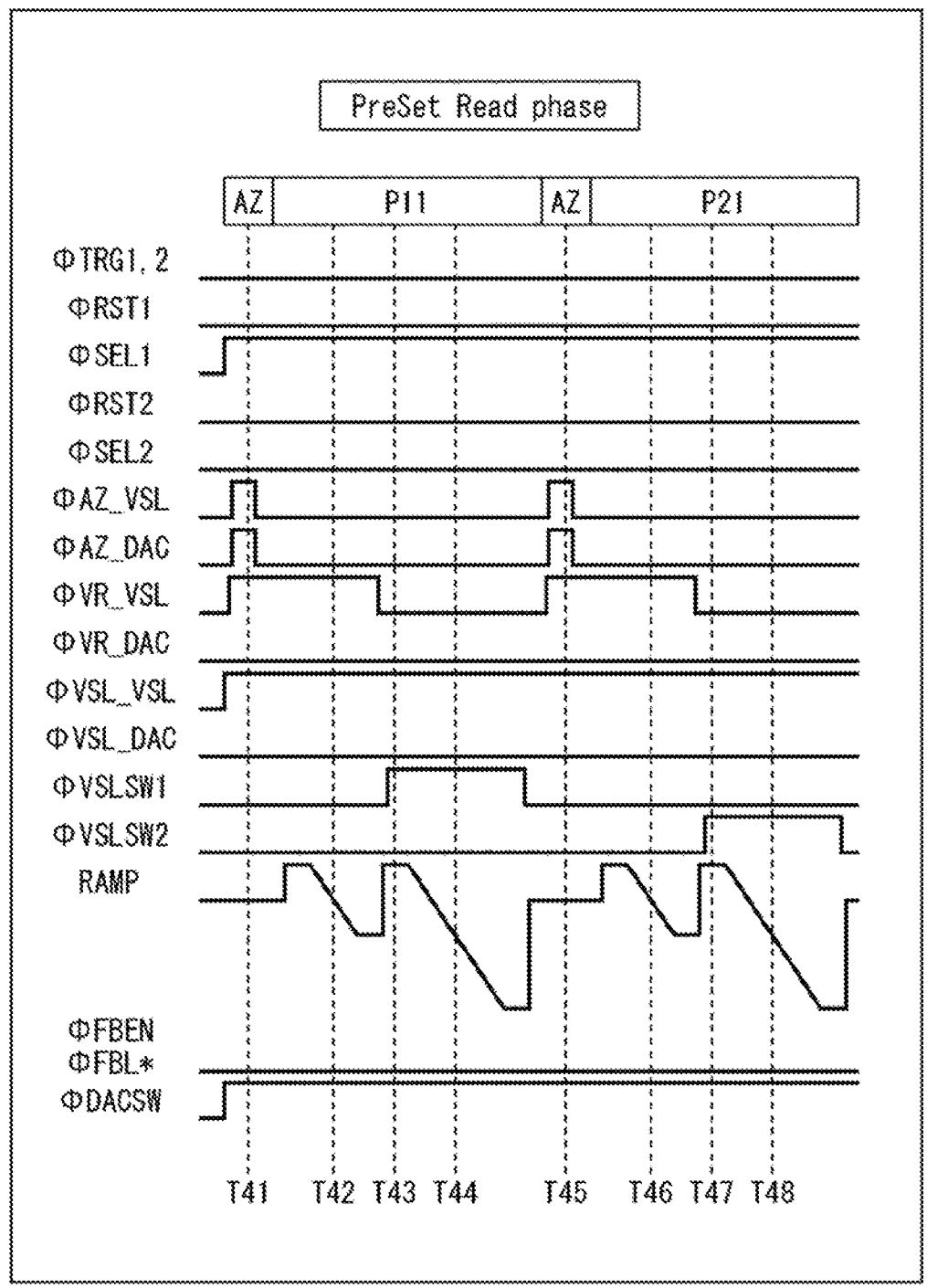
FIG. 28 A timing chart showing an example of the preset read phase state.

FIG. 28 is a timing chart showing an example of flow of the preset read phase processing for the unit pixel 121-11 and the unit pixel 121-21 of the pixel unit 120.

In this case, as shown in FIG. 28, the select control signal (ΦSEL1) is turned on (Step S151). Further, also the VSL_VSL connection control signal (ΦVSL_VSL) and the DACSW connection control signal (DACSW) are turned on.

After that, at a time T41, auto-zero processing (AZ) is performed (Step S152). At this time, the AZ connection control signals (ΦAZ_VSL and ΦAZ_DAC) and the VR_VSL connection control signal (ΦVR_VSL) are turned on.

Figure 29:
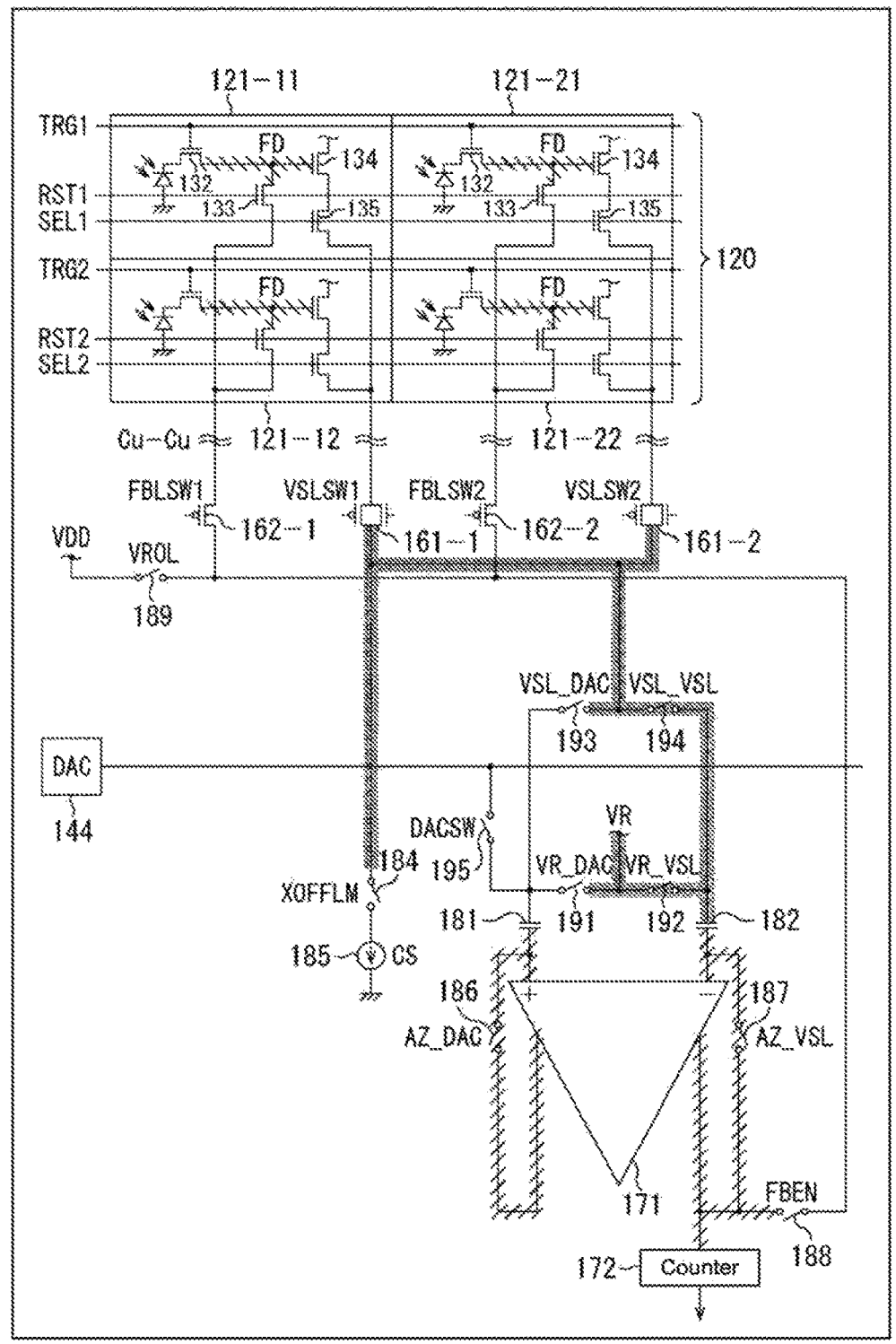
FIG. 29 A diagram showing an example of the state at a time T41.

Accordingly, as shown in FIG. 29, the input and output of the comparing unit 171 are short-circuited, and the reference voltage VR is applied between the VSL switch 161 and the capacitor 182 of the vertical signal line (VSL) (i.e., to the VSL side input of the comparing unit 171).

Figure 30:
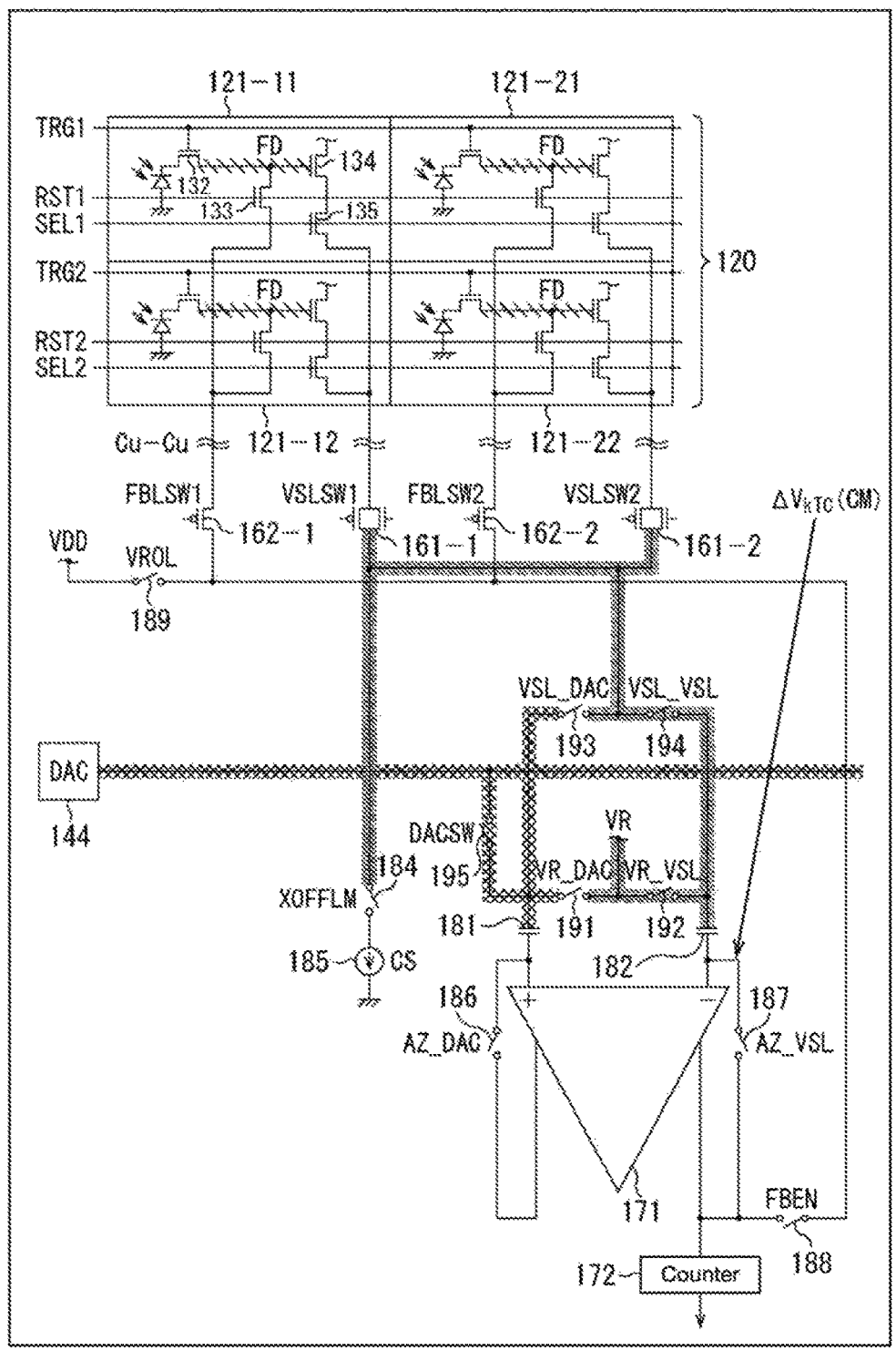
FIG. 30 A diagram showing an example of the state at a time T42.

At a time T42, kTC noise is read (Step S153). At this time, the ramp wave (reference voltage) supplied from the D/A conversion unit (DAC) 144 is input to the DAC side input of the comparing unit 171 while keeping the VR_VSL connection control signal (ΦVR_VSL) on, i.e., while applying the reference voltage VR to the VSL side input of the comparing unit 171 as shown in FIG. 30. That is, the reference voltage VR is compared with the reference voltage (ramp wave). Accordingly, kTC noise ($\Delta V_{kTc}(CM)$) is read.

Figure 31:
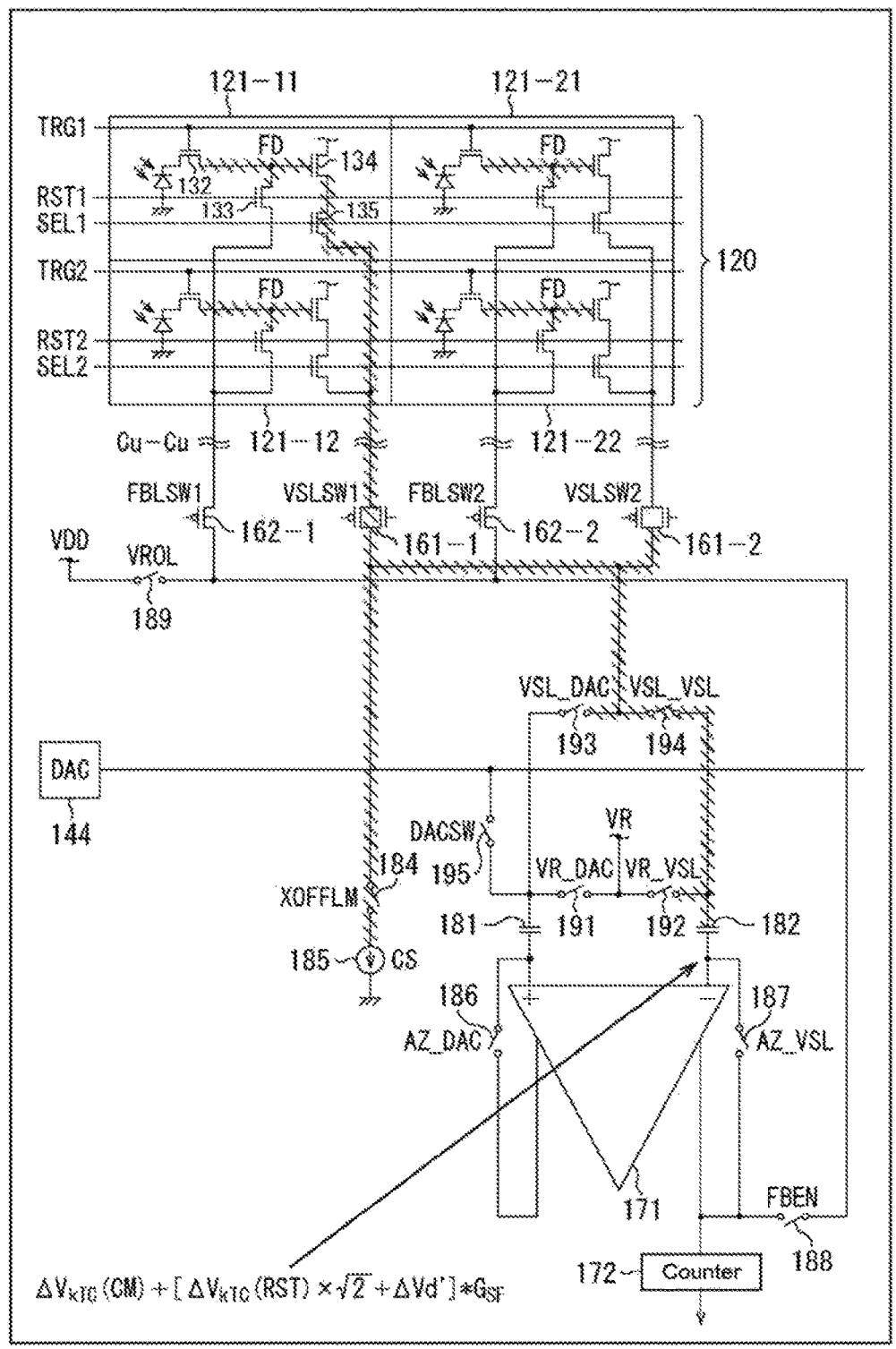
FIG. 31 A diagram showing an example of the state at a time T43.

Next, at a time T43, a unit pixel column to be processed is selected (Step S154). At this time, the VR_VSL connection control signal (ΦVR_VSL) is turned off, and the VSL connection control signal (ΦVSLSW1) corresponding to the unit pixel 121-11 to be processed is turned on. That is, as shown in FIG. 31, the reset level held by the floating diffusion (FD) of the unit pixel 121-11 is transmitted to the VSL side input of the comparing unit 171. Therefore, the voltage of the difference between the VSL side input and the DAC side input of the comparing unit 171 is $\Delta V_{kTc}(CM)+[\Delta V_{kTc}(RST)\sqrt{2}+\Delta Vd']*G_{SF}$.

Figure 32:
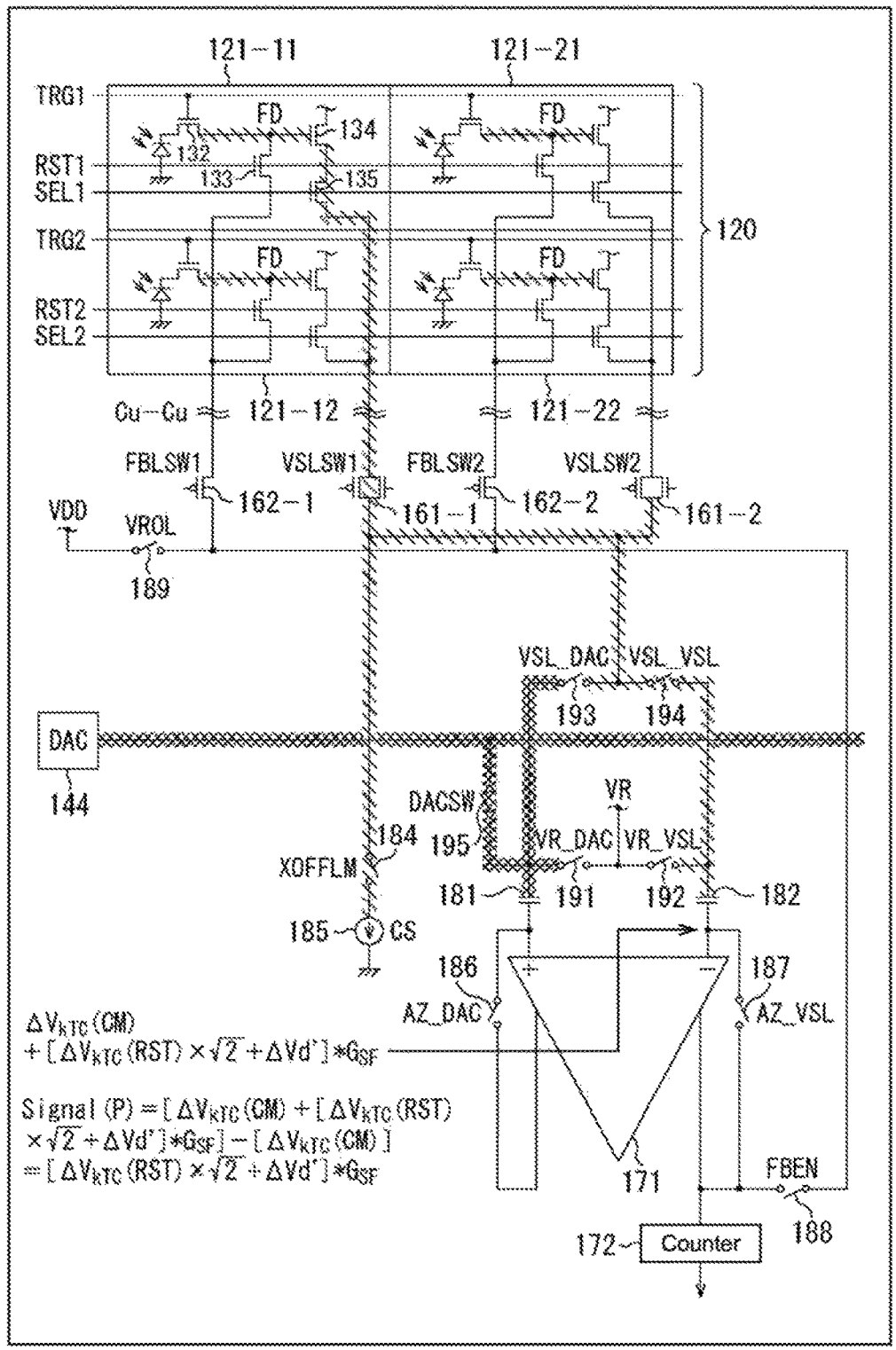
FIG. 32 A diagram showing an example of the state at a time T44.

At a time T44, the reset level is read from the unit pixel to be processed (Step S155). That is, as shown in FIG. 32, the ramp wave (reference voltage) supplied from the D/A conversion unit (DAC) 144 is input to the DAC side input of the comparing unit 171, and the reset level of the unit pixel 121-11 is compared with the reference voltage (ramp wave).

The voltage of the difference between the VSL side input and the DAC side input of the comparing unit 171 at this time is $\Delta V_{kTc}(CM)+[\Delta V_{kTc}(RST)\sqrt{2}+\Delta Vd']*G_{SF}$. Therefore, the signal level of the signal read from the unit pixel 121-11 is represented by the following formula (3).

$$\text{Signal}(P) = [\Delta V_{kTc}(CM)+[\Delta V_{kTc}(RST)\times \sqrt{2}+\Delta Vd']*G_{SF}]-[\Delta V_{kTc}(CM)]=[\Delta V_{kTc}(RST)\times\sqrt{2}+\Delta Vd']*G_{SF} \quad (3)$$

Next, at a time T45 to a time T48, the similar processing is repeated for the unit pixel 121-21.

Figure 33:
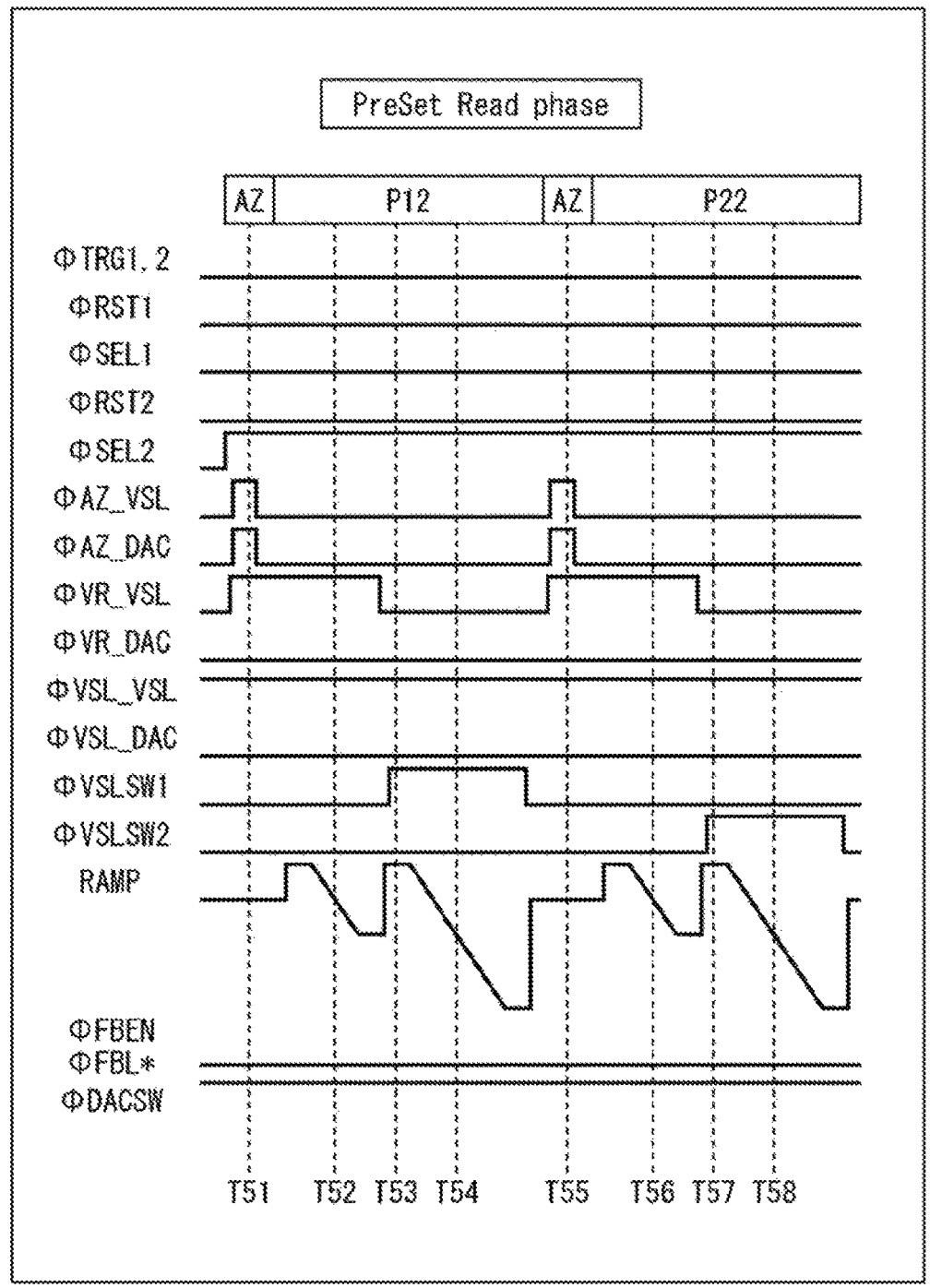
FIG. 33 A timing chart showing an example of the preset read phase state.

FIG. 33 is a timing chart showing an example of flow of the preset read phase processing for the unit pixel 121-12 and the unit pixel 121-22 of the pixel unit 120. As shown in FIG. 33, the processing similar to that for the unit pixel 121-11 is repeated for the unit pixel 121-12 and the unit pixel 121-22. It should be noted that in this case, the select control signal (ΦSEL2) is turned on (Step S151).

<Charge Transfer>

Figure 8:
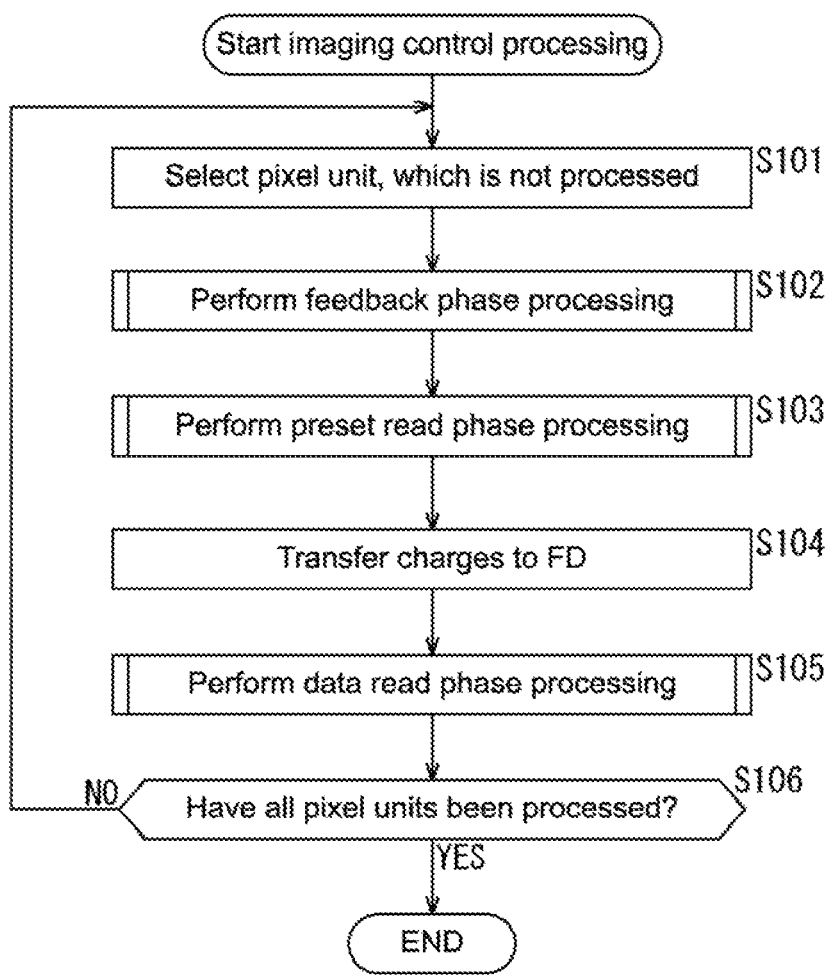
FIG. 8 A flowchart describing an example of flow of imaging control processing.
Figure 34:
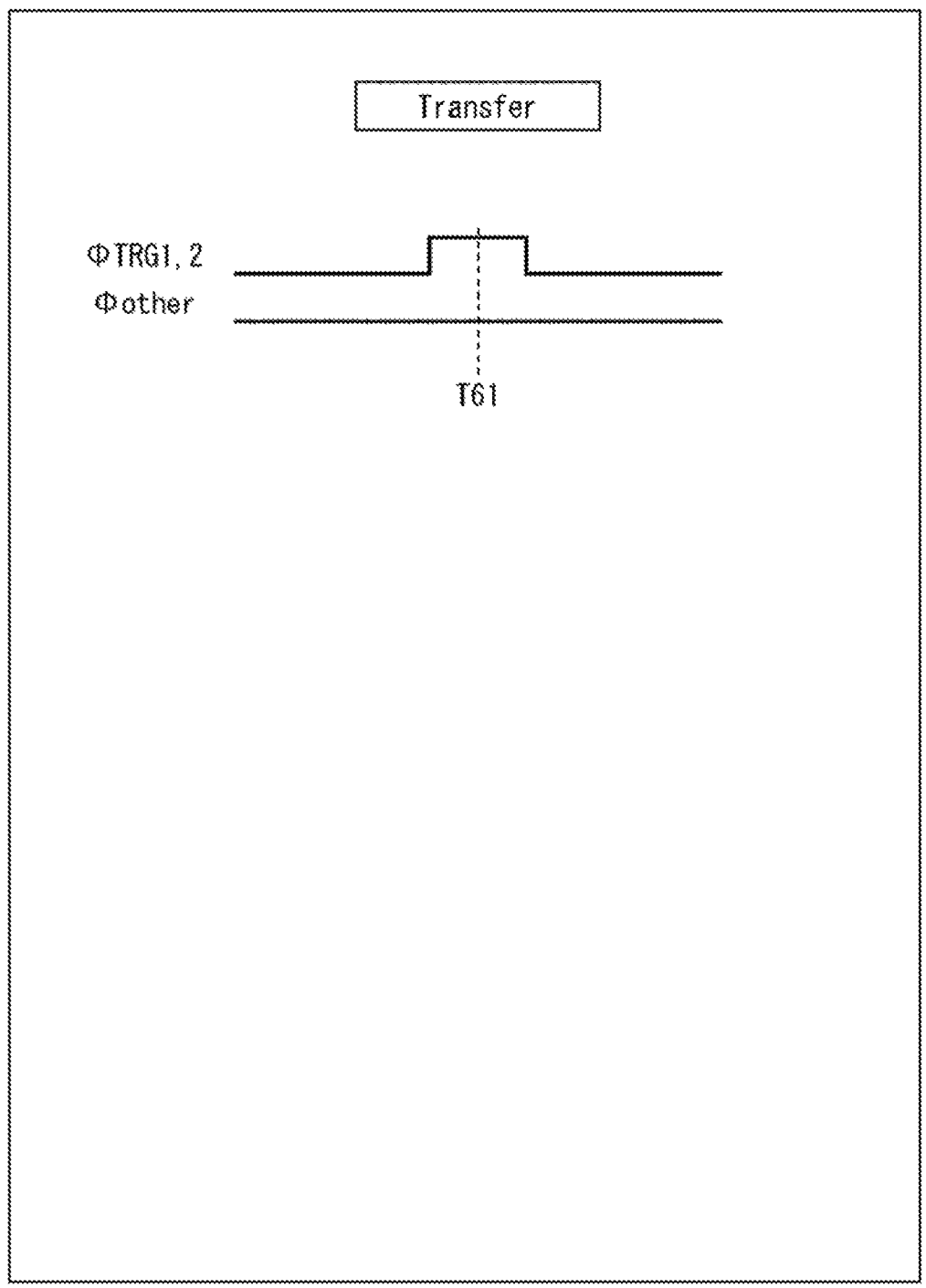
FIG. 34 A timing chart showing an example of the transfer state.

FIG. 34 is a timing chart showing an example of the state of charge transfer performed in Step S104 in FIG. 8.

Figure 35:
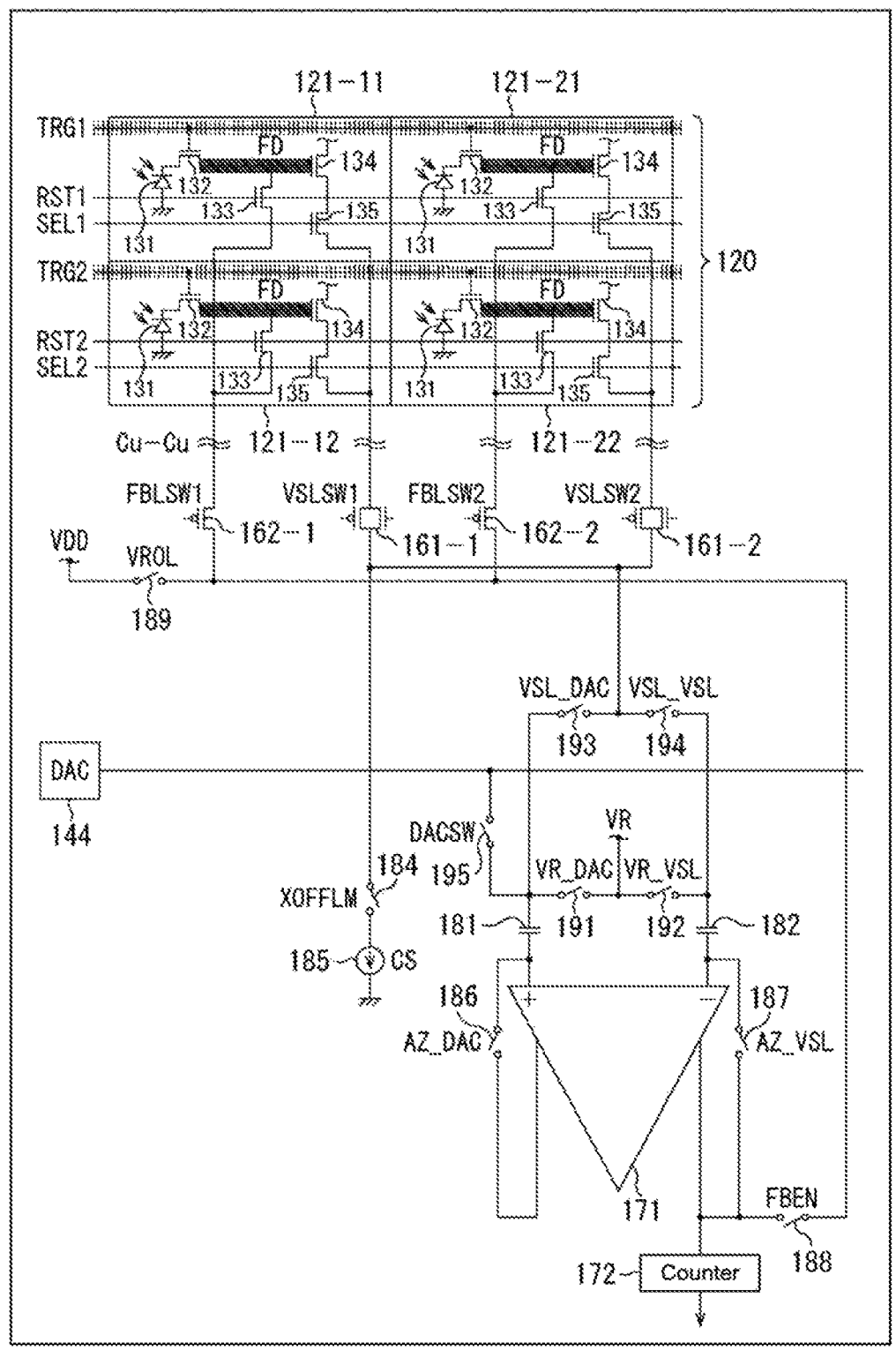
FIG. 35 A diagram showing an example of the state at a time T61.

As shown in FIG. 34, at a time T61, the area scanning unit 111 turns on a transfer control signal (ΦTRG1, 2) of each unit pixel row of the pixel unit 120 to be processed, and turns off other control signals. Accordingly, as shown in FIG. 35, in all unit pixels 121 of the pixel unit 120 to be processed, charges stored in the photodiode (PD) 131 are transferred to the floating diffusion (FD).

<Flow of Data Read Phase Processing>

Next, with reference to the flowchart of FIG. 36, an example of flow of the data read phase processing performed in Step S105 in FIG. 8 will be described.

Figure 27:
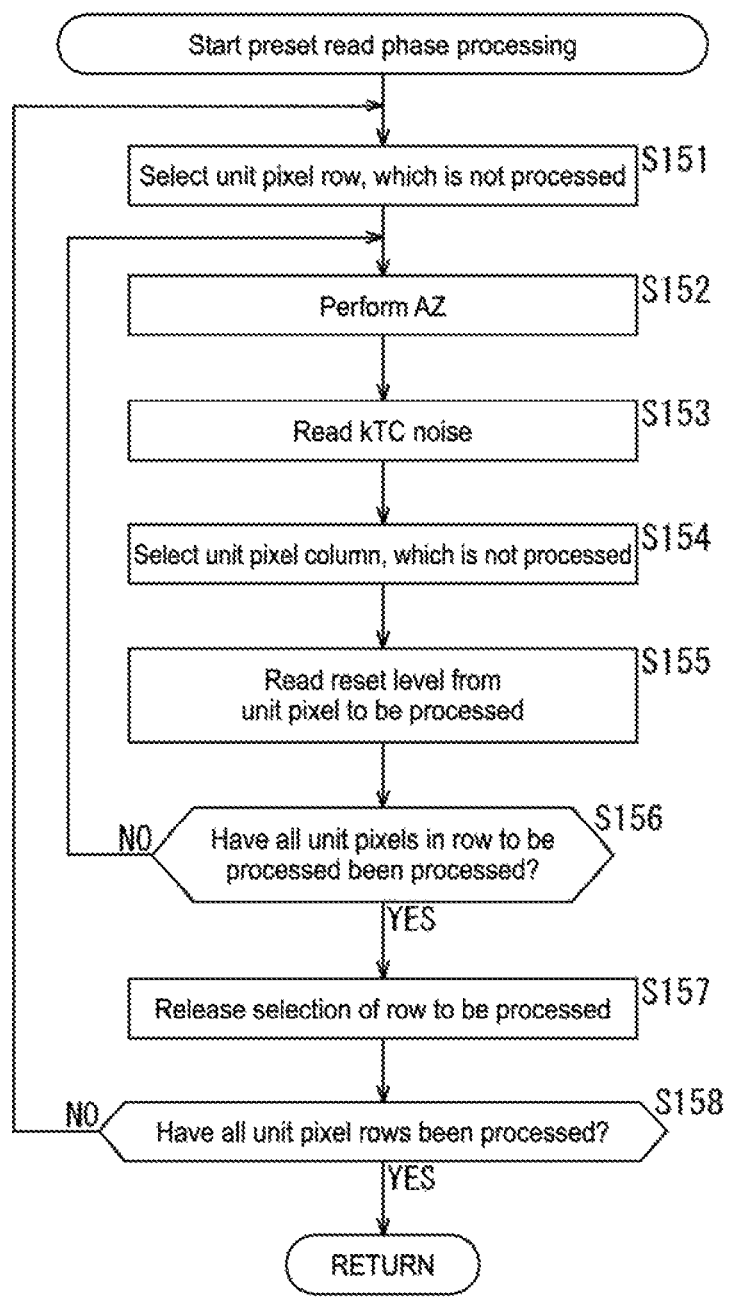
FIG. 27 A flowchart describing an example of flow of preset read phase processing.
Figure 36:
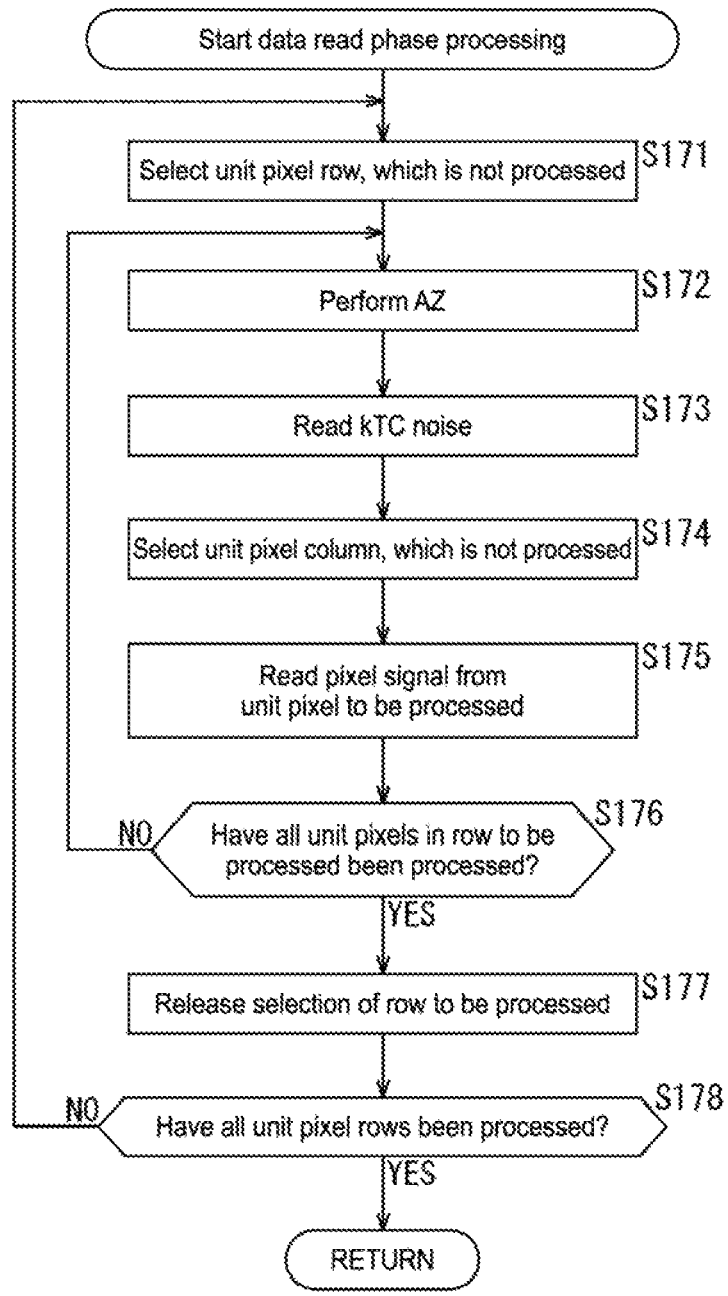
FIG. 36 A flowchart describing an example of flow of data read phase processing.

As shown in FIG. 36, the control unit 110 performs each processing (Step S171 to Step S178) of data read phase processing similarly to each processing (Step S151 to Step S158) of the preset read phase processing (FIG. 27).

It should be noted that in Step S175, the control unit 110 reads, from the unit pixel 121 to be processed, not a reset level but a pixel signal corresponding to charges transferred from the photodiode (PD) 131 to the floating diffusion (FD) by the processing of Step S104 in FIG. 8, and compares it with the reference voltage (ramp wave).

<Timing Chart of Data Read Phase>

Figure 37:
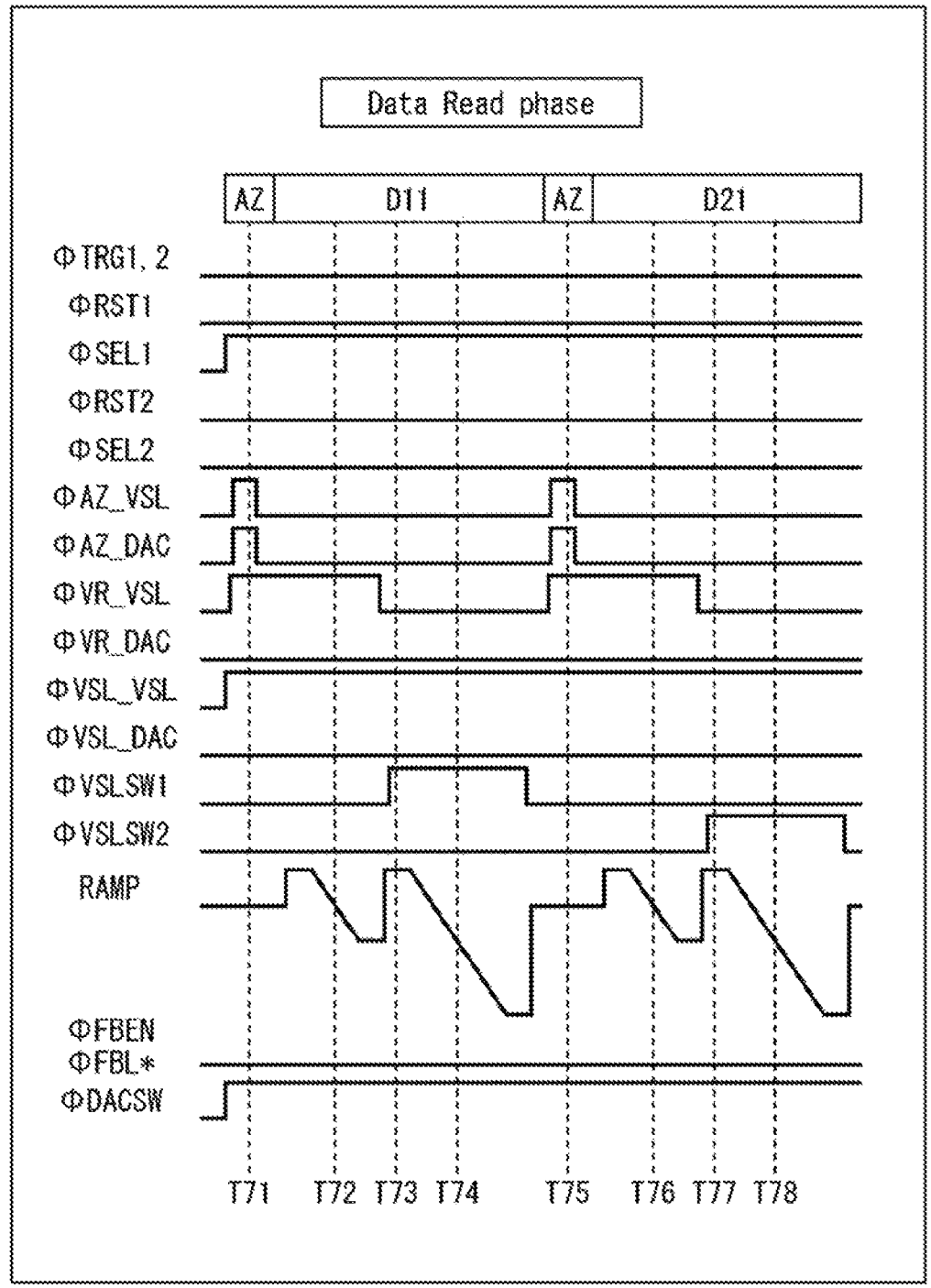
FIG. 37 A timing chart showing an example of the data read phase state.

FIG. 37 is a timing chart showing an example of flow of the data read phase processing for the unit pixel 121-11 and the unit pixel 121-21 of the pixel unit 120.

As shown in FIG. 37, in this case, each processing is performed similarly to the preset read phase processing shown in FIG. 28.

For example, also in this case, the select control signal (ΦSEL1) is turned on as shown in FIG. 37 (Step S171). Further, also the VSL_VSL connection control signal (ΦVSL_VSL) and the DACSW connection control signal (DACSW) are turned on.

Then, at a time T71, auto-zero processing (AZ) is performed (Step S172). At this time, the AZ connection control signals (ΦAZ_VSL and ΦAZ_DAC) and the VR_VSL connection control signal (ΦVR_VSL) are turned on.

Figure 38:
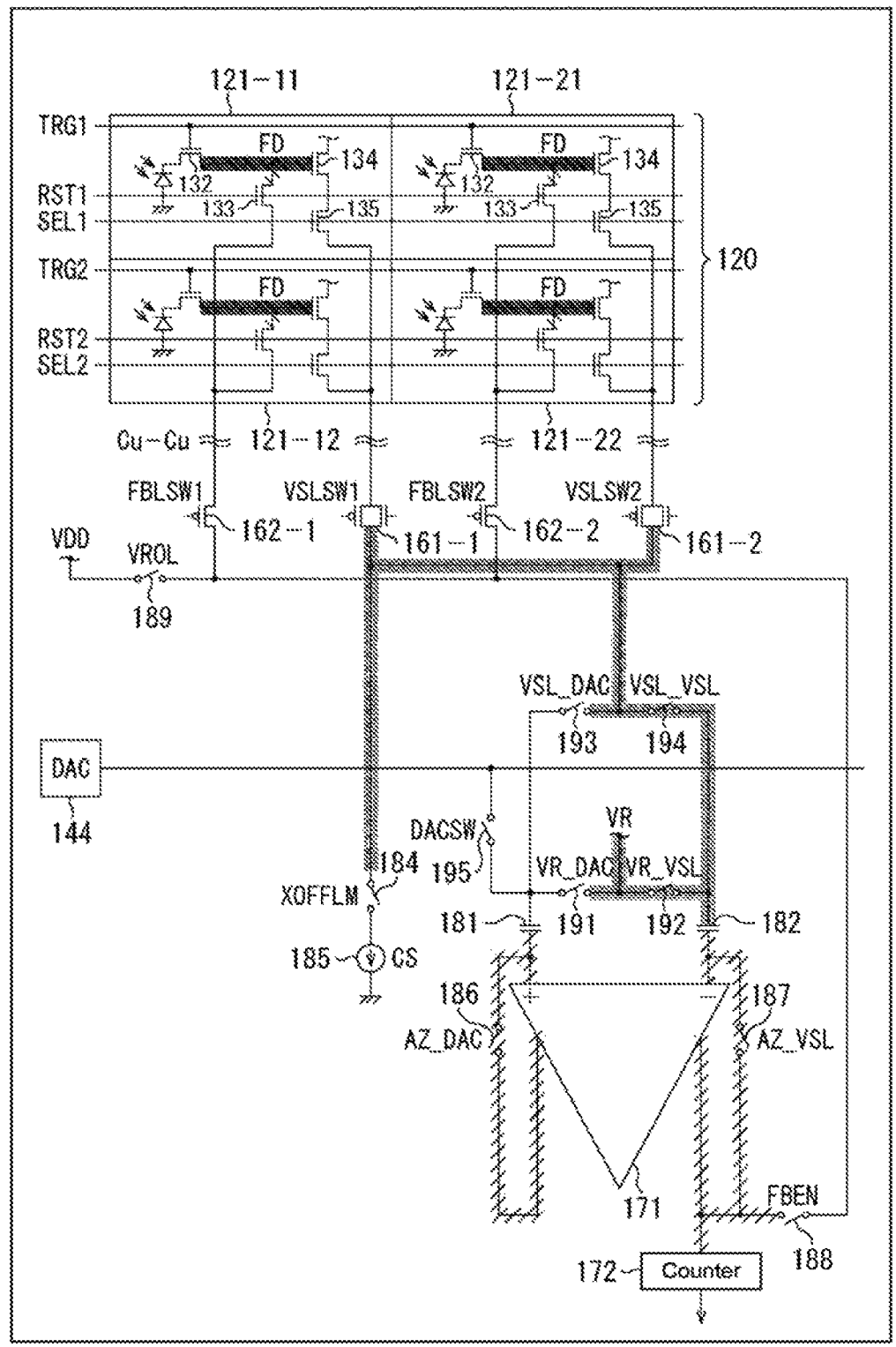
FIG. 38 A diagram showing an example of the state at a time T71.

Accordingly, as shown in FIG. 38, the input and output of the comparing unit 171 are short-circuited, and the reference voltage VR is applied between the VSL switch 161 and the capacitor 182 of the vertical signal line (VSL) (i.e., to the VSL side input of the comparing unit 171).

Figure 39:
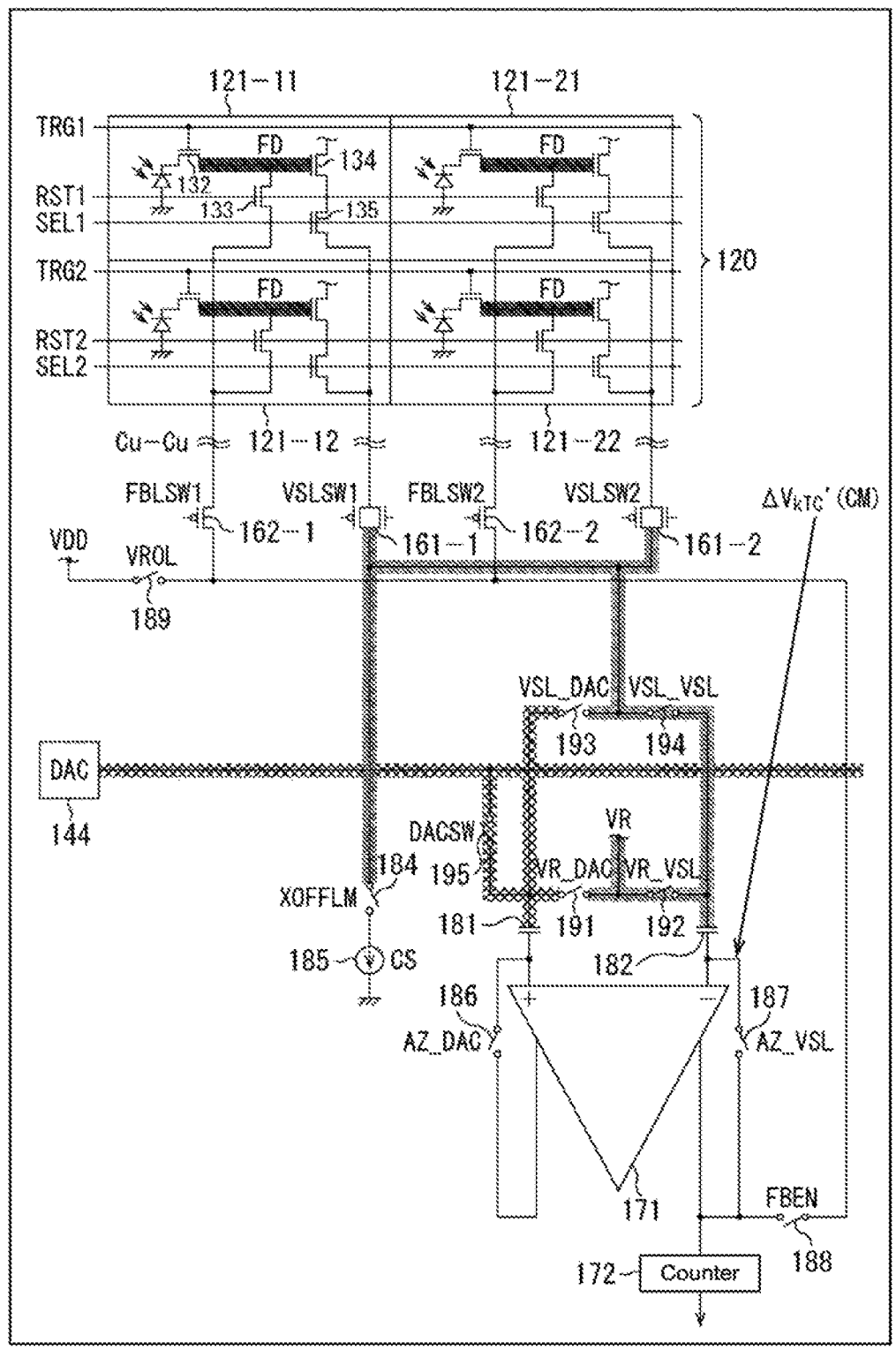
FIG. 39 A diagram showing an example of the state at a time T72.

At a time T72, as shown in FIG. 39, kTC noise is read (Step S173). Specifically, the reference voltage VR is compared with the reference voltage (ramp wave). Accordingly, kTC noise ($\Delta V_{kTc}(CM)$) is read.

Figure 40:
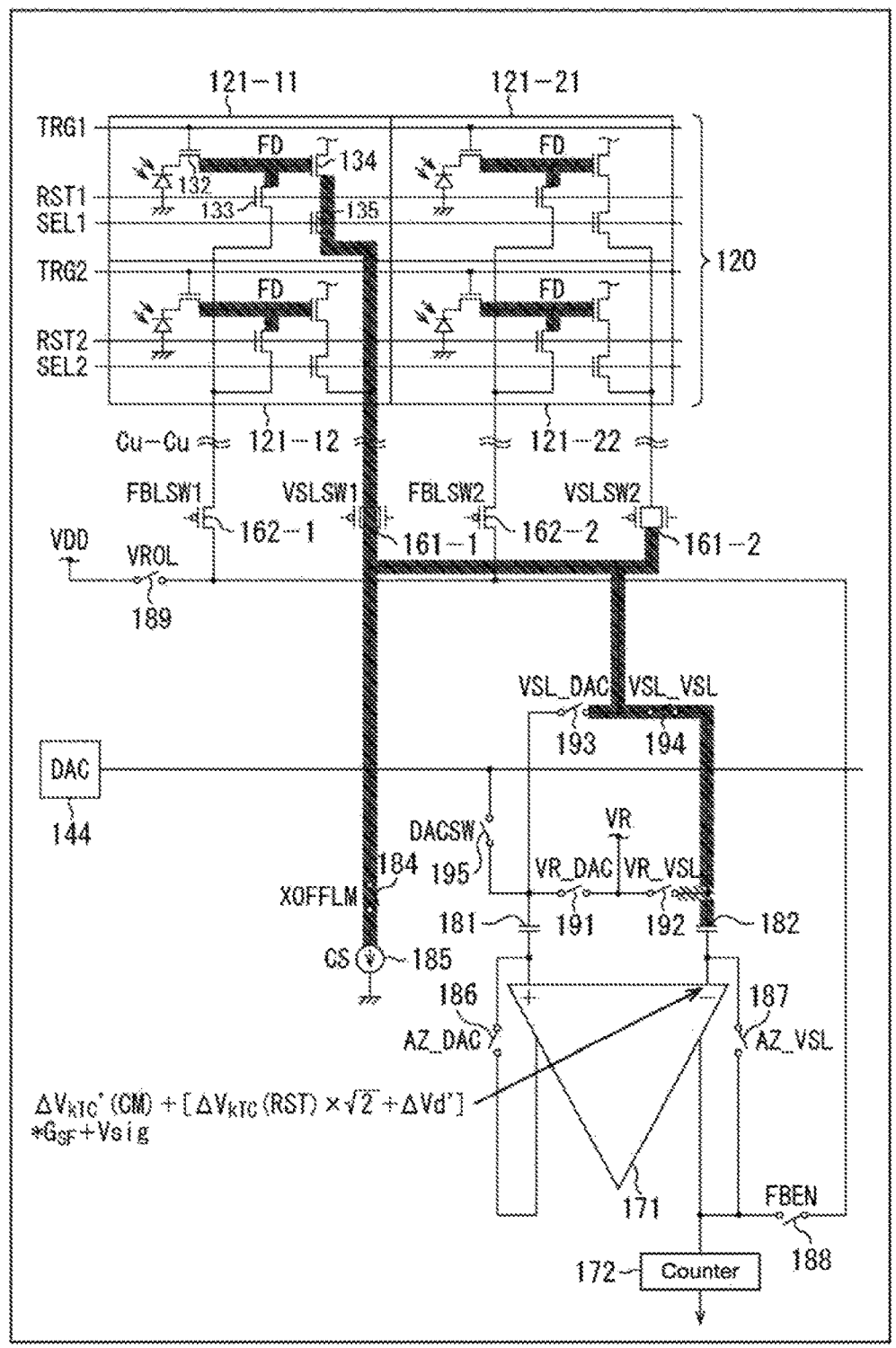
FIG. 40 A diagram showing an example of the state at a time T73.

Further, for example, at a time T73, a unit pixel column to be processed is selected (Step S174). At this time, the VR_VSL connection control signal (ΦVR_VSL) is turned off, and the VSL connection control signal (ΦVSLSW1) corresponding to the unit pixel 121-11 to be processed is turned on. That is, as shown in FIG. 40, a pixel signal corresponding to charges held by the floating diffusion (FD) of the unit pixel 121-11 is transmitted to the VSL side input of the comparing unit 171. Therefore, the voltage of the difference between the VSL side input and the DAC side input of the comparing unit 171 is $\Delta V_{kTc}(CM)+[\Delta V_{kTc}(RST)\times\sqrt{2}+\Delta Vd']*G_{SF}+V\text{sig}$. Note that Vsig represents an optical signal read from the pixel, which is acquired from the VSL side input.

Figure 41:
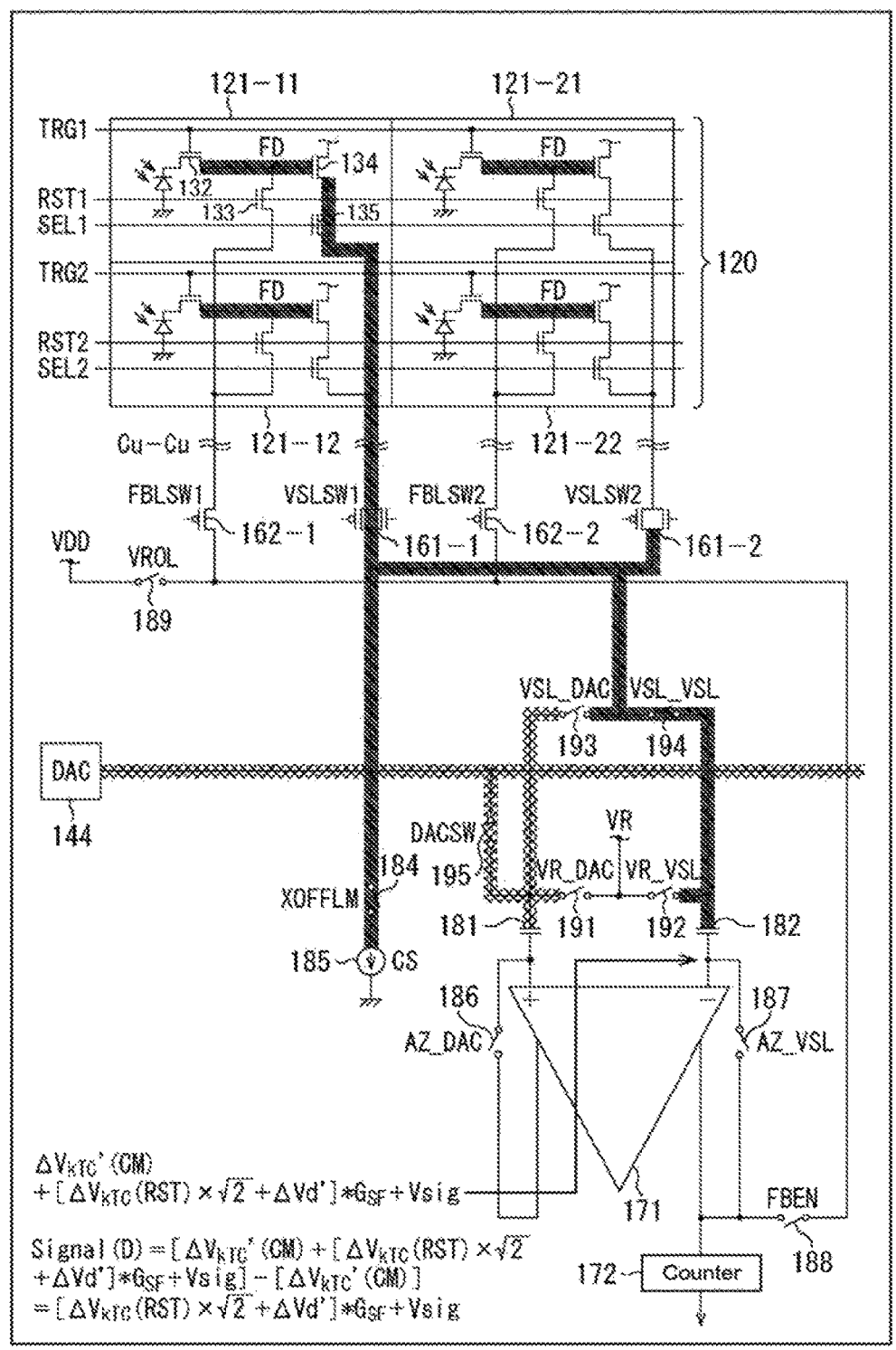
FIG. 41 A diagram showing an example of the state at a time T74.

At a time T74, the reset level is read from the unit pixel to be processed (Step S175). That is, as shown in FIG. 41, the ramp wave (reference voltage) supplied from the D/A conversion unit (DAC) 144 is input to the DAC side input of the comparing unit 171, and the signal level of the pixel signal of the unit pixel 121-11 is compared with the reference voltage (ramp wave).

The voltage of the VSL side input of the comparing unit 171 at this time is $\Delta V_{kTc}(CM)+[\Delta V_{kTc}(RST)\times\sqrt{2}+\Delta Vd']*G_{SF}+V\text{sig}$. Therefore, the signal level of the pixel signal read from the unit pixel 121-11 is represented by the following formula (4).

$$\text{Signal}(D) = [\Delta V_{kTc}(CM)] + [\Delta V_{kTc}(RST) \times \sqrt{2 + \Delta Vd'} * G_{SF} + V\text{sig}] - [\Delta V_{kTc}(CM)]$$

$$= [\Delta V_{kTc}(RST) \times \sqrt{2 + \Delta Vd'} * G_{SF} + V\text{sig}] \quad (4)$$

At a time T75 to a time T78, the similar processing is repeated for the unit pixel 121-21.

Figure 42:
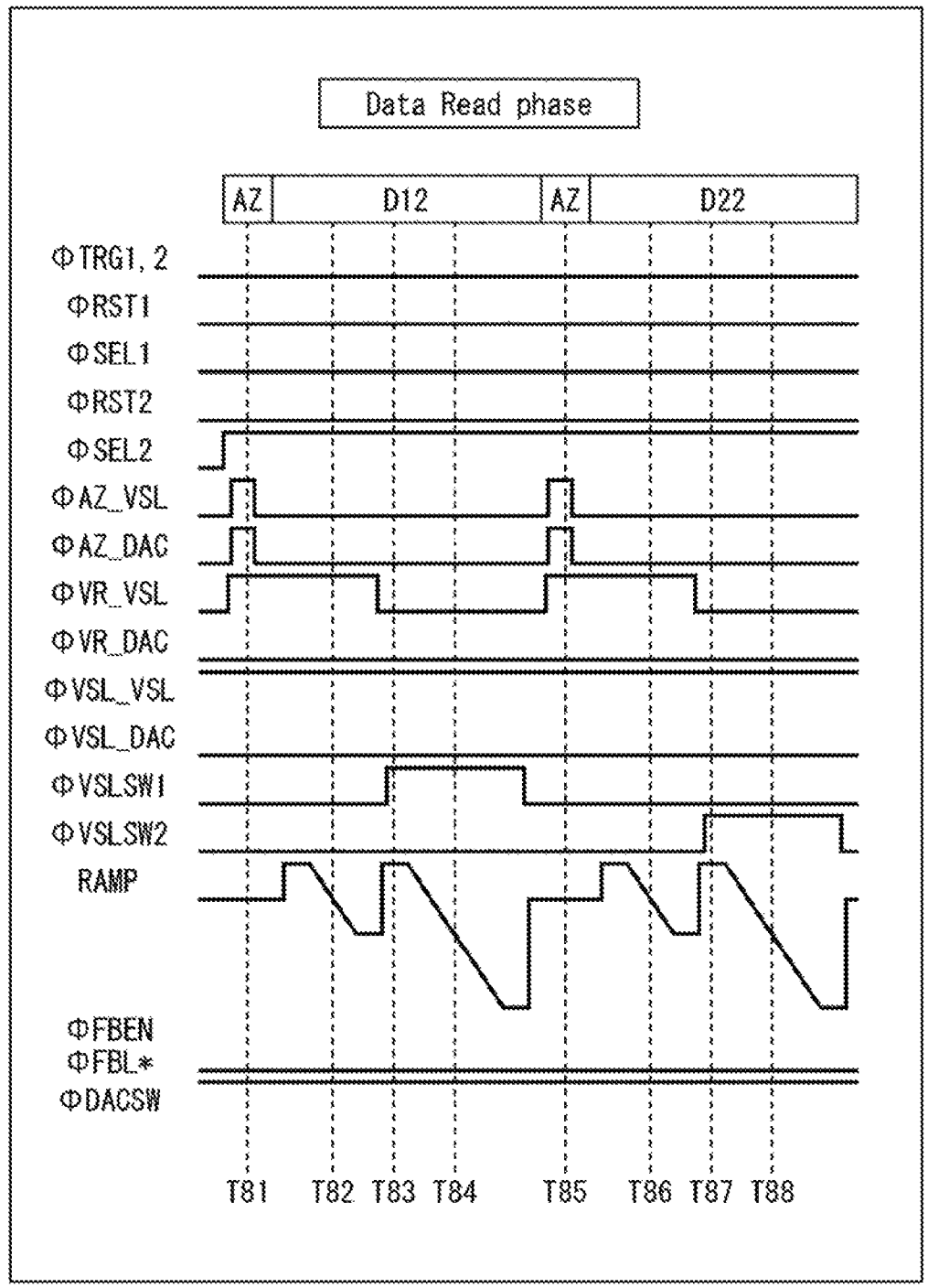
FIG. 42 A timing chart showing an example of the data read phase state.

FIG. 42 is a timing chart showing an example of flow of the data read phase processing for the unit pixel 121-12 and the unit pixel 121-22 of the pixel unit 120. As shown in FIG. 42, the processing similar to that for the unit pixel 121-11 is repeated for the unit pixel 121-12 and the unit pixel 121-22. It should be noted that in this case, the select control signal (ΦSEL2) is turned on (Step S171).

By performing each processing as described above, the image sensor 100 is capable of suppressing the reduction in image quality of a picked-up image.

2. Second Embodiment

<Imaging Apparatus>

Figure 43:
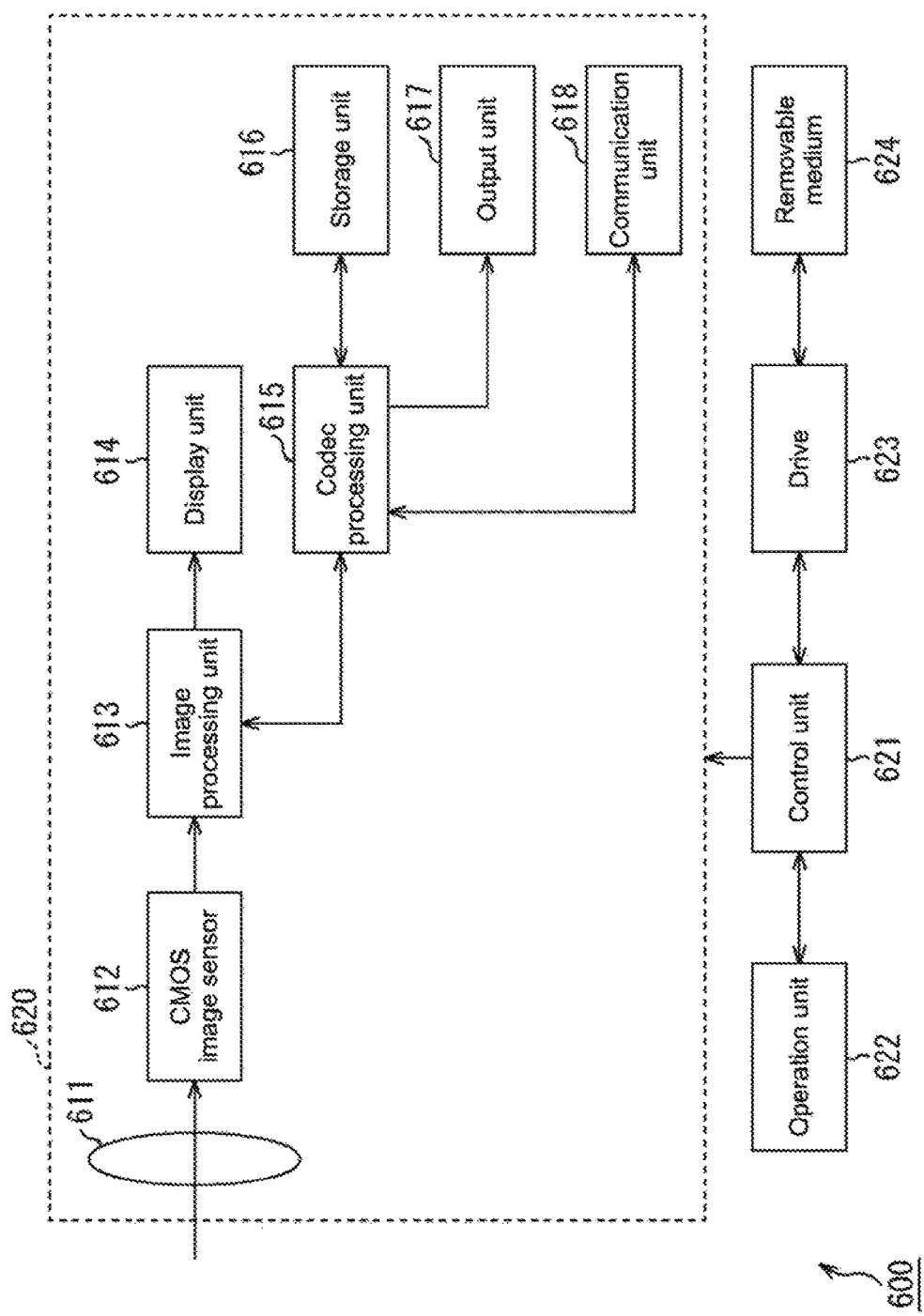
FIG. 43 A diagram showing a main configuration example of an imaging apparatus.

Note that the present technology is applicable also to those other than the image sensor. For example, the present technology may be applied to an apparatus including an image sensor (electronic apparatus, etc.) such as an imaging apparatus. FIG. 43 is a block diagram showing a main configuration example of an imaging apparatus as an example of an electronic apparatus to which the present technology is applied. An imaging apparatus 600 shown in FIG. 43 is an apparatus that picks up an image of an object, and outputs the image of the object as an electric signal.

As shown in FIG. 43, the imaging apparatus 600 includes an optical unit 611, a CMOS image sensor 612, an image processing unit 613, a display unit 614, a codec processing unit 615, a storage unit 616, an output unit 617, a communication unit 618, a control unit 621, an operation unit 622, and a drive 623.

The optical unit 611 includes a lens that adjusts the focal point to an object and collects light from the focused position, a stop that adjusts exposure, a shutter that controls the imaging timing, and the like. The optical unit 611 causes light from the object (incident light) to be transmitted therethrough, and supplies it to the CMOS image sensor 612.

The CMOS image sensor 612 performs photoelectric conversion on the incident light to A/D convert the signal for each pixel (pixel signal), performs signal processing such as CDS, and supplies processed picked-up image data to the image processing unit 613.

The image processing unit 613 performs image processing on the picked-up image data acquired by the CMOS image sensor 612. More specifically, the image processing unit 613 performs various kinds of image processing such as color mixture correction, black level correction, white balance adjustment, demosaic processing, matrix processing, gamma correction, and YC conversion for the picked-up image data supplied from the CMOS image sensor 612. The image processing unit 613 supplies the picked-up image data on which image processing has been performed to the display unit 614.

The display unit 614 includes, for example, a liquid crystal display, and displays the image (e.g., an image of the object) of the picked-up image data supplied from the image processing unit 613.

The image processing unit 613 further supplies, as necessary, the picked-up image data on which image processing has been performed to the codec processing unit 615.

The codec processing unit 615 performs coding processing in a predetermined method for the picked-up image data supplied from the image processing unit 613, and supplies the coded data thus obtained to the storage unit 616. Further, the codec processing unit 615 reads the coded data stored in the storage unit 616, decodes the data to generate decoded image data, and supplies the decoded image data to the image processing unit 613.

The image processing unit 613 performs predetermined image processing on the decoded image data supplied from the codec processing unit 615. The image processing unit 613 supplies the decoded image data on which image processing has been performed to the display unit 614. The display unit 614 includes, for example, a liquid crystal display, and displays the image of the decoded image data supplied from the image processing unit 613.

Further, the codec processing unit 615 may supply coded data obtained by coding the picked-up image data supplied from the image processing unit 613 or coded data of the picked-up image data read from the storage unit 616 to the output unit 617, and output it to the outside of the imaging apparatus 600. Further, the codec processing unit 615 may supply the decoded image data obtained by decoding the picked-up image data before coding or the coded data read from the storage unit 616 to the output unit 617, and output it to the outside of the imaging apparatus 600.

Further, the codec processing unit 615 may transmit the picked-up image data, the coded data of the picked-up image data, or the decoded image data to another apparatus via the communication unit 618. Further, the codec processing unit 615 may acquire the picked-up image data or the coded data of the image data via the communication unit 618. The codec processing unit 615 appropriately performs coding, decoding, or the like for the picked-up image data or the coded data of the image data acquired via the communication unit 618. The codec processing unit 615 may supply the acquired image data or coded data to the image processing unit 613 as described above, or output it to the storage unit 616, the output unit 617, and the communication unit 618.

The storage unit 616 stores the coded data or the like supplied from the codec processing unit 615. The coded data stored in the storage unit 616 is read to the codec processing unit 615 and decoded as necessary. The picked-up image data obtained by the decoding processing is supplied to the display unit 614, and a picked-up image corresponding to the picked-up image data is displayed.

The output unit 617 includes an external output interface such as an external output terminal, and outputs various kinds of data supplied via the codec processing unit 615 to the outside of the imaging apparatus 600 via the external output interface.

The communication unit 618 supplies various kinds of information such as image data and coded data supplied from the codec processing unit 615 to another apparatus serving as a communication partner in predetermined communication (wired communication or wireless communication). Further, the communication unit 618 acquires various kinds of information such as image data and coded data from another apparatus serving as a communication partner in predetermined communication (wired communication or wireless communication), and supplies it to the codec processing unit 615.

The control unit 621 controls the operation of the respective processing units (respective units shown in a dotted line 620, the operation unit 622, and the drive 623) of the imaging apparatus 600.

The operation unit 622 includes an arbitrary input device such as a jog dial (trademark), a key, a button, and a touch panel, receives an operation input performed by a user, for example, and supplies a signal corresponding to the operation input to the control unit 621.

The drive 623 reads information stored in a removable medium 624 such as a magnetic disk, an optical disc, a magnetic optical disk, and a semiconductor memory, which is attached thereto. The drive 623 reads various kinds of information such as a program and data from the removable medium 624, and supplies it to the control unit 621. Further, in the case where the writable removable medium 624 is attached to the drive 623, the drive 623 causes the removable medium 624 to store various kinds of information such as image data and coded data supplied via the control unit 621.

As the above-mentioned CMOS image sensor 612 of the imaging apparatus 600, the present technology described in each embodiment is applied. Specifically, as the CMOS image sensor 612, the above-mentioned image sensor 100 is used. Accordingly, the CMOS image sensor 612 is capable of suppressing the reduction in image quality of a picked-up image. Therefore, the imaging apparatus 600 is capable of acquiring a picked-up image with high image quality by picking up an image of an object.

The above-mentioned series of processing may be executed by hardware or may be executed by software. If the series of processing is executed by software, programs configuring that software are installed from a network or a recording medium.

This recording medium includes, for example, the removable medium 624 provided separately from the apparatus body in order to deliver a program to a user as shown in FIG. 43. The program is stored in the removable medium 624. The removable medium 624 includes a magnetic disk (including a flexible disk), an optical disc (including CD-ROM and DVD), or the like. Further, the removable medium 624 includes a magnetic optical disk (including MD (Mini Disc)), a semiconductor memory, or the like.

In this case, the program can be installed into the storage unit 616 by mounting the removable medium 624 to the drive 623.

Further, this program can also be provided via a wired or wireless transmission medium such as a local area network, the Internet, and digital satellite broadcasting. In this case, the program can be received by the communication unit 618, and installed into the storage unit 616.

Otherwise, this program can be installed into the storage unit 616, a ROM (Read Only Memory) in the control unit 621, or the like, in advance.

Note that the program that is executed by the computer may be a program by which the processing is performed in time series in the order described in this specification, or may be a program by which the processing is performed in parallel or at a necessary timing, such as when a request to execute the processing is made.

Further, in this specification, the step of describing the program to be stored in the recording medium includes not only the processing performed in time series in the described order but also processing that is not necessarily performed in time series but performed in parallel or individually.

The above-mentioned processing of each Step may be performed in each apparatus described above or an arbitrary apparatus other than the apparatus described above. In this case, the apparatus that performs the processing only has to have the above-mentioned function (functional block, etc.) that is necessary to perform the processing. Further, it only has to appropriately transmit information that is necessary for the processing to the apparatus.

Further, in this specification, the "system" refers to a collection of a plurality of components (such as apparatuses and modules (parts)), and all the components need not necessarily be provided in the same casing. Thus, both a plurality of apparatuses that are contained in their casings and connected to each other via a network, and a single apparatus that has a single casing containing a plurality of modules are encompassed in the definition of the "system."

Further, the configuration described as a single apparatus (or processing unit) hereinabove may be divided into a plurality of apparatuses (or processing units). In contrast, the configurations described as a plurality of apparatus (or processing units) hereinabove may be integrated into a single apparatus (or processing unit). Further, as a matter of course, configurations other than those described hereinabove may be added to the configurations of the apparatus (or processing units). Further, as long as the configurations and operations of the entire system are substantially unchanged, a part of a configuration of a certain apparatus (or processing unit) may be incorporated in a configuration of another apparatus (or another processing unit).

The technical scope of the present disclosure, which is described in detail hereinabove in the preferred embodiments of the present disclosure with reference to the accompanying drawings, is not limited to those examples. It is obvious that various changes and modifications could have been made by those who have common knowledge in the technical field of the present disclosure within the technical scope described in the claims. It should be understood that those changes and modifications obviously belong to the technical scope of the present disclosure.

For example, the present technology may include a system of cloud computing in which a single function is shared with and cooperatively exerted in a plurality of apparatus via a network.

Further, the steps described above with reference to the flowcharts may be executed in a single apparatus, or may be shared with and executed in a plurality of apparatus.

Further, in a case where a plurality of processes are contained in a single step, the plurality of processes contained in the single step may be executed in a single apparatus, or may be shared with and executed in a plurality of apparatus.

Further, the present technology is not limited thereto, and may be carried out by any type of configuration to be mounted to such apparatus or to apparatus having such systems, specifically, a processor as, for example, system LSI (Large Scale Integration), a module using a plurality of the processors and the like, a unit using a plurality of the modules, and a set obtained by adding other functions to the unit (that is, a part of a configuration of an apparatus).

It should be noted that the present technology may take the following configurations.

(1) A signal processing apparatus, including:

a connection control unit that controls connection between a signal line and two inputs of a comparing unit, a signal read from a unit pixel being transmitted through the signal line, the comparing unit comparing the signal read from the unit pixel with a reference voltage; and a connection unit that connects the signal line to any one of the two inputs of the comparing unit or disconnects the signal line from the two inputs of the comparing unit in accordance with control of the connection control unit.

(2) The signal processing apparatus according to (1), in which
the connection unit includes a MOSFET, the MOSFET driving as a switch that connects the signal line to any one of the two inputs of the comparing unit or disconnects the signal line from the two inputs of the comparing unit on the basis of a control signal supplied from the connection control unit.

(3) The signal processing apparatus according to (1) or (2), in which
the connection control unit
controls the connection unit to connect the signal line to a negative input of the comparing unit when an output of the comparing unit is fed back to a floating diffusion of the unit pixel,
controls the connection unit to connect the signal line to a positive input of the comparing unit when auto-zero processing is performed, and
controls the connection unit to connect the signal line to the negative input of the comparing unit when the output of the comparing unit is fed back to the floating diffusion of the unit pixel again.

(4) The signal processing apparatus according to any one of (1) to (3), further including:
a reference voltage connection control unit that controls connection between a reference voltage and the two inputs of the comparing unit; and
a reference voltage connection unit that connects the reference voltage to any one of the two inputs of the comparing unit or disconnects the reference voltage from the two inputs of the comparing unit in accordance with control of the reference voltage connection control unit.

(5) The signal processing apparatus according to any one of (1) to (4), further including:
a feedback line connection control unit that controls connection between an output of the comparing unit and the floating diffusion of the unit pixel; and
a feedback line connection unit that connects the output of the comparing unit to the floating diffusion of the unit pixel or disconnects the output of the comparing unit from the floating diffusion of the unit pixel in accordance with control of the feedback line connection control unit.

(6) The signal processing apparatus according to any one of (1) to (5), in which
a plurality of unit pixels are arranged in a matrix pattern in a pixel array, a plurality of unit pixel units being formed in the pixel array, the plurality of unit pixel units each including a part of the plurality of unit pixels of the pixel array, and
the connection unit is provided for each unit pixel unit.

(7) The signal processing apparatus according to any one of (1) to (6), further including
a reset control unit that controls an operation of the reset transistor for each row of the unit pixel, in which the reset control unit connects the reset transistor provided for the row including the unit pixel to be processed in the pixel array when an output of the comparing unit is fed back to the floating diffusion of the unit pixel, and disconnects the reset transistor after the feedback is performed.

(8) The signal processing apparatus according to any one of (1) to (7), further including:
a signal line connection control unit that controls connection between a signal line and an input of the comparing unit, a signal read from the unit pixel being transmitted through the signal line; and a signal line connection unit that connects or disconnects the signal line to/from the input of the comparing unit in accordance with control of the signal line connection control unit.

(9) The signal processing apparatus according to any one of (1) to (8), in which
the signal line connection unit is provided for each column of the unit pixel in a pixel array, a plurality of unit pixels being arranged in a matrix pattern in the pixel array.

(10) The signal processing apparatus according to any one of (1) to (9), in which
the signal line connection control unit controls the signal line connection unit provided for the column including the unit pixel to connect the signal line provided for the column of the unit pixel to the input of the comparing unit when an output of the comparing unit is fed back to the floating diffusion.

(11) The signal processing apparatus according to any one of (1) to (10), further including:
the comparing unit; and
a counter that counts until a comparison result of the comparing unit is changed.

(12) The signal processing apparatus according to any one of (1) to (11), in which
the comparing unit and the counter are provided for each of a plurality of unit pixel units, the plurality of unit pixel units each including a part of a plurality of unit pixels of a pixel array, the plurality of unit pixel units being formed in the pixel array, the plurality of unit pixels being arranged in a matrix pattern in the pixel array.

(13) The signal processing apparatus according to any one of (1) to (12), further including
a unit pixel group including a plurality of unit pixels.

(14) The signal processing apparatus according to any one of (1) to (13), in which
the unit pixel group forms a pixel array, a plurality of unit pixels being arranged in a matrix pattern in the pixel array.

(15) The signal processing apparatus according to any one of (1) to (14), in which
a plurality of unit pixel units are formed in the pixel array, the plurality of unit pixel units each including a part of the plurality of unit pixels of the pixel array.

(16) A control method, including:
connecting, when an output of a comparing unit that compares a signal read from a unit pixel with a reference voltage is fed back to a floating diffusion of the unit pixel, a signal line to a negative input of the comparing unit, the signal read from the unit pixel being transmitted through the signal line;
connecting, when auto-zero processing is performed, the signal line to a positive input of the comparing unit; and
connecting, when the output of the comparing unit is fed back to the floating diffusion of the unit pixel again, the signal line to the negative input of the comparing unit.

(17) An image sensor, including:
a pixel array, a plurality of unit pixels being arranged in a matrix pattern in the pixel array;
a connection control unit that controls connection between a signal line and two inputs of a comparing unit, a signal read from the unit pixel being transmitted through the signal line, the comparing unit comparing the signal read from the unit pixel with a reference voltage; and
a connection unit that connects the signal line to any one of the two inputs of the comparing unit or disconnects the signal line from the two inputs of the comparing unit in accordance with control of the connection control unit.

(18) The image sensor according to (17), further including:
the comparing unit; and
a counter that counts until a comparison result of the comparing unit is changed, in which
a plurality of unit pixel units are formed in the pixel array, the plurality of unit pixel units each including a part of the plurality of unit pixels of the pixel array, and
the comparing unit, the counter, and the connection unit are provided for each unit pixel unit.
(19) The image sensor according to (17) or (18), further including
a plurality of semiconductor substrates, in which
the connection control unit, the connection unit, the comparing unit, and the counter are formed on a semiconductor substrate different from a semiconductor substrate on which the pixel array is formed.
(20) An electronic apparatus, including:
an imaging unit that picks up an image of an object; and
an image processing unit that performs image processing on image data acquired by imaging performed by the imaging unit, the imaging unit including
a pixel array, a plurality of unit pixels being arranged in a matrix pattern in the pixel array,
a connection control unit that controls connection between a signal line and two inputs of a comparing unit, a signal read from the unit pixel being transmitted through the signal line, the comparing unit comparing the signal read from the unit pixel with a reference voltage, and
a connection unit that connects the signal line to any one of the two inputs of the comparing unit or disconnects the signal line from the two inputs of the comparing unit in accordance with control of the connection control unit.

DESCRIPTION OF REFERENCE NUMERALS

100 image sensor, 101 pixel array, 102 VSL connection unit, 103 A/D conversion unit, 104 horizontal transfer unit, 105 FBL connection unit, 110 control unit, 111 area scanning unit, 112 VSL connection control unit, 113 A/D conversion control unit, 114 horizontal scanning unit, 115 FBL connection control unit, 120 pixel unit, 121 unit pixel, 141 area FBL connection unit, 142 area VSL connection unit, 143 area A/D conversion unit, 144 D/A conversion unit, 151 pixel substrate, 152 circuit substrate, 161 VSL switch, 162 FBL switch, 171 comparing unit, 172 counter, 181 and 182 capacitor, 184 XOFFLM switch, 185 current source, 186 AZ_DAC switch, 187 AZ_VSL switch, 188 FBEN switch, 189 VROL switch, 191 VR_DAC switch, 192 VR_VSL switch, 193 VSL_DAC switch, 194 VSL_VSL switch, 600 imaging apparatus, 612 CMOS image sensor

The invention claimed is:
1. A signal processing apparatus, comprising:
a comparator configured to generate a first output value based on comparison of a signal with a reference voltage;
a connector; and
one or more processors configured to:
read the signal from a unit pixel of a plurality of unit pixels of a pixel array;
transmit the signal via a signal line;
control connection between the signal line and two inputs of the comparator,
wherein the two inputs comprise a negative input and a positive input; and
feedback the first output value to a floating diffusion of the unit pixel;
generate a first control signal, based on the feedback of the first output value for a first time period;
generate a second control signal, based on an auto-zero process;
generate a third control signal, based on the feedback of the first output value for a second time period;
control the connector to connect the signal line to the negative input, based on the first control signal;
control the connector to connect the signal line to the positive input, based on the second control signal; and
control the connector to change the connection of the signal line from the positive input to the negative input, based on the third control signal.
2. The signal processing apparatus according to claim 1, wherein the connector comprises a MOSFET switch.
3. The signal processing apparatus according to claim 1, wherein the one or more processors are further configured to:
control connection between the reference voltage and the two inputs; and
connect the reference voltage to one of the two inputs based on the controlled connection; or
disconnect the reference voltage from at least one of the two inputs, based on the controlled connection.
4. The signal processing apparatus according to claim 1, wherein the one or more processors are further configured to control connection between the first output value and the floating diffusion, and
wherein the connector is further configured to:
connect the first output value to the floating diffusion based on the controlled connection; or
disconnect the first output value from the floating diffusion, based on the controlled connection.
5. The signal processing apparatus according to claim 1, wherein the plurality of unit pixels has a matrix pattern in the pixel array,
wherein the pixel array has a plurality of unit pixel units, wherein each of the plurality of unit pixel units includes a part of the plurality of unit pixels, and
wherein the connector is for each of the plurality of unit pixel units.
6. The signal processing apparatus according to claim 1, wherein the one or more processors are further configured to control an operation of a reset transistor for each row of the unit pixel, and
wherein the connector is further configured to:
connect the reset transistor, based on the first control signal; and
disconnect the reset transistor based on completion of the feedback.
7. The signal processing apparatus according to claim 1, wherein the connector is for each column of the unit pixel in the pixel array, and
wherein the plurality of unit pixels has a matrix pattern.
8. The signal processing apparatus according to claim 7, wherein the one or more processors are further configured to control the connector, for the column including the unit pixel.
9. The signal processing apparatus according to claim 1, further comprising a counter configured to count, based on a switch of the first output value to a second output value.
10. The signal processing apparatus according to claim 9, wherein the comparator and the counter are for each of a plurality of unit pixel units, wherein each of the plurality of unit pixel units includes a part of the plurality of unit pixels,
wherein the pixel array has the plurality of unit pixel units, and
wherein the plurality of unit pixels has a matrix pattern.

11. The signal processing apparatus according to claim 1, further comprising a unit pixel group including the plurality of unit pixels.

12. The signal processing apparatus according to claim 11,
wherein the unit pixel group forms the pixel array, and
wherein the plurality of unit pixels are in a matrix pattern in the pixel array.

13. The signal processing apparatus according to claim 12,
wherein a plurality of unit pixel units are in the pixel array, and
wherein each of the plurality of unit pixel units includes a part of the plurality of unit pixels.

14. A control method, comprising:
reading a signal of a unit pixel of a plurality of unit pixels;
transmitting the signal via a signal line;
comparing the signal with a reference voltage to generate an output value;
feeding back the output value to a floating diffusion of the unit pixel;
generating a first control signal based on the feedback of the output value for a first time period;
generating a second control signal based on the feedback of the output value for a second time period;
controlling a connector to connect, based on the first control signal, the signal line to a negative input of a comparator;
controlling the connector to connect the signal line to a positive input of the comparator, based on an auto-zero process; and
controlling the connector to change the connection of the signal line from the positive input to the negative input, based on the second control signal.

15. An image sensor, comprising:
a pixel array that comprises a plurality of unit pixels in a matrix pattern;
a comparator configured to generate a first output value based on comparison of a signal with a reference voltage;
a connector; and
one or more processors configured to:
read the signal from a unit pixel of the plurality of unit pixels of a pixel array;
transmit the signal via a signal line;
control connection between the signal line and two inputs of the comparator, the signal
wherein the two inputs comprise a negative input and a positive input; and
feedback the first output value to a floating diffusion of the unit pixel;
generate a first control signal, based on the feedback of the first output value for a first time period;
generate a second control signal, based on an auto-zero process;
generate a third control signal, based on the feedback of the first output value for a second time period;
control the connector to connect the signal line to the negative input, based on the first control signal;
control the connector to connect the signal line to the positive input, based on the second control signal; and
control the connector to change the connection of the signal line from the positive input to the negative input, based on the third control signal.

16. The image sensor according to claim 15, further comprising:
a counter configured to count, based on a switch of the first output value to a second output value,
wherein a plurality of unit pixel units are in the pixel array,
wherein each of the plurality of unit pixel units includes a part of the plurality of unit pixels, and
wherein the comparator, the counter, and the connector are for each unit pixel unit.

17. The image sensor according to claim 16, further comprising
a plurality of semiconductor substrates,
wherein the one or more processors, the connector, the comparator, and the counter are on a first semiconductor substrate of the plurality of semiconductor substrates that is different from a second semiconductor substrate of the plurality of semiconductor substrates, and
wherein the pixel array is on the second semiconductor substrate.

18. An electronic apparatus, comprising:
a camera configured to pick up an image of an object,
wherein the camera comprises:
an image sensor comprising:
a pixel array that includes a plurality of unit pixels in a matrix pattern;
a comparator configured to generate a first output value based on comparison of a signal with a reference voltage;
a connector; and
one or more processors configured to:
read the signal from a unit pixel of the plurality of unit pixels;
transmit the signal via a signal line;
control connection between the signal line and two inputs of the comparator,
wherein the two inputs comprises a negative input and a positive input;
feedback the first output value to a floating diffusion of the unit pixel;
generate a first control signal, based on the feedback of the first output value for a first time period;
generate a second control signal, based on an auto-zero process;
generate a third control signal, based on the feedback of the first output value for a second time period;
control the connector to connect the signal line to the negative input, based on the first control signal;
control the connector to connect the signal line to the positive input, based on the second control signal; and
control the connector to change the connection of the signal line from the positive input to the negative input, based on the third control signal.

* * * * *